US009079117B2

(12) United States Patent
Govindan et al.

(10) Patent No.: US 9,079,117 B2
(45) Date of Patent: Jul. 14, 2015

(54) SYSTEMS INCLUDING A CONDENSING APPARATUS SUCH AS A BUBBLE COLUMN CONDENSER

(71) Applicant: Gradiant Corporation, Woburn, MA (US)

(72) Inventors: Prakash Narayan Govindan, Melrose, MA (US); Steven Lam, Medford, LA (US); Maximus G. St. John, Somerville, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 14/538,619

(22) Filed: Nov. 11, 2014

(65) Prior Publication Data

US 2015/0130093 A1 May 14, 2015

Related U.S. Application Data

(63) Continuation of application No. 14/485,606, filed on Sep. 12, 2014.

(60) Provisional application No. 61/907,629, filed on Nov. 22, 2013, provisional application No. 61/901,757, filed on Nov. 8, 2013, provisional application No. 61/877,032, filed on Sep. 12, 2013.

(51) Int. Cl.
*B01F 3/04* (2006.01)
*B01D 5/00* (2006.01)
*C02F 1/04* (2006.01)
*F24F 6/12* (2006.01)
*C02F 103/08* (2006.01)

(52) U.S. Cl.
CPC ............ *B01D 5/006* (2013.01); *B01F 3/04078* (2013.01); *B01F 3/04106* (2013.01); *C02F 1/04* (2013.01); *F24F 6/12* (2013.01); *C02F 2103/08* (2013.01)

(58) Field of Classification Search
CPC .... B01F 3/04; B01F 3/04078; B01F 3/04007; B01F 3/04009; B01F 3/04106; F24F 6/12
USPC ................ 261/128, 146, 149; 96/243; 159/29
See application file for complete search history.

(56) References Cited

U.S. PATENT DOCUMENTS 3,783,108 A 1/1974 Koivisto et al.
7,832,714 B2 * 11/2010 Duesel et al. ................... 261/77
(Continued)

FOREIGN PATENT DOCUMENTS

CN 1791557 A 6/2006
JP S51-42078 A 4/1976
(Continued)

*Primary Examiner* — Robert A Hopkins
(74) *Attorney, Agent, or Firm* — Wolf, Greenfield & Sacks, P.C.

(57) ABSTRACT

Condensing apparatuses and their use in various heat and mass exchange systems are generally described. The condensing apparatuses, such as bubble column condensers, may employ a heat exchanger positioned external to the condensing vessel to remove heat from a bubble column condenser outlet stream to produce a heat exchanger outlet stream. In certain cases, the condensing apparatus may also include a cooling device positioned external to the vessel configured and positioned to remove heat from the heat exchanger outlet stream to produce a cooling device outlet stream. The condensing apparatus may be configured to include various internal features, such as a vapor distribution region and/or a plurality of liquid flow control weirs and/or chambers within the apparatus having an aspect ratio of at least 1.5. A condensing apparatus may be coupled with a humidifier to form part of a desalination system, in certain cases.

30 Claims, 29 Drawing Sheets

(56) References Cited

U.S. PATENT DOCUMENTS

2013/0075940 A1* 3/2013 Govindan et al. ............ 261/128
2014/0367871 A1   12/2014 Govindan et al.

FOREIGN PATENT DOCUMENTS

| WO | WO 2011/028853 | 3/2011 |
| WO | WO 2014/200829 | 12/2014 |

* cited by examiner

SYSTEMS INCLUDING A CONDENSING APPARATUS SUCH AS A BUBBLE COLUMN CONDENSER

RELATED APPLICATIONS

This application is a continuation of U.S. patent application Ser. No. 14/485,606, filed Sep. 12, 2014, and entitled "Systems Including a Condensing Apparatus such as a Bubble Column Condenser," which claims priority under 35 U.S.C. §119(e) to U.S. Provisional Patent Application Ser. No. 61/877,032, filed Sep. 12, 2013, and entitled "Systems Including a Bubble Column Condenser," U.S. Provisional Patent Application Ser. No. 61/901,757, filed Nov. 8, 2013, and entitled "Systems Including a Bubble Column Condenser," and U.S. Provisional Patent Application Ser. No. 61/907,629, filed Nov. 22, 2013, and entitled "Systems Including a Bubble Column Condenser"; each of which is incorporated herein by reference in its entirety for all purposes.

FIELD

Embodiments described herein generally relate to condensing apparatuses (e.g., bubble column condensers) and their use in various heat and mass exchange systems.

BACKGROUND

Fresh water shortages are becoming an increasing problem around the world, as demand for fresh water for human consumption, irrigation, and/or industrial use continues to grow. Various desalination methods are capable of producing fresh water from seawater, brackish water, flowback water, water produced from an oil or gas extraction process, and/or waste water. For example, a humidification-dehumidification (HDH) process involves contacting a saline solution with dry air in a humidifier, such that the air becomes heated and humidified. The heated and humidified air is then brought into contact with cold water in a dehumidifier (e.g., condenser), producing pure water and dehumidified air.

However, HDH processes often involve certain drawbacks. For example, due to the use of a carrier gas in HDH systems, a large percentage of non-condensable gas (e.g., air) is generally present in the condensing streams, which can cause heat and mass transfer rates in the dehumidifier to be very low. Also, the presence of a non-condensable gas can increase the thermal resistance to condensation of vapor on a cold surface, thereby reducing the effectiveness of surface condensers. Additionally, the dehumidifier can sometimes require large amounts of energy to operate. Condensers with improved properties, such as, for example, reduced power consumption and/or high heat and mass transfer rates in the presence of non-condensable gases, are therefore desirable.

SUMMARY

Condensing apparatuses, such as bubble column condensers, and their use in various heat and mass exchange systems are disclosed. The subject matter of the present invention involves, in some cases, interrelated products, alternative solutions to a particular problem, and/or a plurality of different uses of one or more systems and/or articles.

Certain embodiments relate to desalination systems. In some embodiments, a desalination system comprises a humidifier comprising a humidifier liquid inlet fluidically connected to a source of salt-containing water, a humidifier gas inlet fluidically connected to a source of a carrier gas, and a humidifier outlet. In certain cases, the humidifier is configured to produce a vapor-containing humidifier outlet stream enriched in water vapor relative to the gas received from the gas inlet. In some embodiments, the desalination system comprises a bubble column condenser comprising a condenser inlet fluidically connected to the humidifier outlet, a condenser gas outlet, and a condenser water outlet. In certain embodiments, the bubble column condenser is configured to remove at least a portion of the water vapor from the humidifier outlet stream to produce a condenser gas outlet stream lean in water relative to the humidifier outlet stream and a condenser water outlet stream. In some embodiments, the desalination system comprises a heat exchanger separate from the bubble column condenser and fluidically connected to the condenser water outlet and configured to remove heat from the condenser water outlet stream.

In some embodiments, the desalination system comprises a humidifier comprising a humidifier liquid inlet fluidically connected to a source of salt-containing water, a humidifier gas inlet fluidically connected to a source of a gas, and a humidifier outlet, wherein the humidifier is configured to produce a vapor-containing humidifier outlet stream enriched in water vapor relative to the gas received from the gas inlet. In certain embodiments, the desalination system comprises a bubble column condenser comprising a condenser inlet fluidically connected to the humidifier outlet, a condenser gas outlet, and a condenser water outlet, wherein the bubble column condenser is configured to remove at least a portion of the water vapor from the humidifier outlet stream to produce a condenser gas outlet stream lean in water relative to the humidifier outlet stream and a condenser water outlet stream. In some embodiments, the desalination system comprises a heat exchanger fluidically connected to the condenser water outlet and configured to remove heat from the condenser water outlet stream. In certain cases, a portion of a gas flow is extracted from at least one intermediate location in the humidifier and fed from each of said at least one intermediate location to a corresponding intermediate location in the bubble column condenser.

Certain embodiments relate to condenser systems comprising a bubble column condenser comprising a vessel comprising an inlet in fluid communication with a source of a gas comprising a condensable fluid in vapor phase, and an outlet, wherein the vessel contains a liquid layer comprising an amount of the condensable fluid and the bubble column condenser is configured to remove at least a portion of the condensable fluid from the gas to produce a bubble column condenser outlet stream comprising the condensable fluid in liquid phase. In some embodiments, the condenser systems further comprise a heat exchanger positioned external to the vessel and fluidically connected to the vessel to receive the bubble column condenser outlet stream and to remove heat from the bubble column condenser outlet stream.

Some embodiments relate to a bubble column condenser comprising a first stage comprising a first stage inlet in fluid communication with a source of a gas comprising a condensable fluid in a vapor phase, and a first stage outlet, wherein the first stage contains a liquid layer comprising an amount of the condensable fluid, and the ratio of the height of the liquid layer within the first stage to the length of the condenser is about 1.0 or lower during substantially continuous operation.

In certain embodiments, the bubble column condenser comprises a first stage comprising a first stage inlet in fluid communication with a source of a gas comprising a condensable fluid in a vapor phase, and a first stage outlet, wherein the first stage contains a liquid layer comprising an amount of the condensable fluid, the liquid layer having a height of less than about 0.1 m during substantially continuous operation.

In some embodiments, a condenser apparatus is provided. In some cases, the condenser apparatus comprises a vessel comprising a liquid inlet for receiving a stream of a liquid comprising a condensable fluid in liquid phase, a liquid outlet, and at least one chamber in fluid communication with the liquid inlet and the liquid outlet. In certain embodiments, the at least one chamber comprises a bottom surface comprising a plurality of perforations through which vapor can travel. In certain cases, the condenser apparatus comprises a liquid layer positioned in contact with the liquid outlet. In some cases, the liquid layer comprises an amount of the liquid comprising the condensable fluid. In some embodiments, the condenser apparatus comprises a vapor distribution region positioned below the at least one chamber. According to some embodiments, the vapor distribution region comprises a vapor inlet in fluid communication with a source of a vapor mixture comprising the condensable fluid in vapor phase and/or a non-condensable gas. In some cases, the condenser apparatus comprises a vapor outlet arranged in fluid communication with the at least one chamber. In certain embodiments, the condenser apparatus is configured to remove at least a portion of the condensable fluid from the vapor mixture to produce a condenser outlet stream comprising the condensable fluid in liquid phase.

In some embodiments, a humidifier apparatus is provided. In some cases, the humidifier apparatus comprises a vessel comprising a liquid inlet for receiving a stream of a liquid comprising a condensable fluid in liquid phase, a liquid outlet, and at least one chamber in fluid communication with the liquid inlet and the liquid outlet. In certain embodiments, the at least one chamber comprises a bottom surface comprising a plurality of perforations through which vapor can travel. In certain cases, the humidifier apparatus comprises a liquid layer positioned in contact with the liquid outlet. In some cases, the liquid layer comprises an amount of the liquid comprising the condensable fluid. In some embodiments, the humidifier apparatus comprises a vapor distribution region positioned below the at least one chamber. According to some embodiments, the vapor distribution region comprises a vapor inlet in fluid communication with a source of a vapor mixture comprising the condensable fluid in vapor phase and/or a non-condensable gas. In some cases, the humidifier apparatus comprises a vapor outlet arranged in fluid communication with the at least one chamber. In certain embodiments, the humidifier apparatus is configured to produce a vapor-containing humidifier outlet stream enriched in the condensable fluid in vapor phase relative to the vapor mixture received from the vapor inlet.

Some embodiments relate to a condenser apparatus comprising a vessel comprising a liquid inlet for receiving a stream of a liquid comprising a condensable fluid in liquid phase, a liquid outlet, and at least one chamber in fluid communication with the liquid inlet and the liquid outlet. In some cases, the at least one chamber has an aspect ratio of at least 1.5. In some embodiments, the condenser apparatus comprises a vapor inlet arranged in fluid communication with the at least one chamber and with a source of a vapor mixture comprising the condensable fluid in vapor phase and/or a non-condensable gas. In some embodiments, the condenser apparatus comprises a vapor outlet arranged in fluid communication with the at least one chamber. In certain cases, the at least one chamber comprises a surface comprising a plurality of perforations through which vapor can travel. In some embodiments, the at least one chamber comprises a first weir and a second weir, each positioned along a bottom surface of the at least one chamber and each having a height that is less than the height of the at least one chamber. In certain embodiments, the first weir and second weir are arranged such that the stream of the liquid comprising the condensable fluid in liquid phase flows across the at least one chamber from the first weir to the second weir. In certain embodiments, the condenser apparatus is configured to remove at least a portion of the condensable fluid from the vapor mixture to produce a condenser outlet stream comprising the condensable fluid in liquid phase.

According to some embodiments, a humidifier apparatus comprises a vessel comprising a liquid inlet for receiving a stream of a liquid comprising a condensable fluid in liquid phase, a liquid outlet, and at least one chamber in fluid communication with the liquid inlet and the liquid outlet. In some cases, the at least one chamber has an aspect ratio of at least 1.5. In some embodiments, the humidifier apparatus comprises a vapor inlet arranged in fluid communication with the at least one chamber and with a source of a vapor mixture comprising the condensable fluid in vapor phase and/or a non-condensable gas. In some embodiments, the humidifier apparatus comprises a vapor outlet arranged in fluid communication with the at least one chamber. In certain cases, the at least one chamber comprises a surface comprising a plurality of perforations through which vapor can travel. In some embodiments, the at least one chamber comprises a first weir and a second weir, each positioned along a bottom surface of the at least one chamber and each having a height that is less than the height of the at least one chamber. In certain embodiments, the first weir and second weir are arranged such that the stream of the liquid comprising the condensable fluid in liquid phase flows across the at least one chamber from the first weir to the second weir. In certain embodiments, the humidifier apparatus is configured to produce a vapor-containing humidifier outlet stream enriched in the condensable fluid in vapor phase relative to the vapor mixture received from the vapor inlet.

Certain embodiments relate to a condenser apparatus comprising a vessel comprising a liquid inlet for receiving a stream of a liquid comprising a condensable fluid in liquid phase, a liquid outlet, and a plurality of chambers arranged in a vertical manner with respect to one another and in fluid communication with the liquid inlet and the liquid outlet. In some embodiments, the plurality of chambers comprises a first chamber comprising a top surface arranged in fluid communication with the liquid inlet and a bottom surface comprising a plurality of perforations through which vapor can travel. In some embodiments, the plurality of chambers further comprises a second chamber arranged below the first chamber and in fluid communication with the first chamber. In certain cases, the second chamber comprises a plurality of perforations through which vapor can travel. In some embodiments, the condenser apparatus comprises a vapor inlet arranged in fluid communication with the plurality of chambers and with a source of a vapor mixture comprising a condensable fluid in vapor phase and/or a non-condensable gas. In some cases, the condenser apparatus comprises a vapor outlet arranged in fluid communication with the plurality of chambers. In certain embodiments, the first and second chambers are arranged such that the stream of the liquid comprising the condensable fluid in liquid phase flows across the length of the first chamber in a first direction and across the length of the second chamber in a second, opposing direction. In certain embodiments, the condenser apparatus is configured to remove at least a portion of the condensable fluid from the vapor mixture to produce a condenser outlet stream comprising the condensable fluid in liquid phase.

In some embodiments, a humidifier apparatus comprises a vessel comprising a liquid inlet for receiving a stream of a liquid comprising a condensable fluid in liquid phase, a liquid outlet, and a plurality of chambers arranged in a vertical manner with respect to one another and in fluid communication with the liquid inlet and the liquid outlet. In some embodiments, the plurality of chambers comprises a first chamber comprising a top surface arranged in fluid communication with the liquid inlet and a bottom surface comprising a plurality of perforations through which vapor can travel. In some embodiments, the plurality of chambers further comprises a second chamber arranged below the first chamber and in fluid communication with the first chamber. In certain cases, the second chamber comprises a plurality of perforations through which vapor can travel. In some embodiments, the humidifier apparatus comprises a vapor inlet arranged in fluid communication with the plurality of chambers and with a source of a vapor mixture comprising a condensable fluid in vapor phase and/or a non-condensable gas. In some cases, the humidifier apparatus comprises a vapor outlet arranged in fluid communication with the plurality of chambers. In certain embodiments, the first and second chambers are arranged such that the stream of the liquid comprising the condensable fluid in liquid phase flows across the length of the first chamber in a first direction and across the length of the second chamber in a second, opposing direction. In certain embodiments, the humidifier apparatus is configured to produce a vapor-containing humidifier outlet stream enriched in the condensable fluid in vapor phase relative to the vapor mixture received from the vapor inlet.

In some embodiments, a condenser apparatus is provided comprising a vessel comprising a liquid inlet for receiving a stream of a liquid comprising a condensable fluid in liquid phase, a liquid outlet, and a plurality of chambers arranged in a vertical manner with respect to one another and in fluid communication with the liquid inlet and the liquid outlet. In certain cases, each chamber has an aspect ratio of at least 1.5. In some embodiments, the plurality of chambers comprises a first chamber comprising a top surface arranged in fluid communication with the liquid inlet and a bottom surface comprising a plurality of perforations through which vapor can travel, and a second chamber arranged below the first chamber and in fluid communication with the first chamber, the second chamber comprising a plurality of perforations through which vapor can travel. In some embodiments, the condenser apparatus comprises a liquid layer positioned in contact with the liquid outlet. In certain cases, the liquid layer comprises an amount of the liquid comprising the condensable fluid. In certain embodiments, the condenser apparatus comprises a vapor distribution region positioned below the plurality of chambers. In some cases, the vapor distribution region comprises a vapor inlet in fluid communication with a source of a vapor mixture comprising a condensable fluid in vapor phase and/or a non-condensable gas. In some embodiments, the condenser apparatus comprises a vapor outlet arranged in fluid communication with the plurality of chambers. In some embodiments, each of the first chamber and the second chamber comprises a first weir and a second weir positioned along a bottom surface of the first or second chamber. In some cases, the first weir and second weir each have a height that is less than the height of the first or second chamber. In some cases, the first and second weirs are arranged such that the stream of the liquid comprising the condensable fluid in liquid phase flows across the chamber from the first weir to the second weir. In some embodiments, the first and second chambers are arranged such that the stream of the liquid comprising the condensable fluid in liquid phase flows across the length of the first chamber in a first direction and across the length of the second chamber in a second, opposing direction. In certain embodiments, the condenser apparatus is configured to remove at least a portion of the condensable fluid from the vapor mixture to produce a condenser outlet stream comprising the condensable fluid in liquid phase.

In some embodiments, a humidifier apparatus is provided comprising a vessel comprising a liquid inlet for receiving a stream of a liquid comprising a condensable fluid in liquid phase, a liquid outlet, and a plurality of chambers arranged in a vertical manner with respect to one another and in fluid communication with the liquid inlet and the liquid outlet. In certain cases, each chamber has an aspect ratio of at least 1.5. In some embodiments, the plurality of chambers comprises a first chamber comprising a top surface arranged in fluid communication with the liquid inlet and a bottom surface comprising a plurality of perforations through which vapor can travel, and a second chamber arranged below the first chamber and in fluid communication with the first chamber, the second chamber comprising a plurality of perforations through which vapor can travel. In some embodiments, the humidifier apparatus comprises a liquid layer positioned in contact with the liquid outlet. In certain cases, the liquid layer comprises an amount of the liquid comprising the condensable fluid. In certain embodiments, the humidifier apparatus comprises a vapor distribution region positioned below the plurality of chambers. In some cases, the vapor distribution region comprises a vapor inlet in fluid communication with a source of a vapor mixture comprising a condensable fluid in vapor phase and/or a non-condensable gas. In some embodiments, the humidifier apparatus comprises a vapor outlet arranged in fluid communication with the plurality of chambers. In some embodiments, each of the first chamber and the second chamber comprises a first weir and a second weir positioned along a bottom surface of the first or second chamber. In some cases, the first weir and second weir each have a height that is less than the height of the first or second chamber. In some cases, the first and second weirs are arranged such that the stream of the liquid comprising the condensable fluid in liquid phase flows across the chamber from the first weir to the second weir. In some embodiments, the first and second chambers are arranged such that the stream of the liquid comprising the condensable fluid in liquid phase flows across the length of the first chamber in a first direction and across the length of the second chamber in a second, opposing direction. In certain embodiments, the humidifier apparatus is configured to produce a vapor-containing humidifier outlet stream enriched in the condensable fluid in vapor phase relative to the vapor mixture received from the vapor inlet.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
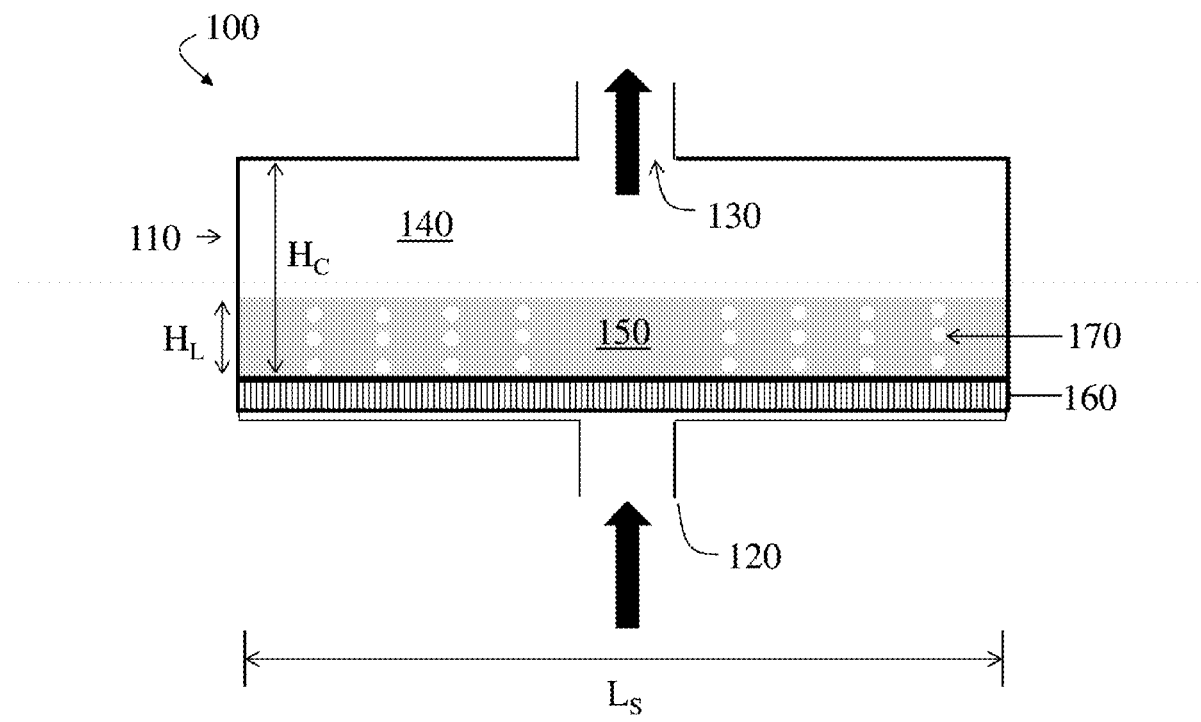
FIG. 1A shows, according to some embodiments, an exemplary cross-sectional schematic illustration of a single-stage bubble column condenser.

Embodiments described herein provide condensing apparatuses (e.g., bubble column condensers) and their use in various heat and mass exchange systems. For example, the condensing apparatuses may be useful in systems for purification of water (e.g., desalination systems). In some cases, the condensing apparatuses allow for simplified, lower cost systems with improved performance, such as improved heat and mass exchange between gas and liquid phases. It should be noted that while the apparatuses described herein are generally referred to as condensing apparatuses or condensers, the apparatuses may, in some cases, be used for humidification. For example, certain of the embodiments described herein may relate to bubble column humidifiers.

In some cases, the condensers may advantageously allow for a reduced number of components, a reduced amount of material (e.g., heat transfer surface area) within a system, a reduced cost of components, and/or components having reduced dimensions. For example, a system may include a component containing an amount of a liquid at a certain height, and incorporation of condensers described herein may allow for a reduction in the amount, and, hence, height, of the liquid within the component. In some cases, reducing the amount of liquid within the system may allow for more simplified components having reduced dimensions with similar or, in some cases, improved performance relative to larger systems. For example, a component may be useful in facilitating heat transfer between gas and liquid phases within the condenser. Incorporation of such components having reduced dimensions (e.g., height, stage spacing, etc.) within a single condenser may allow for use of a greater number of components within a given condenser, resulting in increased heat and mass exchange between the gas and liquid phases. Additionally, the amount of materials required to construct condensers described herein may be reduced, thereby reducing cost of fabrication. Further, in certain embodiments of the condensers described herein, heat and mass transfer occurs through bubbles of a gas or gas mixture (e.g., heat and mass may be transferred from bubbles of a gas or gas mixture comprising a condensable fluid in vapor phase to a liquid bath of the condensable fluid through a condensation process). The use of gas bubbles rather than, for example, metallic surfaces (e.g., titanium tubes) for heat and mass transfer may advantageously reduce the fabrication cost of the condensers. Further, the use of gas bubbles may increase the amount of surface area available for heat and mass transfer, thereby resulting in an advantageous increase in the thermodynamic effectiveness of the bubble column condensers.

In some cases, condensers described herein may advantageously exhibit a reduced pressure drop across the condenser. That is, the pressure at an inlet of the condenser may be substantially the same as (e.g., less than 10% variation from) the pressure at an outlet of the condenser. For example, the pressure of a fluid (e.g., vapor) entering an inlet of the condenser may be substantially the same as the pressure of the fluid exiting an outlet of the condenser. Reduction of the pressure drop across the condenser may be advantageous in that a relatively smaller pump, requiring less power and cost to operate, may be used to pump fluids through the condenser.

Condensers described herein may, in some embodiments, exhibit improved heat transfer properties, a characteristic that may be particularly advantageous in cases where the material passing through the condenser includes a non-condensable gas. Non-condensable gases generally refer to any gas that does not condense into a liquid phase under the operating conditions of the condenser. Examples of non-condensable gases include, but are not limited to, air, nitrogen, oxygen, and helium. In some cases, the condenser may be configured such that heat transfer rates are improved for mixtures including a non-condensable gas.

Typically, the condenser may be configured to receive a condenser liquid inlet stream and to deliver a condenser liquid outlet stream to another component within a system. The condenser may also be configured to receive a gas or gas mixture via at least one inlet and to deliver a gas or gas mixture via an outlet to another component within the system. In some embodiments, the gas or gas mixture may comprise a vapor mixture (e.g., a condensable fluid in vapor phase and/or a non-condensable gas). In some cases, the gas or gas mixture entering the condenser may have a different composition than the gas or gas mixture exiting the condenser. For example, the gas or gas mixture entering the condenser may include a particular fluid (e.g., a condensable fluid), a portion of which may be removed in the condenser such that the exiting gas or gas mixture has a relatively decreased amount of the fluid. In some embodiments, the fluid may be removed from the gas or gas mixture via a condensation process. In some cases, the condenser may be a bubble column condenser, wherein vapors are condensed in a column of relatively cold liquid. In some embodiments, the bubble column condenser comprises at least one stage within which a gas or gas mixture is treated such that one or more components of the gas or gas mixture is removed. For example, the gas or gas mixture may include a condensable fluid in vapor phase, and recovery of the condensable fluid (e.g., in liquid form) may be performed within the at least one stage of the bubble column condenser. A condensable fluid generally refers to a fluid that is able to condense from gas phase to liquid phase under the operating conditions of the condenser.

FIG. 1A shows an exemplary cross-sectional diagram of a single-stage bubble column condenser. As shown in FIG. 1A, bubble column condenser 100 includes stage 110, which includes inlet 120, outlet 130, and chamber 140 (e.g. as provided by a containing vessel). Liquid layer 150, which comprises a condensable fluid in a liquid phase, resides in chamber 140. As an illustrative embodiment, the condensable fluid may be water. Liquid layer 150 may, in some embodiments, have a height $H_L$ that is relatively low (e.g., about 0.1 m or less). Height $H_L$ may be less than a height $H_C$ of chamber 140. In some cases, the portion of chamber 140 that is not occupied by liquid layer 150 comprises a vapor distribution region. Inlet 120 is in fluid communication with a source of a gas or gas mixture containing a condensable fluid in a vapor phase. In some embodiments, the gas may further contain one or more non-condensable gases. For example, the gas may include humidified air. Inlet 120 may also be coupled to bubble generator 160 such that gas entering inlet 120 is fed into bubble generator 160. As discussed in further detail below, the bubble generator may comprise a sparger plate comprising a plurality of holes. Bubble generator 160 may be in fluid communication with chamber 140 and/or may be arranged within chamber 140. In some cases, bubble generator 160 forms the bottom surface of chamber 140.

In some cases, inlets and/or outlets within the column may be provided as separate and distinct features (e.g., inlet 120 in FIG. 1A). In some cases, inlets and/or outlets within the column may be provided by certain components such as the bubble generator, sparger plate, and/or any other features which establish fluid communication between components of the column and/or system. For example, the "inlet" of a particular stage of the column may be provided as the plurality of holes of a sparger plate. For example, a gas or gas mixture travelling between a first and second stage may enter the second stage via an "inlet" provided by holes of a sparger plate.

When the bubble column condenser is in operation, the gas or gas mixture flows through inlet 120 to bubble generator 160, producing gas bubbles 170 that contain the gas or gas mixture and travel through liquid bath (e.g., liquid layer) 150. The temperature of liquid bath 150 may be maintained lower than the temperature of gas bubbles 170, resulting in transfer of heat and mass from gas bubbles 170 to liquid bath 150 through a condensation process. After passing through liquid bath 150, the gas or gas mixture, which has been at least partially dehumidified, may enter the vapor distribution region (e.g., the portion of chamber 140 that is not occupied by liquid bath 150). In some cases, the gas or gas mixture may be substantially homogeneously distributed throughout the vapor distribution region. The gas or gas mixture may then proceed to exit the bubble column condenser through outlet 130. In an exemplary embodiment, a gas mixture containing water and air may be passed through bubble column condenser 100 such that gas bubbles 170 are formed containing both water in vapor form and air. Upon contact with liquid bath 150, water may then be condensed and transferred to liquid bath 150, thereby producing a dehumidified gas that exits bubble column condenser 100 via outlet 130.

In some embodiments, the pressure of the gas or gas mixture at inlet 120 is substantially the same as the pressure of the gas or gas mixture at outlet 130. In some embodiments, the pressure of the gas or gas mixture at inlet 120 differs from the pressure of the gas or gas mixture at outlet 130 by about 1 kPa or less. In some embodiments, the pressure of the gas or gas mixture at inlet 120 is less than about 1 kPa larger than the pressure of the gas or gas mixture at outlet 130.

Figure 8:
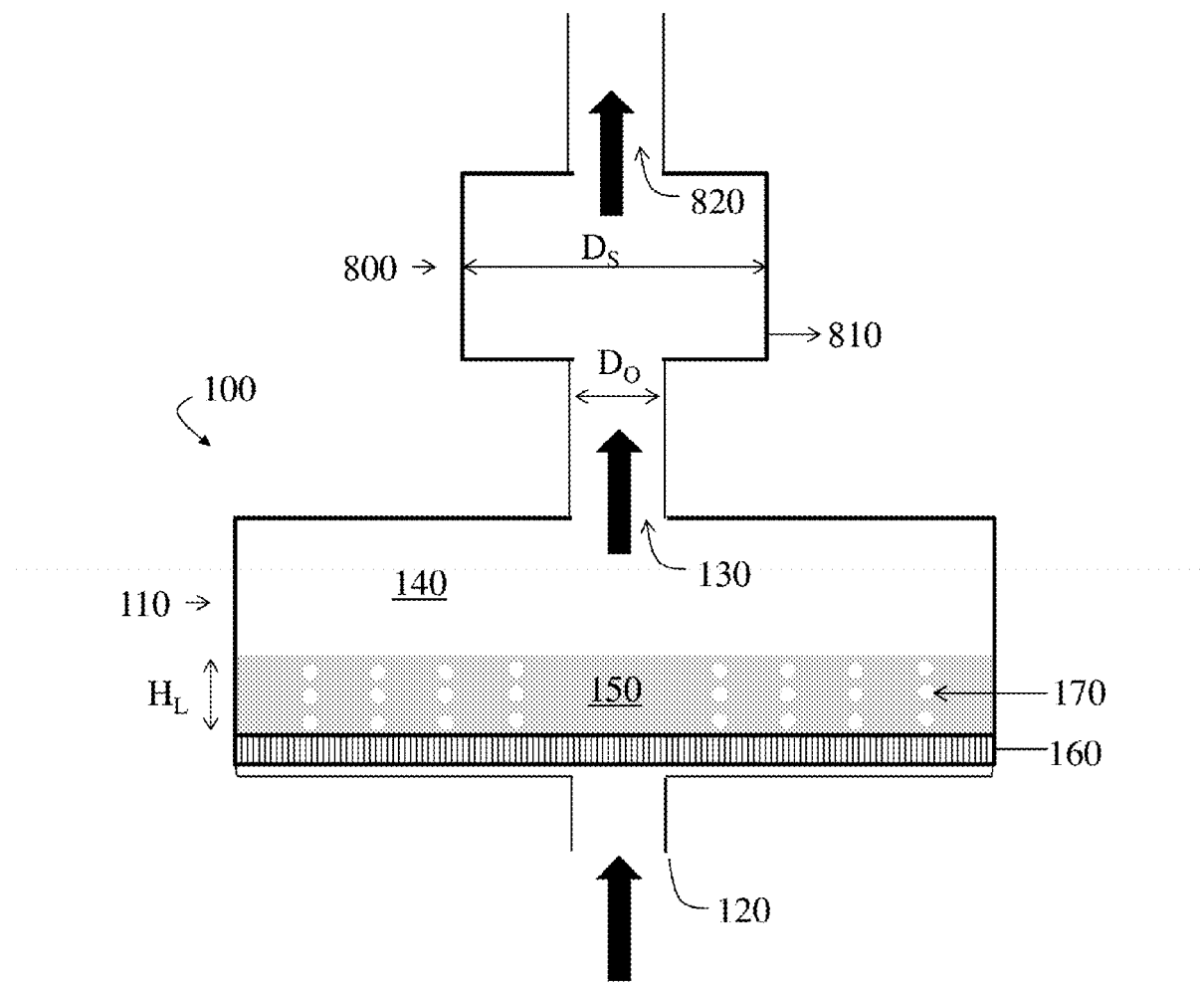
FIG. 8 shows an exemplary cross-sectional schematic illustration of a single-stage bubble column condenser comprising a stack to reduce or eliminate droplet entrainment, according to some embodiments.

As shown in FIG. 8, bubble column condenser 100 may further comprise an optional stack 800 in fluid communication with outlet 130. Stack 800 may be added, for example, to reduce or eliminate droplet entrainment (e.g., droplets of liquid from liquid bath 150 flowing out of outlet 130 with the dehumidified gas). In certain embodiments, bubble column condenser 100 may comprise an optional droplet eliminator (not shown in FIG. 8). The droplet eliminator may, for example, comprise a mesh extending across the cross section of bubble column condenser 100. In operation, entrained liquid droplets may collide with the mesh and return to liquid bath 150. In some cases, reducing or eliminating droplet entrainment may advantageously increase the amount of purified water recovered from bubble column condenser 100 (e.g., by reducing the amount of purified water that exits bubble column condenser 100 into the ambient air). In certain embodiments, reducing or eliminating droplet entrainment may increase the amount of purified water recovered from bubble column condenser 100 by at least about 1%, at least about 5%, at least about 10%, at least about 15%, at least about 20%, at least about 30%, at least about 40%, at least about 50%, or at least about 60%. In some cases, reducing or eliminating droplet entrainment may increase the amount of purified water recovered from bubble condenser 100 by an amount in the range of about 1% to about 10%, about 1% to about 20%, about 1% to about 40%, about 1% to about 60%, about 5% to about 20%, about 5% to about 40%, about 5% to about 60%, about 10% to about 20%, about 10% to about 30%, about 10% to about 40%, about 10% to about 50%, about 10% to about 60%, about 20% to about 30%, about 20% to about 40%, about 20% to about 50%, about 20% to about 60%, about 30% to about 40%, about 30% to about 50%, about 30% to about 60%, about 40% to about 50%, about 40% to about 60%, or about 50% to about 60%.

In some cases, stack 800 has a largest cross-sectional dimension (e.g., length, diameter) $D_s$ that is greater than the largest cross-sectional dimension $D_o$ of outlet 130. In certain embodiments, largest cross-sectional dimension $D_s$ is at least about 0.01 m, at least about 0.02 m, at least about 0.05 m, at least about 0.1 m, at least about 0.2 m, at least about 0.5 m, at least about 1 m, at least about 2 m, or at least about 5 m greater than the largest cross-sectional dimension $D_o$ of outlet 130. In some embodiments, largest cross-sectional dimension $D_s$ is greater than largest cross-sectional dimension $D_o$ by an amount in the range of about 0.01 m to about 0.05 m, about 0.01 m to about 0.1 m, about 0.01 m to about 0.5 m, about 0.01 m to about 1 m, about 0.01 m to about 5 m, about 0.1 m to about 0.5 m, about 0.1 m to about 1 m, about 0.1 m to about 5 m, about 0.5 m to about 1 m, about 0.5 m to about 5 m, or about 1 m to about 5 m. Without wishing to be bound by a particular theory, increasing the largest cross-sectional dimension of a conduit through which the dehumidified gas stream flows may reduce the velocity of the dehumidified gas stream. As a result, any liquid droplets that may be present in the dehumidified gas stream may fall out of the dehumidified gas stream and return to liquid bath 150 instead of exiting bubble column condenser 100 through outlet 130.

In some embodiments, the bubble column condenser comprises at least two stages for recovery of a condensable fluid from a gas or gas mixture. For example, the stages may be arranged such that a gas or gas mixture flows sequentially from the first stage to the second stage. In some cases, the stages may be arranged in a vertical fashion, e.g., a first stage positioned below a second stage within the condenser. In some cases, the stages may be arranged in a horizontal fashion, e.g., a first stage positioned to the right of a second stage. The presence of multiple stages within a bubble column condenser may, in certain cases, advantageously lead to higher recovery of the condensable fluid in liquid phase. For example, the presence of multiple stages may provide numerous locations wherein the gas or gas mixture may be treated to recover the condensable fluid. That is, the gas or gas mixture may travel through more than one liquid bath (e.g., liquid layer) in which at least a portion of the gas or gas mixture undergoes condensation. Additionally, in some embodiments, the use of multiple stages can produce a condenser liquid outlet stream having increased temperature (e.g., relative to the condenser liquid input stream), as described more fully below. This may be advantageous in systems where heat from the condenser liquid outlet stream is transferred to a separate stream within the system, such as an evaporator/humidifier input stream. In such cases, the ability to produce a heated condenser liquid outlet stream can increase energy effectiveness of the system. Additionally, use of multiple stages may also enable greater flexibility for fluid flow within the system. For example, extraction and/or injection of fluids from intermediate bubble column stages may occur via intermediate exchange conduits.

Figure 2A:
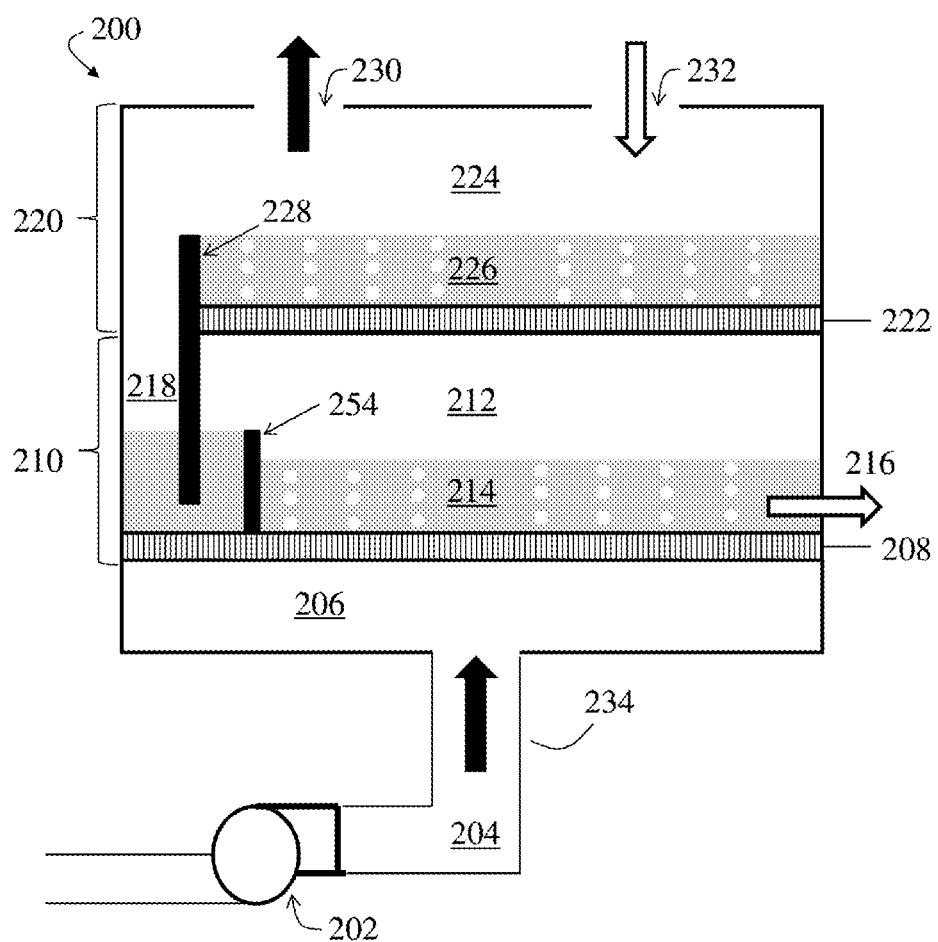
FIG. 2A shows an exemplary cross-sectional schematic illustration of a two-stage bubble column condenser without an intermediate gas inlet, according to some embodiments.

FIG. 2A shows an exemplary cross-sectional diagram of a multi-stage bubble column condenser. In FIG. 2A, bubble column condenser 200 comprises first stage 210 and second stage 220 arranged vertically above first stage 210. First stage 210 includes chamber 212, liquid layer 214 positioned within chamber 212, and first inlet 234 for a first gas or gas mixture comprising a condensable fluid in a vapor phase. First stage 210 also includes a first vapor distribution region, which is located above liquid layer 214 (e.g., the portion of chamber 212 that is not occupied by liquid layer 214). Additionally, first stage 210 comprises liquid outlet 216 for exit of a condensed liquid output stream from condenser 200. First inlet 234, which is in fluid communication with a source of the first gas or gas mixture, is also coupled to bubble generator 208 such that the first gas or gas mixture entering inlet 234 is fed into bubble generator 208. The first gas or gas mixture may be delivered to inlet 234 by pump 202 through conduit 204 from a source of the first gas or gas mixture fluidly connected to condenser 200. In some embodiments, first gas inlet 234 and/or bubble generator 208 occupy the entire bottom surface of first stage 210 or chamber 212. In other embodiments, first gas inlet 234 and/or bubble generator 208 occupy a smaller portion of the bottom surface of first stage 210 or chamber 212.

Second stage 220 is in fluid communication with first stage 210 and includes chamber 224, liquid layer 226 positioned within chamber 224, and bubble generator 222, which is arranged to receive the first gas or gas mixture from first stage 210. Second stage 220 also includes second stage liquid inlet 232, which is in fluid communication with a source of the condensable fluid in liquid phase and delivers the condensable fluid to liquid layer 226. Additionally, second stage 220 comprises gas outlet 230, through which a bubble column condenser gas outlet stream may exit. Second stage 220 also comprises a second vapor distribution region located above liquid layer 226 (e.g., the portion of chamber 224 that is not occupied by liquid layer 226).

Conduit/downcomer 218 is positioned between first stage 210 and second stage 220, providing a path for any overflowing condensable fluid (e.g., from liquid layer 226) to travel from second stage 220 to liquid layer 214 in first stage 210. The maximum height of liquid layer 226 is set by weir 228, such that any additional condensable fluid of liquid layer 226 above that maximum height flows through conduit/downcomer 218 to liquid layer 214 in first stage 210. The outlet of conduit/downcomer 218 is submerged in liquid layer 214, such the first gas or gas mixture flowing through first stage 210 is prevented from entering conduit/downcomer 218. In some cases, first stage 210 further comprises optional weir 254. Optional weir 254 may establish a height of liquid surrounding conduit/downcomer 218 that is higher than the height of liquid layer 214 in first stage 210. It has been recognized that it may be advantageous for the height of liquid surrounding conduit/downcomer 218 to be higher than the height of liquid layer 214, as such a configuration may result in the hydrostatic head of liquid that the first gas or gas mixture has to overcome being higher in the liquid around conduit/downcomer 218 than in liquid layer 214. Such a configuration may thus prevent the first gas or gas mixture from flowing through conduit/downcomer 218 and thereby bypassing bubble generator 222.

Optional vapor distribution chamber 206 may be positioned below first stage 210 and may allow the first gas or gas mixture to be distributed along the bottom surface of bubble generator 208. Those of ordinary skill in the art would be capable of selecting the appropriate system configuration for use in a particular application.

In operation, a first gas or gas mixture (provided by a source of gas not pictured in FIG. 2) containing a condensable fluid is pumped by pump 202 through conduit 204 to optional vapor distribution chamber 206, where the first gas or gas mixture is substantially homogeneously distributed along the bottom surface of first stage 210 to first stage gas inlet 234 and bubble generator 208. As the first gas or gas mixture travels through bubble generator 208, gas bubbles are formed. The gas bubbles travel through liquid layer 214, which is maintained at a temperature below that of the gas bubbles. The gas bubbles undergo a condensation process and transfer heat and/or mass of the condensable fluid to liquid layer 214. For example, the condensable fluid may be water, such that the gas bubbles are at least partially dehumidified as they travel through liquid layer 214. Bubbles of the at least partially dehumidified gas then enter the first vapor distribution region. The at least partially dehumidified gas may, in some cases, be substantially homogenously distributed throughout the first vapor distribution region. The at least partially dehumidified gas then enters bubble generator 222, where gas bubbles of the at least partially dehumidified gas are formed. Bubbles of the at least partially dehumidified gas then travel through liquid layer 226, which is maintained at a temperature below that of the gas bubbles, and heat and mass of the condensable fluid are transferred to liquid layer 226. Bubbles of the further dehumidified gas then enter the second vapor distribution region. The further dehumidified gas may, in some cases, be substantially homogeneously distributed throughout the second vapor distribution region. The further dehumidified gas then exits the bubble column condenser through second stage outlet 230 as a bubble column condenser gas outlet stream.

In some embodiments, a stream of condensable fluid in liquid phase flows in the opposite direction as (i.e., counterflow to) the gas or gas mixture. For example, condensable liquid can enter bubble column condenser 200 through second stage liquid inlet 232, which is in fluid communication with a source of the condensable fluid in liquid phase. The condensable liquid is first delivered to liquid layer 226, which has a maximum height specified by weir 228. If the height of liquid layer 226 exceeds the maximum height, an amount of condensable liquid may spill over the top of the weir through conduit/downcomer 218 to liquid layer 214 and exit the condenser via condenser liquid outlet 216. The temperature of the condenser liquid outlet stream may be greater than that of the condensable liquid entering the condenser at second stage liquid inlet 232, as the condensable liquid is passed through various stages within the condenser. In some cases, heat is transferred to the condensable liquid at each of the stages within the bubble column condenser. In some cases, as the number of stages through which the condensable fluid passes increases, the temperature of the condenser liquid outlet stream increases. Such a configuration may be advantageous in systems where heat from the condenser liquid outlet stream is transferred to another component within the system. In some cases, the heat transfer may occur at a location within the system that is not within the condenser. For example, heat from the condenser liquid outlet stream may be transferred to a humidifier input stream within a humidifier and/or a heat exchanger in fluid communication with the condenser.

Figure 2B:
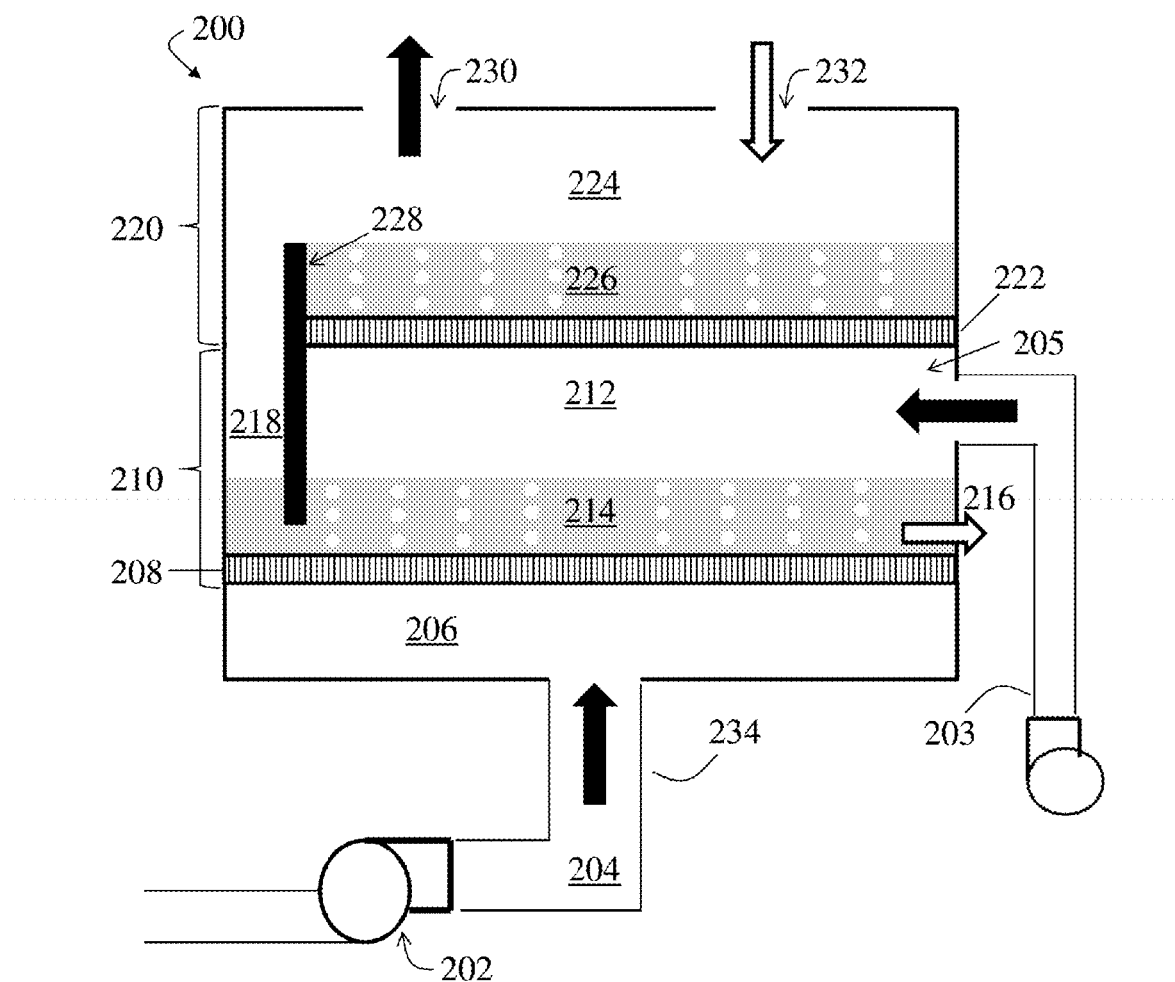
FIG. 2B shows an exemplary cross-sectional schematic illustration of a two-stage bubble column condenser with an intermediate gas inlet, according to some embodiments.

As shown in FIG. 2B, bubble condenser 200 can further comprise an optional second inlet 205. Optional second inlet 205 may be in fluid communication with a source of a second gas or gas mixture, and the second gas or gas mixture may be delivered to inlet 205 via optional conduit 203. The second gas or gas mixture may comprise a condensable fluid in vapor phase. In certain cases, the condensable fluid may be water. The second gas or gas mixture may, in some embodiments, further comprise one or more non-condensable gases (e.g., air).

In some embodiments, a bubble column condenser may comprise at least one vapor distribution region to allow for introduction of a vapor mixture that contains a condensable fluid in vapor phase and/or a non-condensable gas (e.g., carrier gas). Typically, the vapor distribution region may be selected to have sufficient volume to allow vapors to substantially evenly diffuse over the cross section of the bubble column condenser. In some cases, the vapor distribution chamber may provide sufficient volume to allow entrained droplets from a liquid layer in a stage to return to the liquid layer. In some cases, the vapor distribution region may be positioned at or near a bottom portion of the bubble column condenser. In some cases, the vapor distribution region is positioned between two consecutive or adjacent bubble generating chambers. For example, the vapor distribution region may keep the liquid layers of the two consecutive or adjacent bubble generating chambers separate, thereby increasing the thermodynamic effectiveness of the bubble column condenser. The vapor distribution region may include a vapor inlet in fluid communication with a source of a vapor mixture comprising a condensable fluid in vapor phase and/or a non-condensable gas. In some cases, the bubble column condenser includes more than one vapor distribution region.

In some embodiments, a vapor distribution chamber comprising a vapor distribution region may further comprise a liquid layer (e.g., a sump volume). For example, liquid may collect in the sump volume after exiting the last stage of a bubble column condenser, prior to exiting the bubble column condenser. In some embodiments, the sump volume may be in direct contact with a liquid outlet of the bubble column condenser. In certain cases, the sump volume may be in fluid communication with a pump that pumps liquid out of the bubble column condenser. The sump volume may, for example, provide a positive suction pressure on the intake of the pump, and may advantageously prevent negative (e.g., vacuum) suction pressure that may induce deleterious cavitation bubbles. In some cases, the sump volume may advantageously decrease the sensitivity of the bubble column condenser to sudden changes in heat transfer rates (e.g., due to intermittent feeding of salt-containing water and/or intermittent discharge of pure water).

Figure 2C:
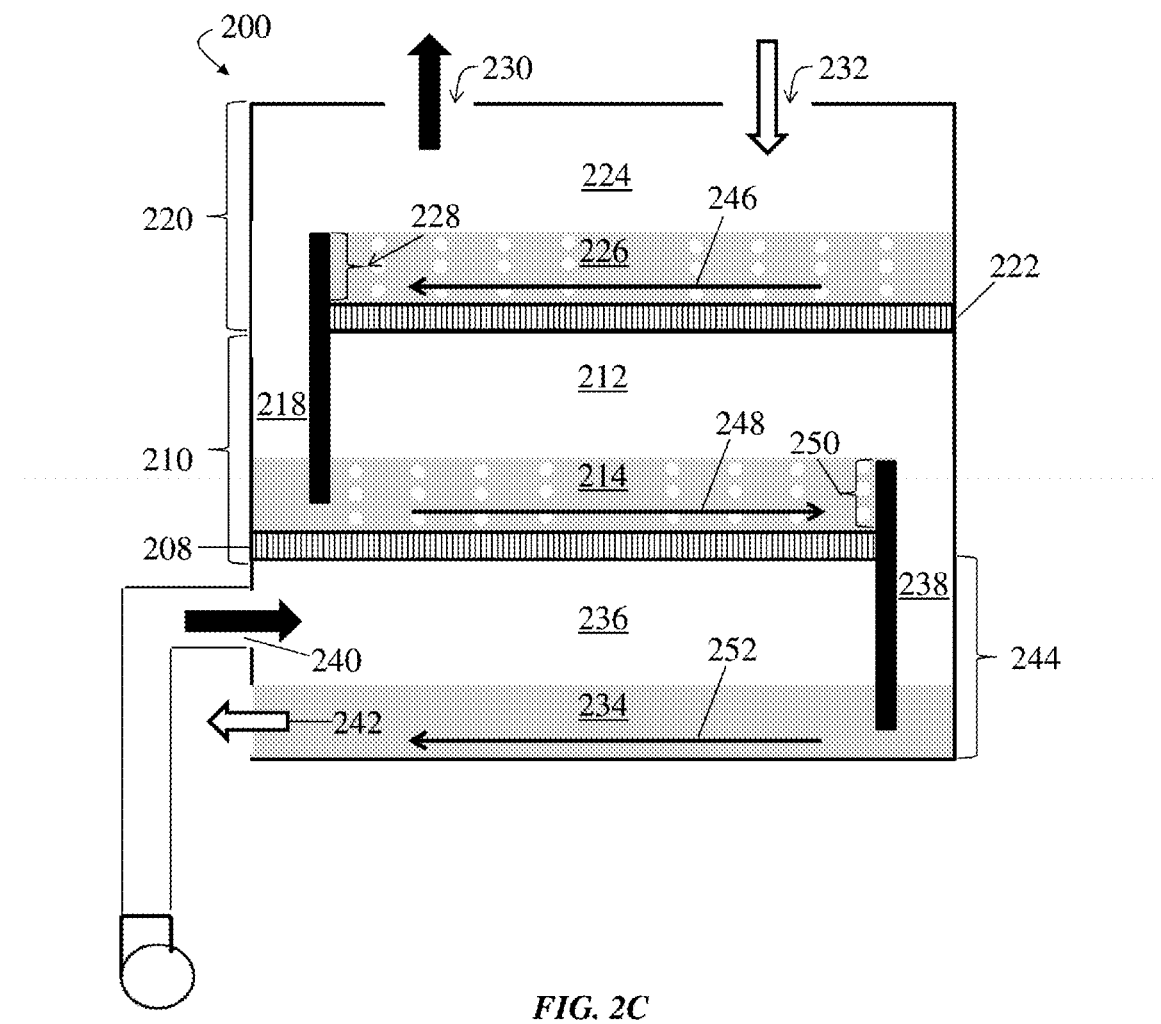
FIG. 2C shows an exemplary cross-sectional schematic illustration of a two-stage bubble column condenser with a vapor distribution chamber, according to some embodiments.

FIG. 2C provides an exemplary illustration of a bubble column condenser containing a vapor distribution region positioned above an amount of a condensable fluid in liquid phase. In FIG. 2C, a bubble column condenser 200 includes a vapor distribution chamber 244, a first stage 210, and a second stage 220. Vapor distribution chamber 244, located at the bottom of condenser 200, includes a liquid layer 234, which may be in direct contact with a liquid outlet 242. Vapor distribution chamber 244 also includes a vapor distribution region 236, which may be positioned above liquid layer 234 and may be in direct contact with a vapor inlet 240 in fluid communication with a source of a vapor mixture (e.g., a gas or gas mixture comprising a condensable liquid in a vapor phase). First stage 210 includes a chamber 212, liquid layer 214 positioned within chamber 212, bubble generator 208, and first liquid inlet 234 for the vapor mixture. First stage 210 also includes a first vapor distribution region located above liquid layer 214 (e.g., the portion of chamber 212 that is not occupied by liquid layer 214). Second stage 220 includes a chamber 224, a liquid layer 226 positioned within chamber 224, a bubble generator 222, a liquid inlet 232 for receiving a stream of the condensable fluid in liquid phase (e.g., the liquid phase), and a vapor outlet 230. Second stage 220 also includes a second vapor distribution region positioned above liquid layer 226 (e.g., the portion of chamber 224 that is not occupied by liquid layer 226).

In operation, a vapor mixture may enter vapor distribution region 236 via vapor inlet 240. In vapor distribution region 236, the vapor mixture may be substantially homogeneously distributed throughout vapor distribution region 236. The vapor mixture may then travel through bubble generator 208, and gas bubbles may form and move through liquid layer 214, which may be maintained at a temperature below that of the gas bubbles. As noted above, the gas bubbles may undergo a condensation process and transfer heat and/or mass from the condensable fluid to liquid layer 214. Bubbles of the at least partially dehumidified vapor mixture may enter the first vapor distribution region, and the at least partially dehumidified vapor mixture may be substantially homogeneously distributed throughout the first vapor distribution region. The at least partially dehumidified vapor mixture may then enter bubble generator 222 and form gas bubbles, which may travel through liquid layer 226. Bubbles of the further dehumidified vapor mixture may then enter the second vapor distribution region, and the further dehumidified vapor mixture may be substantially homogeneously distributed throughout the second vapor distribution region. The vapor mixture may then exit bubble column condenser 200 through vapor outlet 230 as a bubble column condenser gas outlet stream.

Again referring to FIG. 2C, a stream of a condensable fluid in liquid phase may enter second stage 220 via liquid inlet 232. The liquid phase may first enter and be combined with liquid layer 226, which may have a maximum height specified by weir 228. The liquid phase may travel lengthwise across the surface of bubble generator 222, in the direction of arrow 246. If the height of liquid layer 226 exceeds the height of weir 228, excess liquid phase may flow over the top of weir 228 through conduit/downcomer 218 to liquid layer 214. The liquid phase may then flow across the surface of bubble generator 208 in the direction of arrow 248. As shown in FIG. 2C, the direction of arrow 248 may be opposite that of arrow 246. If the height of liquid layer 214 exceeds the height of weir 250, excess liquid phase may flow over the top of weir 250 through conduit/downcomer 238 to liquid layer 234. The liquid phase may then travel across the bottom surface of bottom chamber 244 in the direction of arrow 252 and exit the bubble column condenser via liquid outlet 242. As shown in FIG. 2C, the direction of arrow 252 may be opposite that of arrow 248.

Figure 2D:
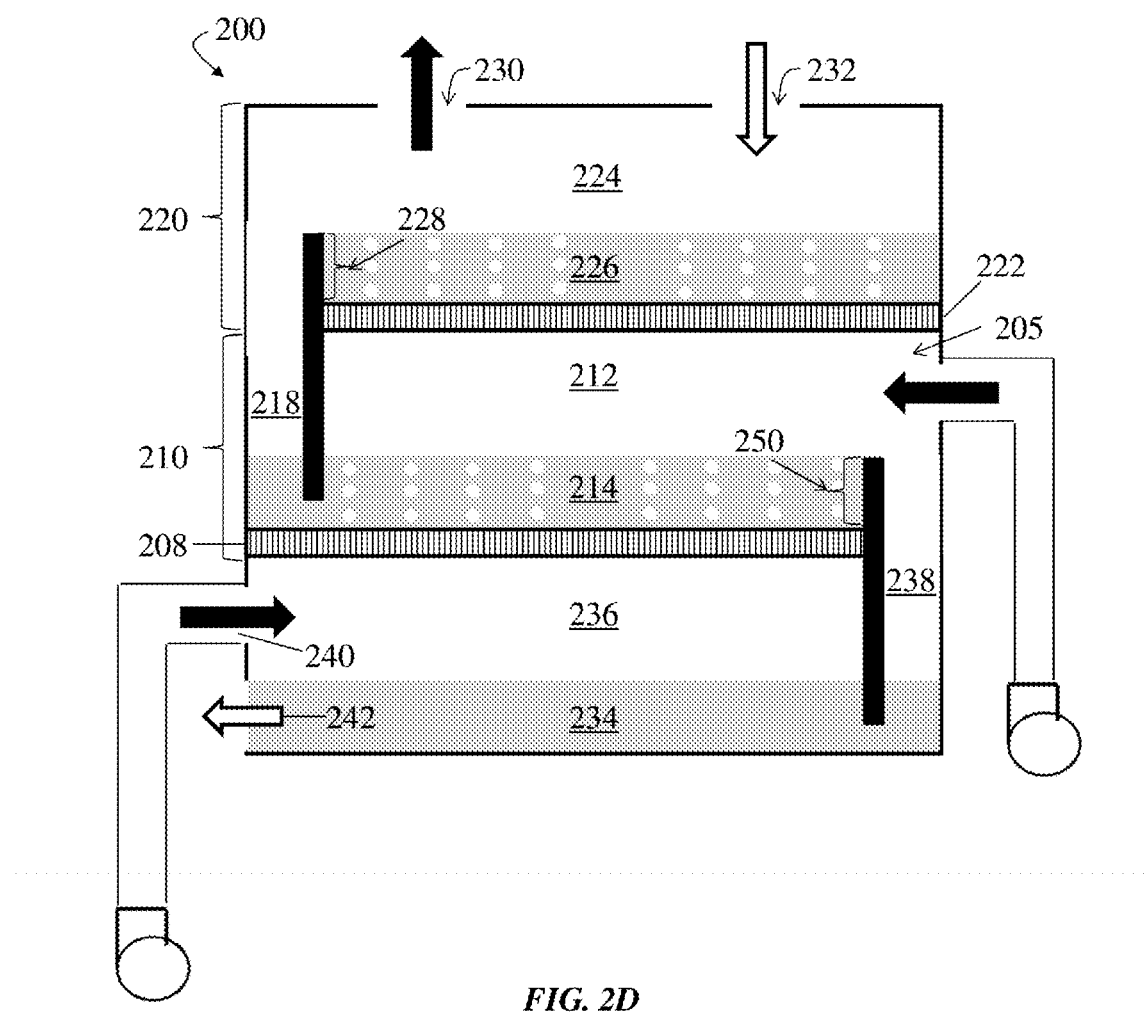
FIG. 2D shows an exemplary cross-sectional schematic illustration of a two-stage bubble column condenser with a vapor distribution chamber and an intermediate gas inlet, according to some embodiments.

Bubble condenser 200 may, in certain cases, further comprise additional vapor inlets. For example, FIG. 2D shows an exemplary illustration of a bubble column condenser 200 comprising a first vapor distribution region 236, which includes a first vapor inlet 240, and a second vapor distribution region 212, which includes a second vapor inlet 205. First vapor inlet 240 may be in fluid communication with a source of a first vapor mixture. Second vapor inlet 205 may be in fluid communication with a source of a second vapor mixture.

In some cases, the first and second gases or gas mixtures may have substantially the same composition. In some cases, the first and second gases or gas mixtures may have different compositions. The first and second gases or gas mixtures may, in certain cases, have different vapor (e.g., water vapor) concentrations. In some embodiments, the first and second gases or gas mixtures may have substantially the same vapor concentration. In some cases, the first and second gases or gas mixtures may be maintained at different temperatures. The difference between the temperature of the first and second gases or gas mixtures may, in certain embodiments, be at least about 1° C., at least about 5° C., at least about 10° C., at least about 20° C., at least about 50° C., at least about 100° C., at least about 150° C., or at least about 200° C. In certain cases, the first and second gases or gas mixtures may be maintained at substantially the same temperature.

It should be understood that the bubble column condenser may have any number of stages. In some embodiments, the bubble column condenser may have at least one, at least two, at least three, at least four, at least five, at least six, at least seven, at least eight, at least nine, or at least ten or more stages. In some embodiments, the bubble column condenser may have no more than one, no more than two, no more than three, no more than four, no more than five, no more than six, no more than seven, no more than eight, no more than nine, no more than ten stages. The stages may be vertically aligned, i.e., the stages may be arranged vertically within the bubble column condenser, as shown in FIG. 2. In some cases, the stages may be arranged such that the bottom surfaces of the individual chambers (or bubble generators) are substantially parallel to one another. In some cases, the stages may be arranged such that the bottom surface of the individual chambers (or bubble generators) are substantially non-parallel to one another. In some embodiments, the stages may be positioned at an angle. The stages may be horizontally aligned, i.e., the stages may be arranged horizontally within the bubble column condenser. In some such embodiments, at least one stage of the bubble condenser may comprise a liquid layer, a vapor distribution region, a bubble generator submerged in the liquid layer, and a gas outlet fluidly connected to a bubble generator of another stage (e.g., an adjacent stage).

Figure 7A:
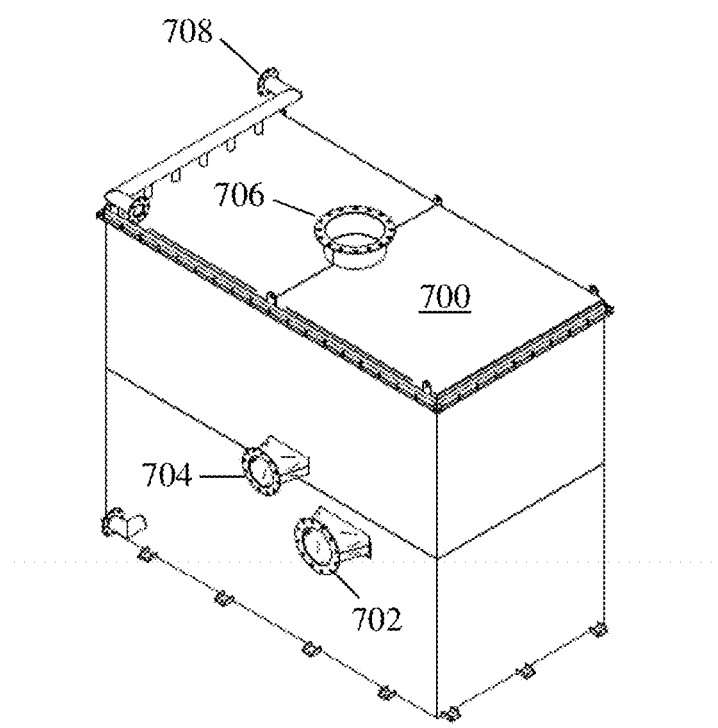
FIG. 7A shows an exemplary embodiment of a multi-stage bubble column condenser in closed isometric view.
Figure 7B:
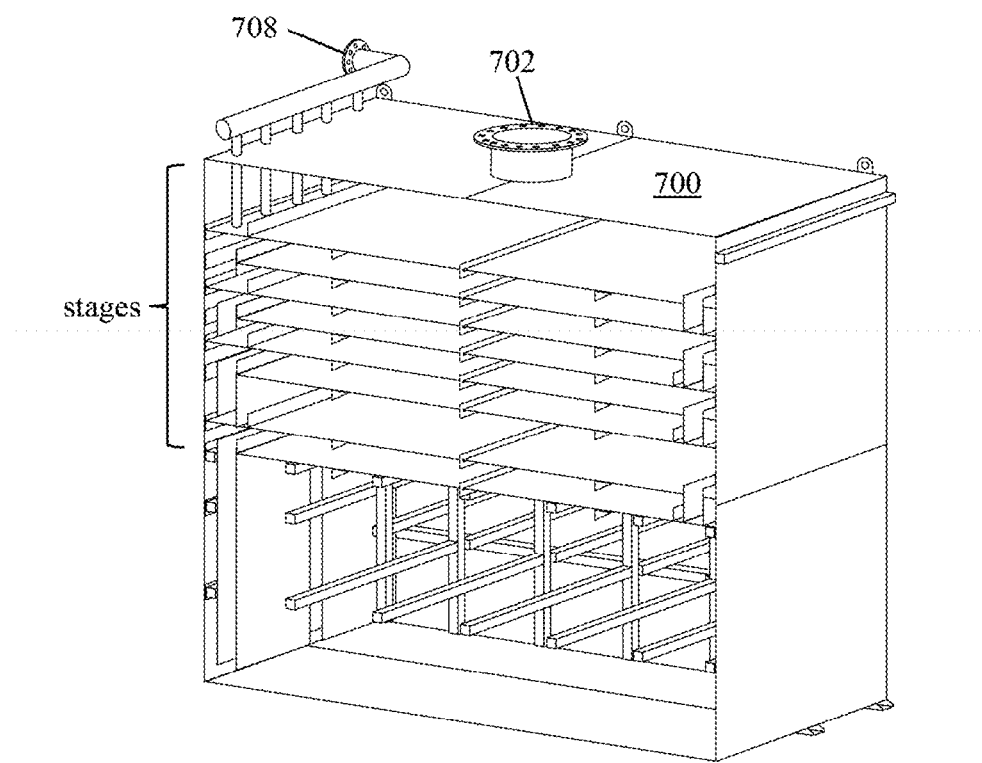
FIG. 7B shows a cross-sectional isometric view of the exemplary embodiment of a multi-stage bubble column condenser shown in FIG. 7A.
Figure 7C:
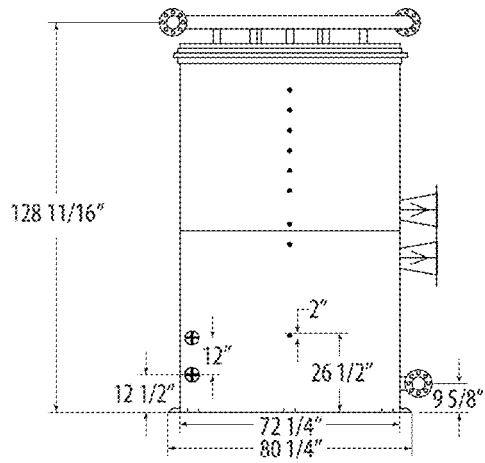
FIGS. 7C-F show two-dimensional side-view or top-view projections of the exemplary embodiment of a multi-stage bubble column condenser shown in FIG. 7A.
Figure 7D:
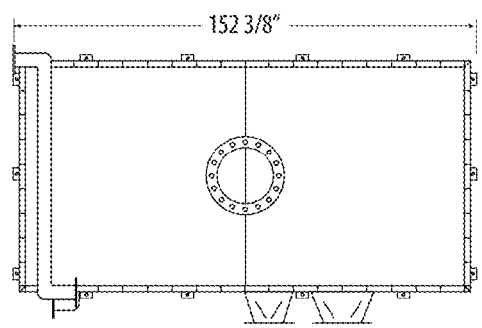
Figure 7E:
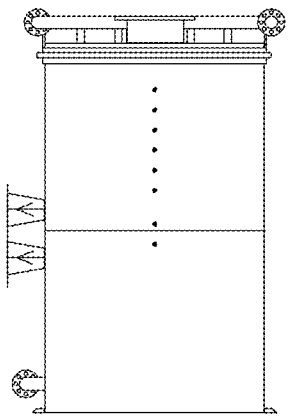
Figure 7F:
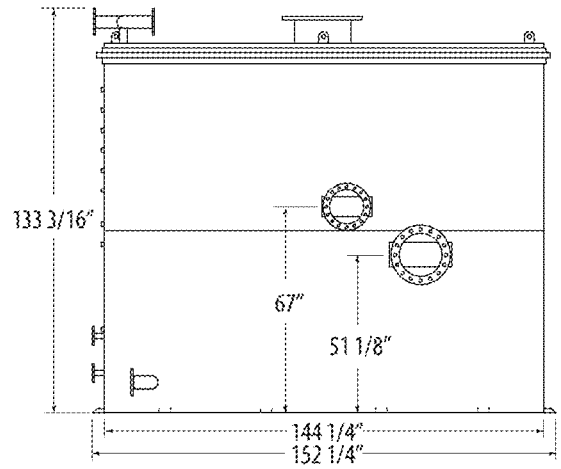
Figure 7G:
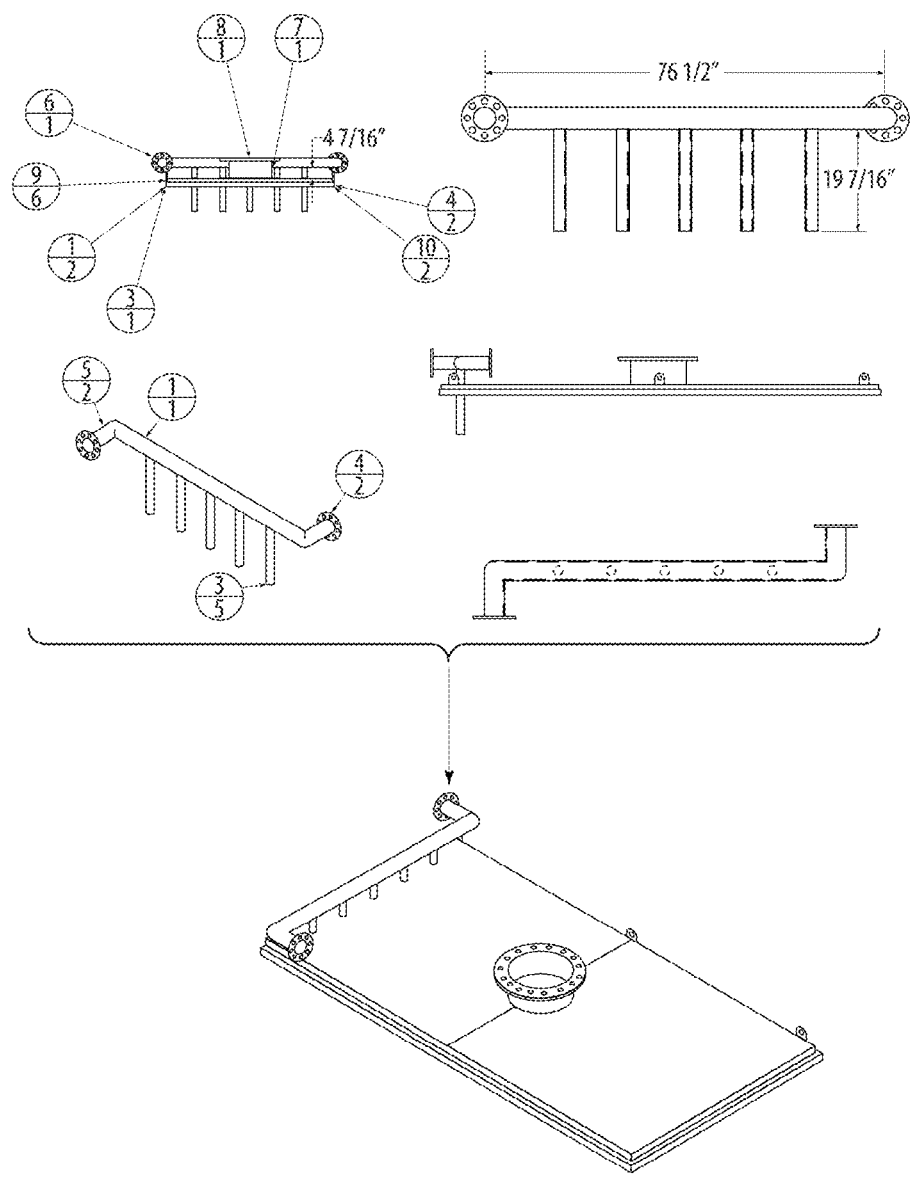
FIG. 7G shows various views of the top surface of the exemplary embodiment of a multi-stage bubble column condenser shown in FIG. 7A.

In some cases, the condenser may be constructed as a modular system such that various components or regions of the system are removable and/or exchangeable. For example, the system may include an area that can accommodate one or more stages, and can be readily configured to include a desired number of stages. FIG. 7B shows an illustrative embodiment where the system includes eight trays, allowing for a capacity for one to eight stages. Each stage can be added or removed by simply sliding the stage in and out of the system. In embodiments such as this, the number and distance between stages may be readily tailored to suit a particular application.

Figure 1B:
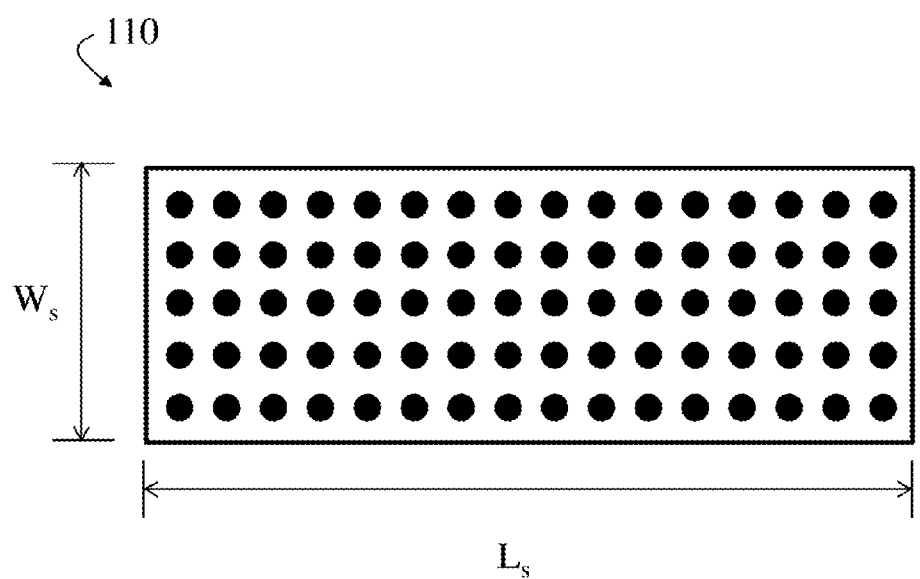
FIG. 1B shows, according to some embodiments, an exemplary top-down view of a stage of a bubble column condenser.

The stages of the condenser may have any shape suitable for a particular application. In some embodiments, at least one stage of the condenser has a cross sectional shape that is substantially circular, substantially elliptical, substantially square, substantially rectangular, and/or substantially triangular. In certain embodiments, each stage of the condenser has a cross sectional shape that is substantially circular, substantially elliptical, substantially square, substantially rectangular, and/or substantially triangular. In some cases, the stages of the condenser have a relatively large aspect ratio. As used herein, the aspect ratio of an individual stage refers to the ratio of the length of the individual stage to the width of the individual stage. The length of an individual stage refers to the largest internal cross-sectional dimension of the stage (e.g., in a plane perpendicular to a vertical axis of the stage). For example, in FIG. 1A, the length of stage 110 is indicated as $L_S$. To further illustrate length, FIG. 1B provides an exemplary top-down view of stage 110 (e.g., looking down on bubble generator 160). That is, FIG. 1B is an exemplary schematic illustration of a plane perpendicular to a vertical axis of stage 110 (e.g., a cross-sectional plane). In FIG. 1B, the length of stage 110 is indicated as $L_S$. The width of an individual stage generally refers to the largest cross-sectional dimension of the stage (e.g., in a plane perpendicular to a vertical axis of the stage) measured perpendicular to the length. In FIG. 1B, the width of stage 110 is indicated as $W_S$.

In some embodiments, at least one stage has an aspect ratio of at least about 1.5, at least about 2, at least about 5, at least about 10, at least about 15, or at least about 20. In some embodiments, at least one stage has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20. In some embodiments, each stage of the condenser has an aspect ratio of at least about 1.5, at least about 2, at least about 5, at least about 10, at least about 15, or at least about 20. In some embodiments, each stage of the condenser has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20.

In some embodiments, the height of the liquid layer within at least one stage of the bubble column condenser is relatively low during substantially continuous operation. Generally, a water desalination system is said to be operated substantially continuously when an aqueous stream is being fed to the desalination system at the same time that a desalinated product stream is being produced by the desalination system. The height of the liquid layer within a stage can be measured from the surface of the bubble generator that contacts the liquid layer to the top surface of the liquid layer. As noted herein, having a relatively low level of liquid phase in at least one stage may, in some embodiments, advantageously result in a low pressure drop between the inlet and outlet of an individual stage. Without wishing to be bound by a particular theory, the pressure drop across a given stage of the condenser may be due, at least in part, to the hydrostatic head of the liquid in the stage that the gas has to overcome. Therefore, the height of the liquid layer in a stage may be advantageously kept low to reduce the pressure drop across that stage.

In some embodiments, during substantially continuous operation of the bubble column condenser, the liquid layer within at least one stage of the condenser has a height of (e.g., the height of condensable fluid within a stage is) less than about 0.1 m, less than about 0.09 m, less than about 0.08 m, less than about 0.07 m, less than about 0.06 m, less than about 0.05 m, less than about 0.04 m, less than about 0.03 m, less than about 0.02 m, less than about 0.01 m, or, in some cases, less than about 0.005 m. In some embodiments, during substantially continuous operation of the bubble column condenser, the liquid layer within each stage of the condenser has a height of less than about 0.1 m, less than about 0.09 m, less than about 0.08 m, less than about 0.07 m, less than about 0.06 m, less than about 0.05 m, less than about 0.04 m, less than about 0.03 m, less than about 0.02 m, less than about 0.01 m, or, in some cases, less than about 0.005 m.

In condensers described herein, the ratio of the height of the liquid layer (e.g., water) in a stage of the condenser to the length of the stage of the condenser may be relatively low. The length of the stage of the condenser generally refers to the largest internal cross-sectional dimension of the stage of the condenser. In some embodiments, the ratio of the height of the liquid layer within at least one stage of the bubble column condenser during steady-state operation to the length of the at least one stage of the condenser is less than about 1, less than about 0.8, less than about 0.6, less than about 0.4, less than about 0.2, less than about 0.18, less than about 0.16, less than about 0.14, less than about 0.12, less than about 0.1, or, in some cases, less than about 0.05. In some embodiments, the ratio of the height of the liquid layer within each stage of the bubble column condenser during steady-state operation to the length of each corresponding stage of the condenser is less than about 1, less than about 0.8, less than about 0.6, less than about 0.4, less than about 0.2, less than about 0.18, less than about 0.16, less than about 0.14, less than about 0.12, less than about 0.1, or, in some cases, less than about 0.05.

In some embodiments, the height of an individual stage within the condenser (e.g., measured vertically from the bubble generator positioned at the bottom of the stage to the top of the chamber within the stage) may be relatively small. As noted above, reducing the height of one or more stages of the condenser may potentially reduce costs and/or potentially increase heat and mass transfer within the system. In some embodiments, the height of at least one stage is less than about 0.5 m, less than about 0.4 m, less than about 0.3 m, less than about 0.2 m, less than about 0.1 m, or, in some cases, less than about 0.05 m. In some embodiments, the height of each stage is less than about 0.5 m, less than about 0.4 m, less than about 0.3 m, less than about 0.2 m, less than about 0.1 m, or, in some cases, less than about 0.05 m. The total height of the condenser column may, in some embodiments, be less than about 10 m, less than about 8 m, less than about 6 m, less than about 4 m, less than about 2 m, less than about 1 m, or, in some cases, less than about 0.5 m.

In some embodiments, the pressure drop across a stage (i.e. the difference between inlet gas pressure and outlet gas pressure) for at least one stage in the bubble column condenser is less than about 2000 Pa, less than about 1500 Pa, less than about 1000 Pa, less than about 800 Pa, less than about 500 Pa, less than about 200 Pa, less than about 100 Pa, or, in some cases, less than about 50 Pa. In some embodiments, the difference between bubble column condenser inlet gas pressure and bubble column condenser outlet gas pressure is less than about 2000 Pa, less than about 1500 Pa, less than about 1000

Pa, less than about 800 Pa, less than about 500 Pa, less than about 200 Pa, less than about 100 Pa, or, in some cases, less than about 50 Pa.

In some embodiments, the bubble column condenser may exhibit improved heat transfer properties. For example, when the bubble column condenser is in substantially continuous operation, the heat transfer coefficient may be at least about 2000 W/(m² K), at least about 3000 W/(m² K), at least about 4000 W/(m² K), or, in some cases, at least about 5000 W/(m² K).

In some cases, the temperature of the condenser liquid inlet stream may be different than the temperature of the condenser liquid outlet stream. For example, during substantially continuous operation of the bubble column condenser, the temperature of the condenser liquid inlet stream may be less than about 100° C., less than about 90° C., less than about 80° C., less than about 70° C., less than about 60° C., less than about 50° C., less than about 45° C., less than about 40° C., less than about 30° C., less than about 20° C., or, in some cases, less than about 10° C. In some cases, the temperature of the condenser liquid inlet stream may range from about 0° C. to about 100° C., from about 10° C. to about 90° C., or from about 20° C. to about 80° C. During substantially continuous operation of the bubble column condenser, the temperature of the condenser liquid outlet stream may be at least about 50° C., at least about 60° C., at least about 70° C., at least about 80° C., at least about 85° C., at least about 90° C., or at least about 100° C. In some cases, the temperature of the condenser liquid outlet stream may range from about 50° C. to about 100° C., from about 60° C. to about 90° C., or from about 60° C. to about 85° C. The difference in inlet and outlet liquid temperature may be at least about 5° C., at least about 10° C., at least about 20° C., or, in some cases, at least about 30° C. In some cases, the difference in inlet and outlet temperature may range from about 5° C. to about 30° C., from about 10° C. to about 30° C., or from about 20° C. to about 30° C.

In some embodiments, the gas or gas mixture may travel through the condenser at a relatively high flow rate. It may be advantageous, in certain embodiments, for gas flow rate to be relatively high since heat and mass transfer coefficients are generally higher at higher gas flow rates. In some embodiments, the gas or gas mixture may have a flow rate of at least about 10 cubic foot per minute (cfm) per square foot (ft²), at least about 20 cfm/ft², at least about 40 cfm/ft², at least about 60 cfm/ft², at least about 80 cfm/ft², at least about 100 cfm/ft², at least about 120 cfm/ft², at least about 140 cfm/ft², at least about 160 cfm/ft², at least about 180 cfm/ft², or, in some cases, at least about 200 cfm/ft². In some embodiments, the gas or gas mixture may have a flow rate in the range of about 10 cfm/ft² to about 200 cfm/ft², about 20 cfm/ft² to about 200 cfm/ft², about 40 cfm/ft² to about 200 cfm/ft², about 60 cfm/ft² to about 200 cfm/ft², about 80 cfm/ft² to about 200 cfm/ft², about 100 cfm/ft² to about 200 cfm/ft², about 120 cfm/ft² to about 200 cfm/ft², about 140 cfm/ft² to about 200 cfm/ft², about 160 cfm/ft² to about 200 cfm/ft², or about 180 cfm/ft² to about 200 cfm/ft².

In some embodiments, the gas or gas mixture may contain a certain amount of water (e.g., may be "humidified") such that, after flowing through the condenser, the gas or gas mixture may be substantially dehumidified relative to the gas or gas mixture prior to flowing through the condenser. At a given set of system conditions, the gas or gas mixture may have a relative humidity. Relative humidity generally refers to the ratio of the partial pressure of water vapor in a mixture of air and water to the saturated vapor pressure of water at a given temperature. In some embodiments, the relative humidity of the gas or gas mixture at at least one gas inlet to the bubble column condenser may be at least about 70%, at least about 80%, at least about 90%, or about 100%. In some embodiments, the relative humidity of the gas at a gas outlet to the bubble column condenser may be less than about 20%, less than about 10%, less than about 5%, or about 0%.

In some embodiments, the bubble column condenser comprises at least one bubble generator. Examples of types of bubble generators include sieve plates, spargers, and nozzle-type bubble generators. In some embodiments, a bubble generator may comprise a plurality of perforations through which vapor can travel. The bubble generators may be operated at various bubble generator speeds, with various features (e.g., holes) used for generation of bubbles, or the like. The selection of bubble generator can affect the size and/or shape of the gas bubbles, thereby affecting heat transfer from the gas bubbles to the condensable fluid in a liquid phase. Those of ordinary skill in the art are capable of selecting the appropriate bubble generator and/or bubble generator conditions in order to produce a particular desired set of gas bubbles. In some embodiments, the bubble generator comprises a sparger plate. It has been recognized that a sparger plate may have certain advantageous characteristics. For example, the pressure drop across a sparger plate may be low. Additionally, the simplicity of the sparger plate may render it inexpensive to manufacture and/or resistant to the effects of fouling. The sparger plate may, in some embodiments, comprise a plurality of holes. In some embodiments, at least a portion of the plurality of holes have a diameter (or smallest cross-sectional dimension of a line passing through the geometric center of the hole for non-circular holes) in the range of about 0.1 mm to about 50 mm, about 0.1 mm to about 25 mm, about 0.1 mm to about 15 mm, or, in some cases, about 1 mm to about 15 mm. In some embodiments, at least a portion of the plurality of holes have a diameter of about 1 mm, about 2 mm, about 3 mm, about 3.2 mm, or, in some cases, about 4 mm. In some cases, the sparger plate may be arranged along the bottom surface of an individual stage within the condenser. In some cases, the surface area of the sparger plate may be selected such that it covers at least approximately 50%, at least approximately 60%, at least approximately 70%, at least approximately 80%, at least approximately 90%, or approximately 100% of a cross-section of the condenser. In some embodiments, the bubble generator comprises one or more perforated pipes. The perforated pipes, which can extend from a central conduit, can feature, for example, a radial, annular, spider-web, or hub-and-spoke configuration through which the gas or gas mixture is pumped from an external source. In some embodiments, at least one bubble generator may be coupled to the inlet of a stage. In some embodiments, a bubble generator is coupled to the inlet of each stage of the bubble column condenser.

The condensers described herein may further include one or more components positioned to facilitate, direct, or otherwise affect flow of a fluid within the condenser. In some embodiments, at least one chamber of at least one stage of the bubble column condenser may include one or more baffles positioned to direct flow of a fluid, such as a stream of the condensable fluid in liquid phase (e.g., water). In certain cases, each chamber of the bubble column condenser may comprise one or more baffles. Suitable baffles for use in embodiments described herein include plate-like articles having, for example, substantially rectangular-shape, as shown by the illustrative embodiments in FIGS. 6 and 7S. Baffles may also be referred to as barriers, dams, or the like.

The baffle, or combination of baffles, may be arranged in various configurations so as to direct the flow of a liquid within the chamber. In some cases, the baffle(s) can be arranged such that liquid travels in a substantially linear path from one end of the chamber to the other end of the chamber (e.g., along the length of a chamber having a substantially rectangular cross-section). In some cases, the baffle(s) can be arranged such that liquid travels in a non-linear path across a chamber, such a path having one or more bends or turns within the chamber. That is, the liquid may travel a distance within the chamber that is longer than the length of the chamber. In some embodiments, one or more baffles may be positioned along a bottom surface of at least one chamber within a bubble column condenser, thereby affecting the flow of liquid that enters the chamber.

In some embodiments, a baffle may be positioned in a manner so as to direct flow of a liquid within a single chamber, e.g., along a bottom surface of a chamber in either a linear or non-linear manner. In some embodiments, one or more baffles may be positioned substantially parallel to the transverse sides (i.e., width) of a chamber having a substantially rectangular cross-sectional shape, i.e., may be a transverse baffle. In some embodiments, one or more baffles may be positioned substantially parallel to the longitudinal sides (i.e., length) of a chamber having a substantially rectangular cross-sectional shape, i.e., may be a longitudinal baffle. In such configurations, one or more longitudinal baffles may direct the flow of liquid along a substantially non-linear path.

In some embodiments, one or more baffles may be positioned in a manner so as to direct flow of a liquid within a single chamber along a path that may promote efficiency of heat and/or mass transfer. For example, a chamber may comprise a liquid entering through a liquid inlet at a first temperature and a gas or gas mixture entering through a bubble generator at a second, different temperature. In certain cases, heat and mass transfer between the liquid and the gas or gas mixture may be increased when the first temperature approaches the second temperature. One factor that may affect the ability of the first temperature to approach the second temperature may be the amount of time the liquid spends flowing through the chamber.

In some cases, it may be advantageous for portions of the liquid flowing through the chamber to spend substantially equal amounts of time flowing through the chamber. For example, heat and mass transfer may undesirably be reduced under conditions where a first portion of the liquid spends a shorter amount of time in the chamber and a second portion of the liquid spends a longer amount of time in the chamber. Under such conditions, the temperature of a mixture of the first portion and the second portion may be further from the second temperature of the gas or gas mixture than if both the first portion and the second portion had spent a substantially equal amount of time in the chamber. Accordingly, in some embodiments, one or more baffles may be positioned in the chamber to facilitate liquid flow such that portions of the liquid flowing through the chamber spend substantially equal amounts of time flowing through the chamber. For example, one or more baffles within the chamber may spatially separate liquid located at the inlet (e.g., liquid likely to have spent a shorter amount of time in the chamber) from liquid located at the outlet (e.g., liquid likely to have spent a longer amount of time in the chamber). In some cases, one or more baffles within the chamber may facilitate liquid flow along flow paths having substantially the same length. For example, the one or more baffles may prevent a first portion of liquid from travelling along a substantially shorter path from the inlet of the chamber to the outlet of the chamber (e.g., along the width of a chamber having a rectangular cross section) and a second portion of liquid from travelling along a substantially longer path from the inlet of the chamber to the outlet of the chamber (e.g., along the length of a chamber having a rectangular cross section).

In some cases, it may be advantageous to increase the amount of time a liquid spends flowing through a chamber. Accordingly, in certain embodiments, one or more baffles may be positioned within a single chamber to facilitate liquid flow along a flow path having a relatively high aspect ratio (e.g., the ratio of the average length of the flow path to the average width of the flow path). For example, in some cases, one or more baffles may be positioned such that liquid flowing through the chamber follows a flow path having an aspect ratio of at least about 1.5, at least about 2, at least about 5, at least about 10, at least about 20, at least about 50, at least about 75, or at least about 100.

Figure 12:
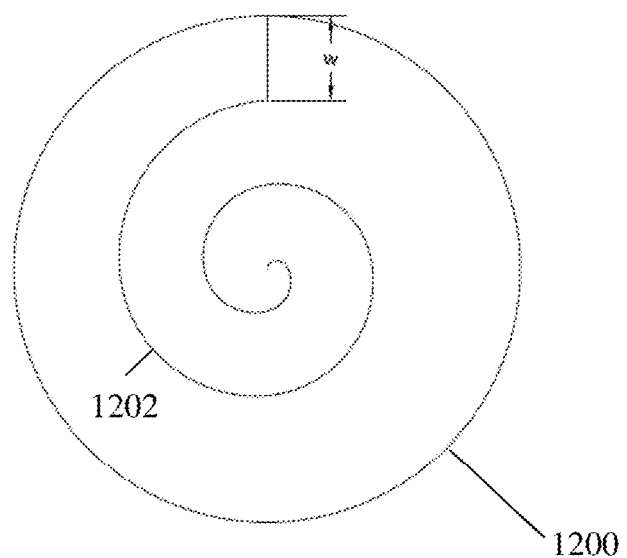
FIG. 12 shows, according to some embodiments, an exemplary schematic illustration of a chamber having a substantially circular cross section and comprising a spiral baffle.
Figure 13:
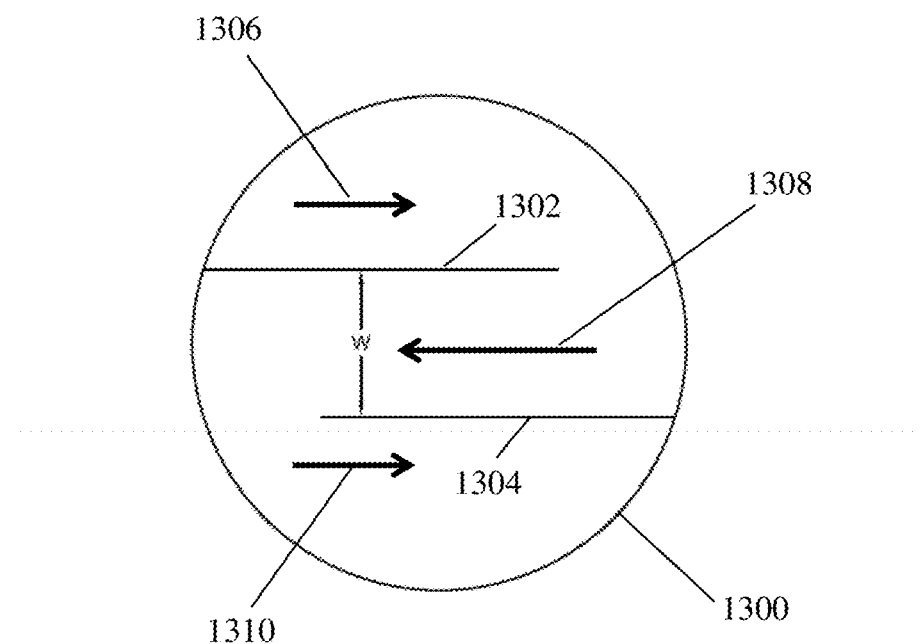
FIG. 13 shows an exemplary schematic illustration of a chamber having a substantially circular cross section and comprising two baffles, according to some embodiments.

In some cases, the aspect ratio of a liquid flow path through a chamber may be larger than the aspect ratio of the chamber. In certain cases, the presence of baffles to increase the aspect ratio of a liquid flow path may facilitate the use of an apparatus having a relatively low aspect ratio (e.g., about 1), such as an apparatus having a substantially circular cross section. For example, FIG. 12 shows an exemplary schematic illustration of a chamber 1200 having a substantially circular cross section (e.g., bottom surface) and a spiral baffle 1202. In operation, liquid may enter chamber 1200 through a liquid inlet (not shown) positioned at or near the center of the substantially circular cross section. The liquid may then flow along spiral baffle 1202 and exit chamber 1200 through a liquid outlet (not shown) positioned at the upper edge of the substantially circular cross section. While the substantially circular cross section of chamber 1200 has an aspect ratio of about 1, the aspect ratio of the liquid flow path is substantially greater than 1 (e.g., approximately 4.5). As an additional example, FIG. 13 shows an exemplary schematic illustration of a chamber 1300 having a substantially circular cross section (e.g., bottom surface) and comprising a first baffle 1302 and a second baffle 1304. In operation, liquid may enter chamber 1300 through a liquid inlet (not shown) located in the upper left portion of the substantially circular cross section. The liquid may first flow in the direction of arrow 1306. The liquid may then flow around baffle 1302 and flow in the opposite direction, in the direction of arrow 1308. The liquid may then flow around baffle 1304 and flow in the direction of arrow 1310 and subsequently exit chamber 1300 through a liquid outlet (not shown) located in the lower right portion of the substantially circular cross section. While the aspect ratio of the circular cross section of chamber 1300 is about 1, the aspect ratio of the liquid flow path through chamber 1300 is substantially greater than 1.

In some embodiments, one or more weirs may be positioned within the chamber in a manner so as to control or direct flow of a liquid between two chambers. For example, a weir may be positioned adjacent or surrounding a region of the chamber that receives a stream of liquid, for example, from a different chamber above the region. In some cases, a weir may be positioned adjacent or surrounding a region of the chamber where liquid may flow out of the chamber, for example, into a different chamber below. In some cases, a weir may be positioned within a chamber so as to not contact one or more walls of the chamber. In some cases, a weir may be positioned within a chamber so as to contact one or more walls of the chamber.

The one or more weirs may be selected to have a height that is less than the height of the chamber. In some embodiments, the height of the weirs may determine the maximum height for a liquid phase or layer in the chamber. For example, if a liquid layer residing in a first chamber reaches a height that exceeds the height of a weir positioned along a bottom surface of the chamber, then at least a portion of the excess liquid layer may flow over the weir. In some cases, the excess liquid may flow into a second, adjacent chamber, e.g., a chamber positioned below the first chamber. In some embodiments, at least one weir in a chamber may have a height of less than about 0.1 m, less than about 0.09 m, less than about 0.08 m, less than about 0.07 m, less than about 0.06 m, less than about 0.05 m, less than about 0.04 m, less than about 0.03 m, less than about 0.02 m, less than about 0.01 m, or, in some cases, less than about 0.005 m. In some embodiments, each weir in a chamber may have a height of less than about 0.1 m, less than about 0.09 m, less than about 0.08 m, less than about 0.07 m, less than about 0.06 m, less than about 0.05 m, less than about 0.04 m, less than about 0.03 m, less than about 0.02 m, less than about 0.01 m, or, in some cases, less than about 0.005 m.

In some embodiments, one or more weirs may be positioned to promote the flow of a liquid across the length of the chamber in a substantially linear path. For example, the chamber may be selected to have a cross-sectional shape having a length that is greater than its width (e.g., a substantially rectangular cross-section), such that the weirs promote flow of liquid along the length of the chamber. In some cases, it may be desirable to promote such cross flow across a chamber to maximize the interaction, and therefore heat and/or mass transfer, between the liquid phase and the vapor phase of a condensable fluid.

Figure 7H:
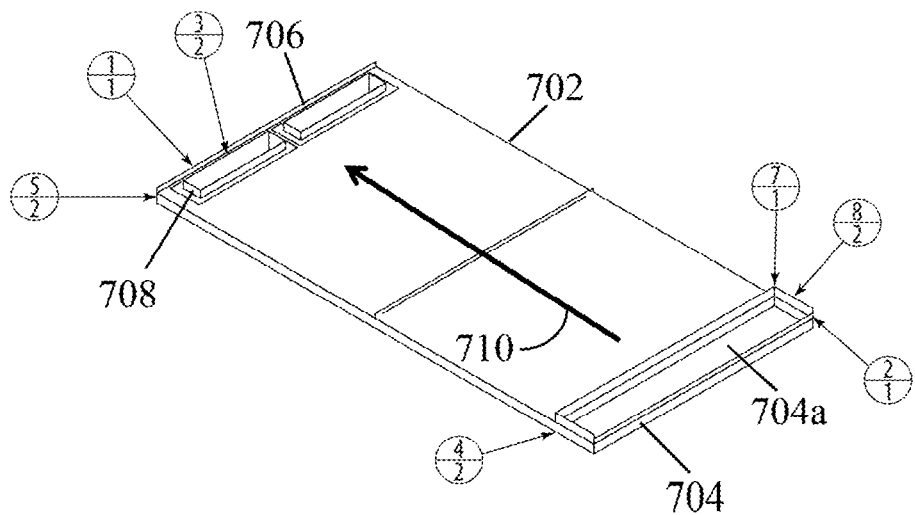
FIG. 7H shows various views of a bubble-generating chamber with one pass of liquid cross flow in the exemplary embodiment of a multi-stage bubble column condenser shown in FIG. 7A.
Figure 7H:
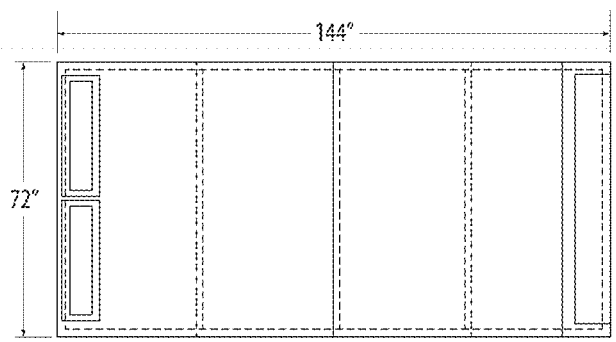
Figure 7H:
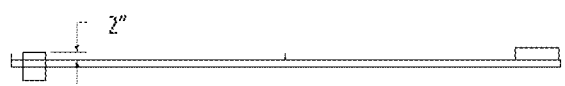
Figure 7H:
Figure 7I:
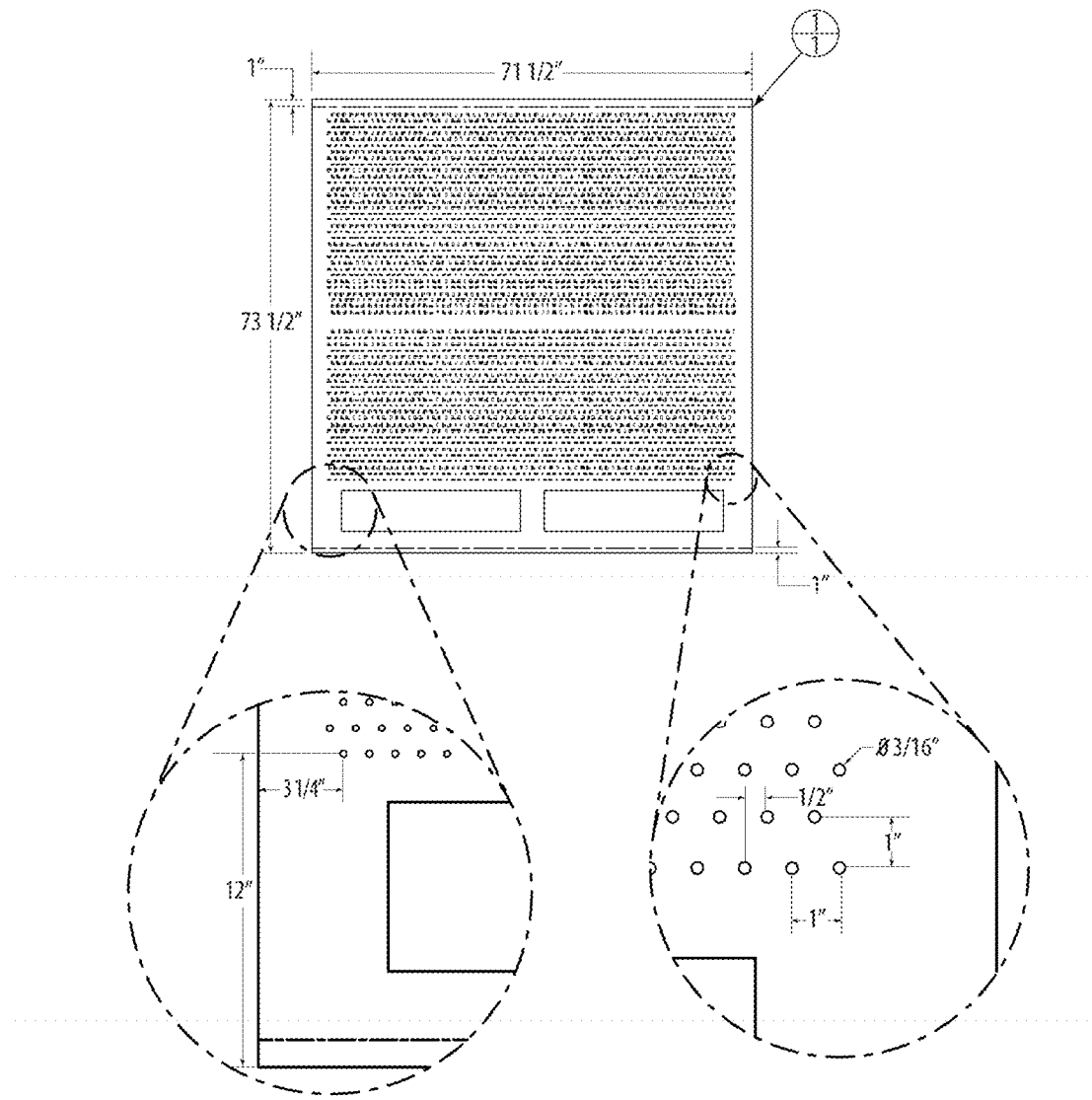
FIG. 7I shows a top-down view of a portion of a bubble-generating chamber in the exemplary embodiment of a multi-stage bubble column condenser shown in FIG. 7A.

In one embodiment, a chamber may include a first weir and a second weir positioned along the bottom surface of the chamber. The first and second weirs may be positioned at opposite ends of the chamber lengthwise, such that a stream of condensable fluid in liquid phase may flow along the length of the chamber from the first weir to the second weir. One example of a bubble generator system having such a configuration is illustrated in FIG. 7H. In FIG. 7H, bubble generator 702 (which can include a plurality of perforations) includes a first weir 704 positioned at one end of the bubble generator. Bubble generator 702 further comprises second weir 706 and third weir 708, both of which are positioned at the opposite end of the bubble generator as first baffle 704. In operation, a liquid may be introduced to the bubble generator and may flow to region 704a surrounded by weir 704. As additional liquid is introduced and the height of the liquid in region 704a exceeds the height of weir 704, excess liquid may flow over the top of weir 704 and flow across the surface of bubble generator 702 in the direction of arrow 710 across bubble generator 702. If the height of the liquid then exceeds the height of weir 706 and/or 708, excess liquid may flow over the top of weir 706 and/or weir 708 and flow to another portion of the apparatus. In some cases, excess liquid may flow to a chamber positioned below bubble generator 702.

In some embodiments, a bubble column condenser may include a plurality of chambers arranged in a vertical stack, and one or more weirs and/or baffles may be positioned in one or more chambers such that a liquid can flow across the length of the chamber. In some cases, the chambers can be arranged such that liquid flows in in opposing directions for adjacent chambers. For example, a bubble column condenser may comprise a first chamber and a second chamber, and one or more weirs and/or baffles may be positioned in each of the first and second chambers such that a stream of condensable fluid in liquid phase flows along the length of the first chamber in a first direction and along the length of the second chamber in a second, opposing direction. For example, FIG. 2C illustrates a configuration in which a bubble column condenser 200 comprises a vapor distribution chamber 244, a first stage 210 comprising a chamber 212, and a second stage 220 comprising a chamber 224. A stream of a condensable fluid in liquid phase may enter condenser 200 through liquid inlet 232, and the liquid stream may flow across second stage 220 in the direction of arrow 246. In first stage 210 positioned vertically below second stage 220, excess liquid stream from second stage 200 may enter first stage 10 and may flow across first stage 210 in the direction of arrow 248, where the direction of arrow 248 is opposite that of arrow 246. In vapor distribution chamber 244 positioned vertically below first stage 210, excess liquid stream from first stage 210 may flow in the direction of arrow 252, where the direction of arrow 252 is in substantially the opposite direction as arrow 248 and substantially the same direction as arrow 246.

In some embodiments, a first weir may be positioned adjacent an area that receives a liquid stream (e.g., from a liquid inlet, or from a region above the first weir), The first weir may be positioned at the opposite end, lengthwise, from a second weir positioned adjacent an outlet or a down comer that may deliver excess liquid to another region of the apparatus. In some embodiments, the first weir and the second weir may be positioned at the same end of the first chamber.

Figure 6:
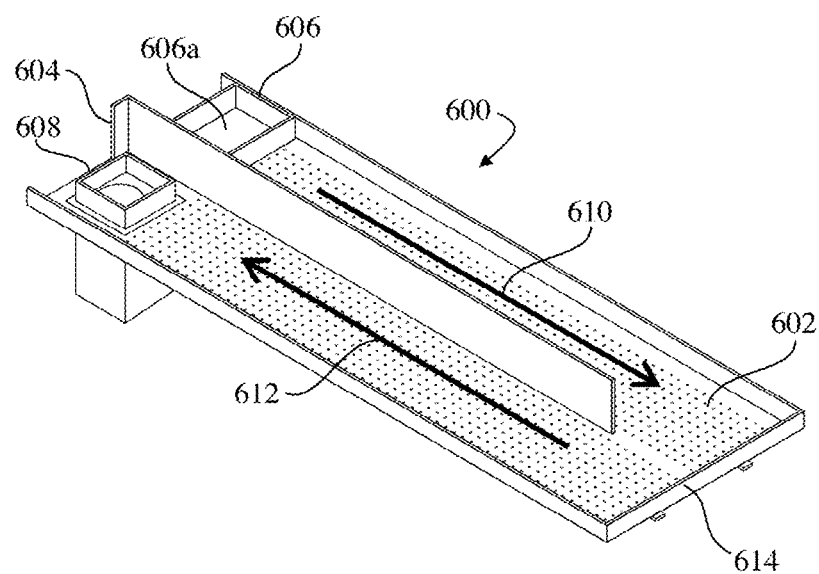
FIG. 6 shows an exemplary embodiment of a baffled bubble-generating chamber with two passes of liquid cross flow.
Figure 6:
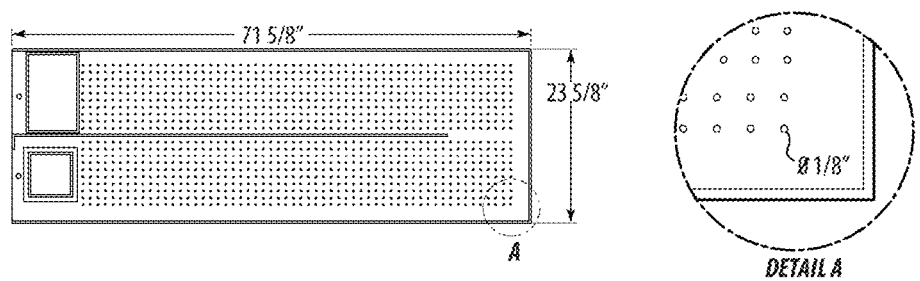
Figure 6:
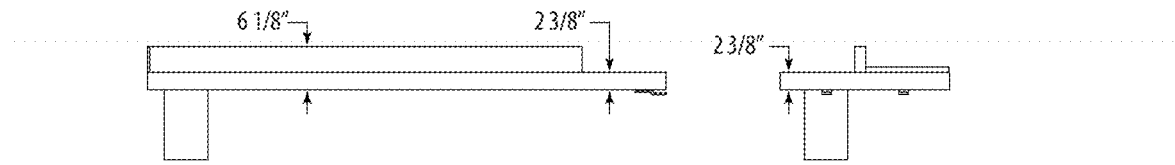

Some embodiments involve the use of both weirs and baffles to direct liquid flow within and between chambers. In some cases, the baffle may be a longitudinal baffle. In some cases, the baffle may be a transverse baffle (e.g., a horizontal baffle). One such embodiment is illustrated in FIG. 6, where a longitudinal baffle 604, weir 606, and weir 608 are positioned on a bubble generator 602. Weir 606 and weir 608 are positioned at a first end of bubble generator 602. Longitudinal baffle 604 extends along the length of bubble generator 602, from the first end of bubble generator 602 toward the second, opposing end of bubble generator 602. The length of longitudinal baffle 604 is less than the length of the bubble generator, providing a gap between the end of longitudinal baffle 604 and the second, opposing end of bubble generator 602 for a liquid to flow.

When system 600 is in use, weir 606 may receive a stream of a condensable fluid in liquid phase. The liquid may reside within region 606a enclosed by weir 606. As additional liquid is introduced and the height of the liquid in enclosed region 606a exceeds the height of weir 606, excess liquid may flow over the top of weir 606 and flow along the length of bubble generator 602, in the direction of arrow 610 as directed by longitudinal baffle 604. The liquid phase may then flow across the width of the bubble generator 602 via the gap between longitudinal baffle 604 and a transverse wall of the chamber. Liquid may then flow along the length of bubble generator 602 in the direction of arrow 612, which is opposite that of arrow 610. When the height of the liquid exceeds the height of weir 608, excess liquid may flow over the top of weir 608 and into another portion of the apparatus. It should be understood that a chamber may include comprise more than one longitudinal baffle. In some embodiments, at least one longitudinal baffle, at least two longitudinal baffles, at least three longitudinal baffles, at least four longitudinal baffles, at least five longitudinal baffles, at least ten longitudinal baffles, or more, are arranged within the chamber. In some embodiments, the chamber includes 1-10 longitudinal baffles, 1-5 longitudinal baffles, or, 1-3 longitudinal baffles.

In some cases, at least one transverse baffle, at least two transverse baffles, at least three transverse baffles, at least four transverse baffles, at least five transverse baffles, at least ten transverse baffles, or more, are arranged within the chamber. In some embodiments, the chamber includes 1-10 transverse baffles, 1-5 transverse baffles, or, 1-3 transverse baffles.

The bubble column condenser may have any shape suitable for a particular application. In some embodiments, the bubble column condenser may have a cross section that is substantially circular, substantially elliptical, substantially square, substantially rectangular, or substantially triangular. It has been recognized that it may be advantageous for a bubble column condenser to have a substantially circular cross section. In some cases, a bubble column condenser having a substantially circular cross section (e.g., a substantially cylindrical bubble column condenser) may be easier to manufacture than a bubble column condenser having a cross section of a different shape (e.g., a substantially rectangular cross section). For example, for a substantially cylindrical bubble column condenser having a certain diameter (e.g., about 0.6 m or less), prefabricated pipes and/or tubes may be used to form the walls of the bubble column. In addition, a substantially cylindrical bubble column condenser may be manufactured from a sheet material (e.g., stainless steel) by bending the sheet and welding a single seam. In contrast, a bubble column condenser having a cross section of a different shape may have more than one welded seam (e.g., a bubble column condenser having a substantially rectangular cross section may have four welded seams). Further, a bubble column condenser having a substantially circular cross section may require less material to fabricate than a bubble column condenser having a cross section of a different shape (e.g., a substantially rectangular cross section). In certain embodiments, the bubble column condenser has a substantially parallelepiped shape, a substantially rectangular prism shape, a substantially cylindrical shape, and/or a substantially pyramidal shape.

The bubble column condenser may have any size suitable for a particular application. In some embodiments, the largest cross-sectional dimension of the bubble column condenser may be less than about 10 m, less than about 5 m, less than about 2 m, less than about 1 m, less than about 0.5 m, or less than about 0.1 m. In some cases, the largest cross-sectional dimension of the bubble column condenser may range from about 10 m to about 0.01 m, from about 5 m to about 0.5 m, or from about 5 m to about 1 m.

The exterior of the bubble column condenser may comprise any suitable material. In certain embodiments, the bubble column condenser comprises stainless steel, aluminum, and/or a plastic (e.g., polyvinyl chloride, polyethylene, polycarbonate). In some embodiments, it may be advantageous to minimize heat loss from the bubble column condenser to the environment. In some cases, the exterior of the condenser and/or the interior of the condenser may comprise a thermally insulating material. For example, the condenser may be at least partially coated, covered, or wrapped with a thermally insulating material. Non-limiting examples of suitable thermally insulating materials include elastomeric foam, fiberglass, ceramic fiber mineral wool, glass mineral wool, phenolic foam, polyisocyanurate, polystyrene and polyurethane.

While the features described above have been discussed in the context of condensing apparatuses such as bubble column condensers, all of the described features (e.g., shape, aspect ratio, presence of weirs and/or baffles, etc.) may also be applied to humidifying apparatuses, such as bubble column humidifiers. Use of a bubble column humidifier may, in some cases, be advantageous compared to use of other types of humidifiers (e.g., packed bed humidifiers) for many of the same reasons that use of a bubble column condenser may be advantageous compared to other types of condensers. For example, a bubble column humidifier may be characterized by improved performance (e.g., higher rates of heat and/or mass transfer, higher thermodynamic effectiveness) and/or reduced fabrication and/or material costs (e.g., reduced dimensions) compared to other types of humidifiers.

In certain cases, a bubble column humidifier comprises a plurality of stages (e.g., the bubble column humidifier is a multi-stage bubble column humidifier). The stages may be arranged such that a gas stream (e.g., an air stream) flows sequentially through a first stage, a second stage, a third stage, and so on. In some embodiments, each stage comprises a liquid layer having a temperature, and the temperature of the liquid layer of a stage may be lower than the temperature of subsequent stages. For example, in a three-stage bubble column humidifier, the temperature of the liquid layer of the first stage (e.g., the bottommost stage in a vertically arranged bubble column) may be lower than the temperature of the liquid layer of the second stage, which may be lower than the temperature of the liquid layer of the third stage (e.g., the topmost stage in a vertically arranged bubble column). Within each stage, heat and mass may be transferred from the liquid layer to bubbles of the gas stream.

To illustrate the operation of a multi-stage bubble column humidifier, the operation of an exemplary embodiment of a multi-stage bubble column humidifier, as illustrated in FIG. 2A, is described. According to some embodiments, apparatus 200 of FIG. 2A is a multi-stage bubble column humidifier. Bubble column humidifier 200 comprises all of the components previously discussed in the context of a bubble column condenser (e.g., first stage 210 comprising liquid layer 214 and bubble generator 208, second stage 220 comprising liquid layer 226 and bubble generator 222). However, liquid layers 214 and 226 comprise salt-containing water instead of substantially pure condensable fluid in a liquid phase. Additionally, the temperature of the salt-containing water of liquid layers 214 and 226 is higher than the temperature of a first gas or gas mixture flowing through bubble column humidifier 200.

In operation, a gas or gas mixture may travel through bubble generator 208, thereby forming bubbles. As the gas or gas mixture bubbles subsequently travel through liquid layer 214, which is maintained at a temperature above that of the gas or gas mixture, heat and mass are transferred from the salt-containing water of liquid layer 214 to the bubbles of the gas or gas mixture, thereby at least partially humidifying the gas or gas mixture. The at least partially humidified gas or gas mixture may then travel through a first vapor distribution region and enter bubble generator 222, forming bubbles of the at least partially humidified gas or gas mixture. Bubbles of the at least partially humidified gas or gas mixture may then travel through liquid layer 226, which has a temperature higher than the temperature of liquid layer 214, and heat and mass may be transferred from liquid layer 226 to the bubbles of the at least partially humidified gas or gas mixture, further humidifying the gas or gas mixture.

The bubble column humidifier may comprise any suitable material (e.g., a material that is heat-resistant and corrosion-resistant). Non-limiting examples of suitable materials include chlorinated polyvinyl chloride, polyethylene, fiberglass-reinforced plastic, titanium alloys, Hastelloys (e.g., corrosion-resistant nickel alloys), superalloys (e.g., molybdenum-based superalloys), and/or epoxy-coated metals.

Some embodiments relate to systems comprising a bubble column condenser as described herein arranged to be in fluid communication with an external heat exchanger. In such embodiments, heat may be transferred from a condenser liquid outlet stream to a coolant stream flowing through the external heat exchanger. The system can be configured such that the cooled condenser liquid outlet stream can then be returned to the bubble column condenser through an inlet and be re-used as a liquid to form liquid layers in the stage(s) of the condenser. In this manner, the temperature of the liquid layers within the bubble column condenser can be regulated such that, in each stage, the temperature of the liquid layer is maintained at a temperature lower than the temperature of the gas or gas mixture. In some cases, arrangement of the heat exchanger at a location that is external to the condenser, rather than at a location that is within the condenser, can allow for use of condensers as described herein (e.g., condensers having reduced dimensions and/or reduced levels of liquid baths, etc.). In some cases, the heat exchanger may transfer heat absorbed from the condenser liquid outlet stream to another fluid.

Figure 3A:
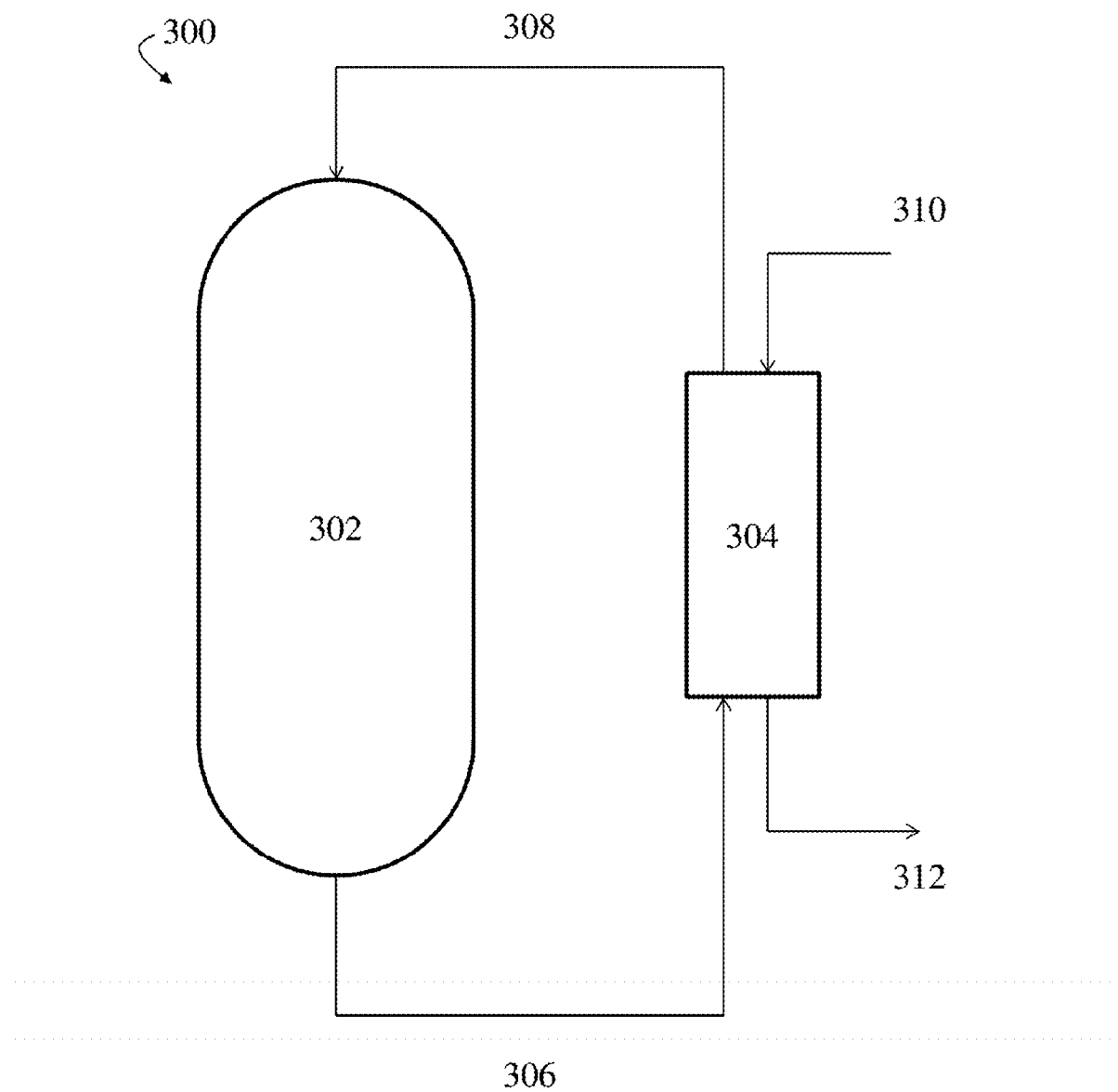
FIG. 3A shows, according to some embodiments, an exemplary schematic diagram of a bubble column condenser and an external heat exchanger.

FIG. 3A shows an exemplary embodiment of a system 300 including a bubble column condenser 302 fluidly connected to an external heat exchanger 304 via conduits 306 and 308. Heat exchanger 304 further includes a coolant during operation. In operation, a condenser liquid outlet stream containing an amount of absorbed heat exits condenser 302 via conduit 306 at a temperature $T_1$ and enters external heat exchanger 304. Heat is transferred from the condenser liquid outlet stream to the coolant, which is maintained at a temperature $T_3$ that is lower than temperature $T_1$ of the condenser liquid outlet stream. The condenser liquid outlet stream then exits heat exchanger 304 via conduit 308 at temperature $T_2$, where $T_2$ is less than $T_1$, and is returned to condenser 302 via conduit 308.

Heat exchanger 304 may optionally transfer any absorbed heat from the condenser liquid outlet stream to another fluid stream. For example, a heat exchanger inlet stream (e.g., a heat exchanger coolant stream) may enter heat exchanger 304 via conduit 310 at temperature $T_3$. As the heat exchanger inlet stream passes through heat exchanger 304, it may absorb heat transferred from the condenser liquid outlet stream. The heat exchanger inlet stream may then exit heat exchanger 304 via conduit 312 as a heat exchanger outlet stream at temperature $T_4$, where $T_4$ is greater than $T_3$. In some embodiments, the condenser liquid inlet stream flowing through conduit 308 and heat exchanger inlet stream flowing through conduit 310 may be substantially the same. In other embodiments, the condenser liquid inlet stream and the heat exchanger inlet stream may be different. In some cases, the condenser liquid outlet stream flowing through heat exchanger 304 (e.g., the stream flowing through conduits 306 and 308) and the heat exchanger coolant stream (e.g., the stream flowing through conduits 310 and 312) may flow in substantially parallel directions through heat exchanger 304. In other embodiments (as illustrated), the condenser liquid outlet stream flowing through heat exchanger 304 and the heat exchanger coolant stream may flow in substantially non-parallel (e.g., opposite) directions through heat exchanger 304.

Any heat exchanger known in the art may be used. Examples of suitable heat exchangers include, but are not limited to, plate and frame heat exchangers, shell and tube heat exchangers, tube and tube heat exchangers, plate heat exchangers, plate and shell heat exchangers, and the like. In a particular embodiment, the heat exchanger is a plate and frame heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). The first fluid stream may comprise, in certain cases, a fluid stream that flows through a condenser (e.g., a condenser liquid outlet stream). In some embodiments, the second fluid stream may comprise a coolant. The first fluid stream and/or the second fluid stream may comprise a liquid. In some embodiments, the heat exchanger may be a liquid-to-liquid heat exchanger. In some cases, more than two fluid streams may flow through the heat exchanger.

The coolant may be any fluid capable of absorbing and transferring heat. Typically, the coolant is a liquid. The coolant may, in some embodiments, include water. In certain cases, the coolant may include salt-containing water. For example, in a humidification-dehumidification system, the coolant stream in the heat exchanger may be used to preheat salt-containing water prior to entry into a humidifier.

In some embodiments, the heat exchanger may exhibit relatively high heat transfer rates. In some embodiments, the heat exchanger may have a heat transfer coefficient of at least about 150 W/(m² K), at least about 200 W/(m² K), at least about 500 W/(m² K), at least about 1000 W/(m² K), at least about 2000 W/(m² K), at least about 3000 W/(m² K), at least about 4000 W/(m² K), or, in some cases, at least about 5000 W/(m² K). In some embodiments, the heat exchanger may have a heat transfer coefficient in the range of at least about 150 W/(m² K) to at least about 5000 W/(m² K), at least about 200 W/(m² K) to about 5000 W/(m² K), at least about 500 W/(m² K) to about 5000 W/(m² K), at least about 1000 W/(m² K) to about 5000 W/(m² K), at least about 2000 W/(m² K) to about 5000 W/(m² K), at least about 3000 W/(m² K) to about 5000 W/(m² K), or at least about 4000 W/(m² K) to about 5000 W/(m² K).

In some embodiments, the heat exchanger may lower the temperature of the condenser liquid outlet stream and/or other fluids flowing through the heat exchanger. For example, the difference between the temperature of a fluid entering the heat exchanger in conduit 306 or 310 and the fluid exiting the heat exchanger via conduit 308 or 312, respectively, may be at least about 5° C., at least about 10° C., at least about 15° C., at least about 20° C., at least about 30° C., at least about 40° C., at least about 50° C., at least about 60° C., at least about 70° C., at least about 80° C., at least about 90° C., at least about 100° C., at least about 150° C., or, in some cases, at least about 200° C. In some embodiments, the difference between the temperature of a fluid entering the heat exchanger and the fluid exiting the heat exchanger may be in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 60° C., about 20° C. to about 90° C., about 20° C. to about 200° C., about 30° C. to about 60° C., about 30° C. to about 90° C., about 40° C. to about 200° C., about 60° C. to about 90° C., about 60° C. to about 200° C., about 80° C. to about 200° C., about 100° C. to about 200° C., or about 150° C. to about 200° C.

In some embodiments, an optional external heating device may be arranged in fluid communication with the bubble column condenser and/or the external heat exchanger. In certain cases, the heating device may be arranged such that, in operation, a condenser liquid outlet stream is heated in the heating device prior to entering the heat exchanger. Such an arrangement may advantageously increase the amount of heat transferred from the condenser liquid outlet stream to another fluid stream flowing through the heat exchanger. For example, in a humidification-dehumidification system, heat may be transferred from the condenser liquid outlet stream to a salt-containing water stream (e.g., a brine stream) prior to entry of the salt-containing water stream into a humidifier.

The heating device may be any device that is capable of transferring heat to a fluid stream (e.g., a condenser liquid outlet stream). In some cases, the heating device is a heat exchanger. Any heat exchanger known in the art may be used. Examples of suitable heat exchangers include, but are not limited to, plate and frame heat exchangers, shell and tube heat exchangers, tube and tube heat exchangers, plate heat exchangers, plate and shell heat exchangers, and the like. In a particular embodiment, the heat exchanger is a plate and frame heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). The first fluid stream and/or the second fluid stream may comprise a liquid. In some embodiments, the second heat exchanger is a liquid-to-liquid heat exchanger. The first fluid stream may, in some cases, comprise a fluid stream that flows through a condenser (e.g., a condenser liquid outlet stream). The second fluid stream may, in some cases, comprise a heating fluid. The second fluid stream may, in some cases, comprise a heating fluid. The heating fluid may be any fluid capable of absorbing and transferring heat. In some embodiments, the heating fluid comprises water. In certain cases, the heating fluid comprises hot, pressurized water. In certain embodiments, heat may be transferred from the second fluid stream (e.g., the heating fluid) to the first stream (e.g., the condenser liquid outlet stream) in the heat exchanger. In some cases, more than two fluid streams may flow through the heat exchanger.

In some embodiments, the heating device is a heat collection device. The heat collection device may be configured to store and/or utilize thermal energy (e.g., in the form of combustion of natural gas, solar energy, waste heat from a power plant, or waste heat from combusted exhaust). In certain cases, the heating device is configured to convert electrical energy to thermal energy. For example, the heating device may be an electric heater.

The heating device may, in some cases, increase the temperature of the condenser liquid outlet stream and/or other fluid streams flowing through the heating device. For example, the difference between the temperature of a fluid entering the heating device and the fluid exiting the heating device may be at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the difference between the temperature of a fluid entering the heating device and the fluid exiting the heat exchanger may be in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 60° C., about 20° C. to about 90° C., about 30° C. to about 60° C., about 30° C. to about 90° C., or about 60° C. to about 90° C. In some cases, the temperature of a fluid stream (e.g., the condenser liquid outlet stream) being heated in the heating device remains below the boiling point of the fluid stream.

In some embodiments, an optional external cooling device may be arranged in fluid communication with the bubble column condenser and/or the external heat exchanger. In certain cases, the cooling device may be arranged such that, in operation, a heat exchanger outlet stream (e.g., a cooled condenser liquid outlet stream) is cooled in the cooling device prior to returning to the bubble column condenser.

A cooling device generally refers to any device that is capable of removing heat from a fluid stream (e.g., a liquid stream, a gas stream). In some embodiments, the cooling device is a heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). In some cases, heat is transferred from a first fluid stream to a second fluid stream. In certain embodiments, the cooling device is a liquid-to-gas heat exchanger. The first fluid stream may, in certain cases, comprise a fluid stream that is part of a loop of condenser liquid flowing between a condenser and a heat exchanger (e.g., a condenser liquid outlet stream). The second fluid stream may, in some cases, comprise a coolant. The coolant may be any fluid capable of absorbing or transferring heat. In some embodiments, the coolant comprises a gas. The gas may, in some cases, comprise air (e.g., ambient air). Heat exchangers that comprise air as a coolant may generally be referred to as air-cooled heat exchangers. In some cases, more than two fluid streams flow through the cooling device. It should also be noted that the cooling device may, in some embodiments, be a dry cooler, a chiller, a radiator, or any other device capable of removing heat from a fluid stream.

The cooling device may, in some cases, decrease the temperature of a heat exchanger outlet stream. In some embodiments, the cooling device decreases the temperature of the heat exchanger outlet stream by at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the cooling device decreases the temperature of the heat exchanger outlet stream by an amount in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 30° C., about 20° C. to about 60° C., about 20° C. to about 90° C., about 30° C. to about 60° C., about 30° C. to about 90° C., or about 60° C. to about 90° C.

Figure 3B:
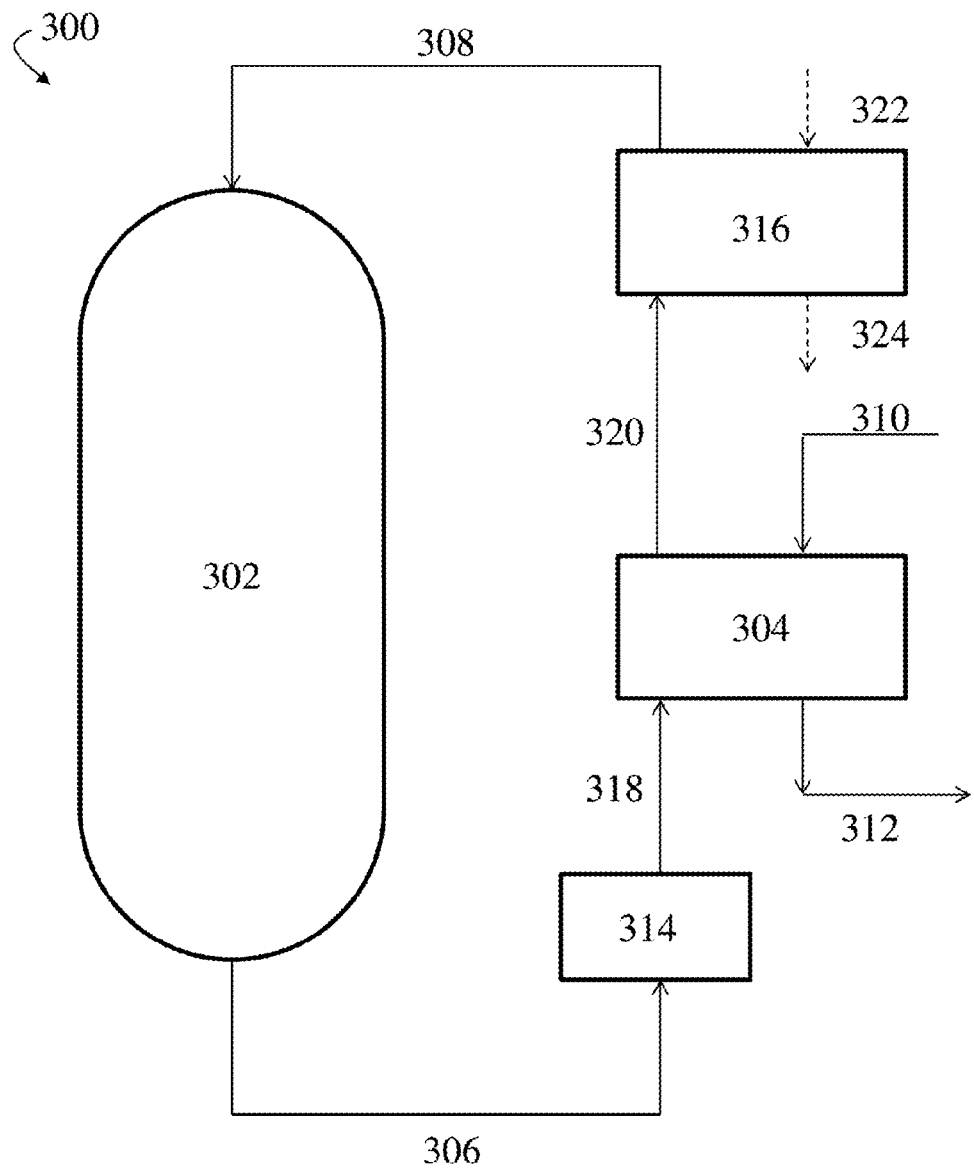
FIG. 3B shows, according to some embodiments, an exemplary schematic diagram of a bubble column condenser, an external heat exchanger, an external heating device, and an external cooling device.

FIG. 3B shows an exemplary embodiment of a system 300 comprising a bubble column condenser 302, an external heat exchanger 304, an external heating device 314, and an external cooling device 316, each in fluid communication with one another. Heating device 314 is arranged to be in fluid communication with condenser 302 via liquid conduit 306. Heating device 314 is also arranged to be in fluid communication with heat exchanger 304 via liquid conduit 318. In addition to being in fluid communication with heating device 314, heat exchanger 304 is arranged to be in fluid communication with cooling device 316 via liquid conduit 320. Cooling device 316 is arranged to be in fluid communication with condenser 302 via liquid conduit 308.

In operation, in an exemplary embodiment, a condenser liquid outlet stream exits condenser 302 via conduit 306 at a temperature $T_1$ and enters heating device 314. Heat is transferred to the condenser liquid outlet stream as it flows through heating device 314. The condenser liquid outlet stream exits heating device 314 as a heating device outlet stream (e.g., a heated condenser liquid outlet stream) at a temperature $T_2$ that is higher than $T_1$. The heating device outlet stream then flows through conduit 318 to heat exchanger 304. In heat exchanger 304, heat is transferred from the heating device outlet stream to another fluid stream (e.g., a salt-containing water stream) flowing through heat exchanger 304 via conduits 310 and 312. The heating device outlet stream exits heat exchanger 304 as a heat exchanger outlet stream at a temperature $T_3$ that is lower than $T_2$. The heat exchanger outlet stream then flows through liquid conduit to cooling device 316. In some embodiments, as the heat exchanger outlet stream flows through cooling device 316, heat from the heat exchanger outlet stream is transferred to another fluid stream (e.g., an air stream) flowing through cooling device 316 via conduits 322 and 324. The heat exchanger outlet stream then exits cooling device 316 as a cooling device outlet stream at a temperature $T_4$ that is lower than $T_3$. The cooling device outlet stream at temperature $T_4$ then returns to condenser 302 via conduit 308.

In some embodiments, the bubble column condenser may be used in a desalination system. In some embodiments, the desalination system may be a humidification-dehumidification (HDH) system. In such systems, a condenser (e.g., bubble column condenser) may act as a dehumidifier to condense substantially purified water from a humidified gas stream. Use of a bubble column condenser as a dehumidifier in an HDH system may be advantageous because direct contact condensers, such as bubble column condensers, may exhibit relatively higher heat transfer effectiveness than other types of condensers, such as surface condensers. In some embodiments, the HDH system comprises a heat exchanger. In certain cases, the heat exchanger facilitates the transfer of heat from a fluid stream flowing through a condenser (e.g., a condenser liquid outlet stream) to a fluid stream flowing through a humidifier (e.g., a humidifier liquid inlet stream). For example, the heat exchanger may advantageously allow energy to be recovered from a condenser liquid outlet stream and used to pre-heat a humidifier liquid inlet stream (e.g., a salt-containing water stream) prior to entry of the humidifier liquid inlet stream into the humidifier of the HDH system. This may, for example, avoid the need for an additional heating device to heat the salt-containing water stream. Alternatively, if a heating device is used, the presence of a heat exchanger to recover energy from a condenser liquid outlet stream may reduce the amount of heat required to be applied to the salt-containing water stream. In some embodiments, the heat exchanger is an external heat exchanger. As noted above, the use of an external heat exchanger may advantageously allow the use of bubble column condensers as described herein (e.g., condensers having reduced dimensions and/or reduced levels of liquid baths, etc.). In some embodiments, the heat exchanger is an internal heat exchanger. For example, the internal heat exchanger may comprise a tube coil located within a bubble column condenser. The tube coil may be positioned such that at least a portion of the tube coil is in thermal contact with a liquid layer within a stage of the bubble column condenser. In a multi-stage bubble condenser comprising a plurality of stages, each stage comprising a liquid layer, the tube coil may be positioned such that each liquid layer is in thermal contact with at least a portion of the tube coil. In some cases, a coolant (e.g., a salt-containing water stream) may flow through the internal heat exchanger (e.g., the tube coil), and heat may be transferred from the liquid layer(s) of the bubble column condenser to the coolant.

Other examples of HDH systems are described in U.S. Pat. No. 8,292,272, by Elsharqawy et al., filed Sep. 4, 2009, entitled "Water Separation Under Reduced Pressure"; U.S. Pat. No. 8,465,006, by Elsharqawy et al., filed Sep. 21, 2012, entitled "Separation of a Vaporizable Component Under Reduced Pressure"; U.S. Pat. No. 8,252,092, by Govindan et al., filed Oct. 5, 2009, entitled "Water Separation Under Varied Pressure"; U.S. Pat. No. 8,496,234, by Govindan et al., filed Jul. 16, 2012, entitled "Thermodynamic Balancing of Combined Heat and Mass Exchange Devices"; U.S. Patent Publication No. 2013/0074694, by Govindan et al., filed Sep. 23, 2011, entitled "Bubble-Column Vapor Mixture Condenser"; U.S. Patent Publication No. 2013/0075940, by Govindan et al., filed Jul. 12, 2012 as U.S. patent application Ser. No. 13/548,166, entitled "Bubble-Column Vapor Mixture Condenser"; and U.S. patent application Ser. No. 13/916,038, by Govindan et al., filed Jun. 12, 2013, entitled "Multi-Stage Bubble Column Humidifier," the contents of which are incorporated herein by reference in their entireties for all purposes.

Figure 4A:
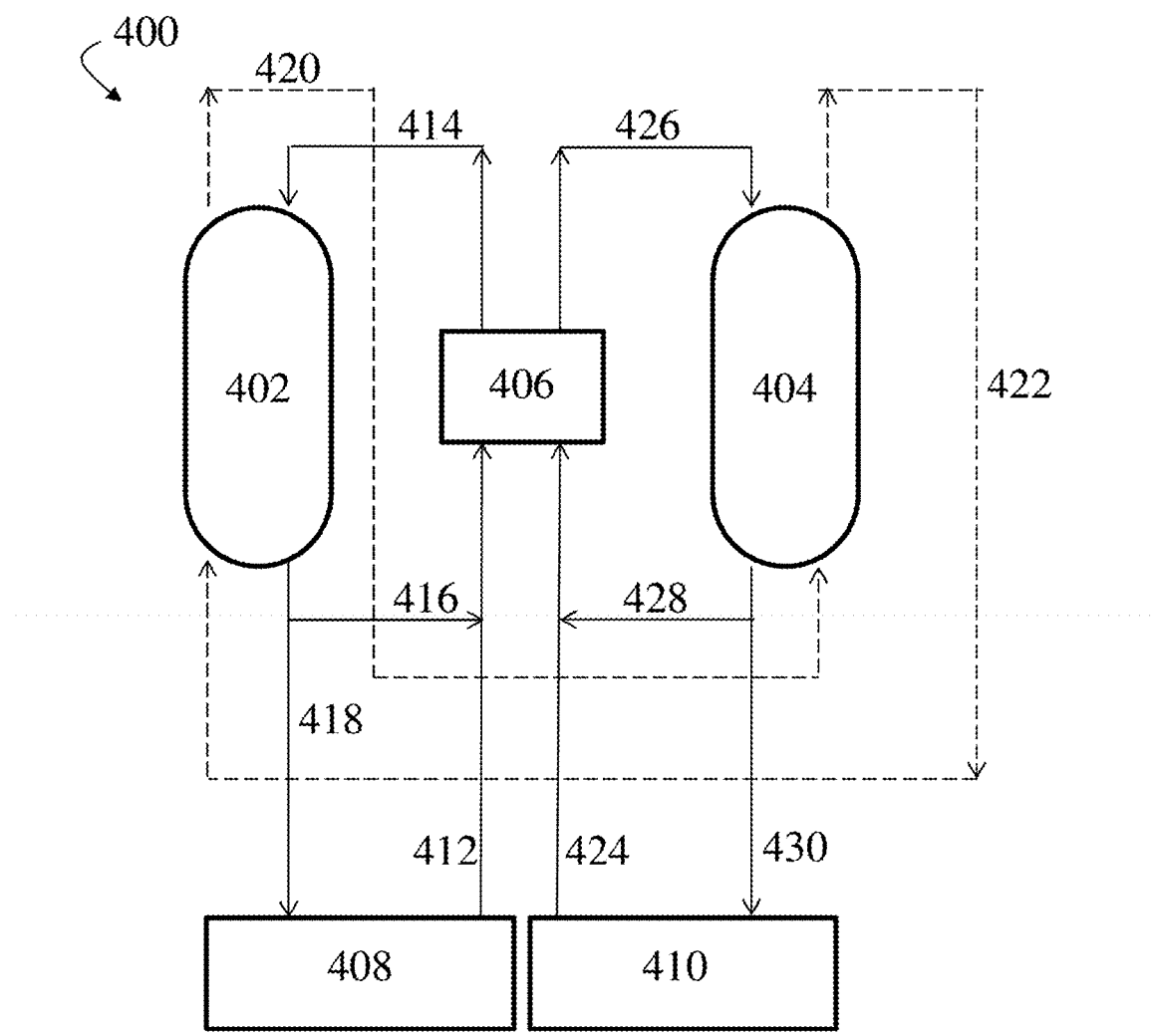
FIG. 4A shows an exemplary schematic diagram of an HDH system including a bubble column condenser and an external heat exchanger, according to some embodiments, where the external heat exchanger is a parallel flow device.

An exemplary embodiment of an HDH system is shown in FIG. 4A. System 400 includes a humidifier 402, a dehumidifier 404, a heat exchanger 406, a reservoir of salt-containing water 408, and a reservoir of purified water 410. Humidifier 402 and dehumidifier 404 are arranged in fluid communication via gas conduits 420 and 422. In some embodiments, system 400 is a closed loop system, with a carrier gas stream circulating between humidifier 402 and dehumidifier 404. In some cases, the carrier gas stream may comprise a non-condensable gas. In addition to the carrier gas stream, various liquid streams are circulated through system 400. In one case, the stream may include salt-containing water, such as seawater, brackish water, saline water, brine, and/or industrial wastewater. In system 400, a reservoir of salt-containing water 408 is arranged in fluid communication with heat exchanger 406 via liquid conduit 412 and with humidifier 402 through liquid conduit 418. Humidifier 402 is also arranged to be in fluid communication with heat exchanger 406 via liquid conduits 414 and 416. In some embodiments, humidifier 402 may comprise a humidifier liquid inlet and outlet and a humidifier gas inlet and outlet. In some cases, the humidifier is configured such that the liquid inlet is positioned at a first end (e.g., top end) of the humidifier, and the gas inlet is positioned at a second, opposite end (e.g., bottom end) of the humidifier. Such a configuration may advantageously result in high thermal efficiency. In some embodiments, the humidifier is configured to bring a carrier gas stream (e.g., dry air) into direct contact with a salt-containing water stream, thereby producing a vapor-containing humidifier gas outlet stream enriched in water relative to the gas received from the humidifier gas inlet. Humidifier 402 may also produce a humidifier liquid outlet stream, a portion of which is returned to reservoir 408 and a portion of which is flowed through heat exchanger 406 to be heated and reintroduced to the humidifier. Any humidifier known to those of ordinary skill in the art may be utilized in the context of the embodiments described herein. According to certain embodiments, the humidifier may be a packed bed humidifier. For example, in some such embodiments, humidification of the carrier gas may be achieved by spraying salt-containing water from one or more nozzles located at the top of the humidifier through a packing material (e.g., a polyvinyl chloride packing material or a glass-filled polypropylene packing material) while the carrier gas travels through the humidification chamber and is brought into contact with the salt-containing water. In some embodiments, the packing material may increase the surface area of the salt-containing water stream that is contact with the carrier gas, thereby increasing the portion of water that is vaporized into the carrier gas. In some embodiments, the humidifier may be a bubble column humidifier. It has been recognized that use of a bubble column humidifier may, in some cases, be preferable to use of other types of bubble column humidifiers (e.g., packed bed humidifiers). For example, bubble column humidifiers may be characterized by improved performance (e.g., higher rates of heat and/or mass transfer, higher thermodynamic effectiveness) and/or reduced fabrication and/or material costs (e.g., reduced dimensions).

Figure 4B:
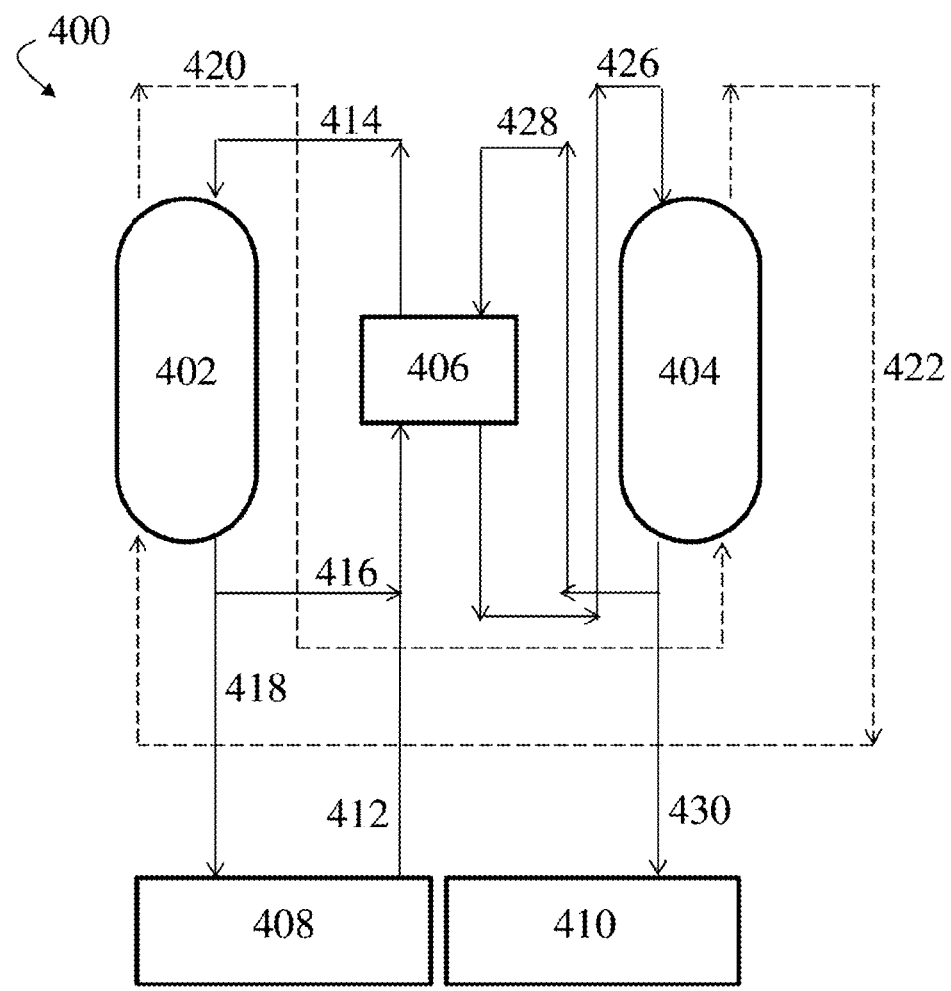
FIG. 4B shows, according to some embodiments, an exemplary schematic diagram of an HDH system including a bubble column condenser and an external heat exchanger, where the external heat exchanger is a counter flow device.

In some embodiments, dehumidifier 404 is a bubble column condenser as described herein. In some embodiments, condenser 404 is in fluid communication with reservoir 410 through conduit 430. Condenser 404 may also be in fluid communication with heat exchanger 406 via conduits 426 and 428. Heat exchanger 406 may be any heat exchanger known in the art, as described elsewhere herein. In some embodiments the heat exchanger is configured such that a first fluid stream and a second fluid stream flow through the heat exchanger in substantially opposite direction (e.g., counter flow). For example, FIG. 4B shows heat exchanger 406 as a counter flow device. The heat exchanger may, alternatively, be a parallel flow device and may be configured such that a first fluid stream and a second fluid stream flow in substantially the same direction. FIG. 4A shows heat exchanger 406 as a parallel flow device. In some embodiments, the heat exchanger is a cross flow device, and the heat exchanger is configured such that a first fluid stream and a second fluid stream flow in substantially perpendicular directions. In some cases, the heat exchanger is a liquid-to-liquid heat exchanger. In an exemplary embodiment, the heat exchanger is a plate and frame heat exchanger. In certain embodiments, heat exchanger 406 is in fluid communication with reservoir 410 via optional conduit 424. In operation, in the exemplary embodiment shown in FIG. 4A, a salt-containing water stream flows from reservoir 408 to heat exchanger 406 via conduit 412 to be heated prior to entering humidifier 402 (e.g., "preheated"). The preheated salt-containing water stream then travels from heat exchanger 406 through conduit 414 to humidifier 402. In some cases, a first portion of the preheated salt-containing water stream flows from heat exchanger 406 to humidifier 402, and, optionally, a second portion of the preheated salt-containing water stream is discharged from the system and/or routed to another portion of the system. Separately, and in a direction that is opposite to the direction of flow for the preheated salt-containing water stream, a carrier gas stream provided by condenser 404 is flowed through humidifier 402. In humidifier 402, the carrier gas stream, which is at a temperature that is lower than the preheated salt-containing water stream, is heated and humidified by the preheated salt-containing water stream. The humidified carrier gas stream exits humidifier 402 and flows through gas conduit 420 to dehumidifier 404. A portion of the salt-containing water stream returns to reservoir 408 via conduit 418, and a portion flows through liquid conduit 416 to heat exchanger 406 to be preheated before being returned to humidifier 402 via liquid conduit 414.

The humidified carrier gas stream is then flowed through bubble column condenser 404. Flowing countercurrent to the humidified carrier gas stream in the bubble column condenser is a condenser liquid stream that flows from heat exchanger 406 to bubble column condenser 404 through conduit 426. In some embodiments, the condenser liquid stream comprises purified water, which may be substantially pure water. In some cases, a first portion of the condenser liquid stream that has flowed through heat exchanger 406 is flowed to bubble column condenser 404 and, optionally, a second portion of the condenser liquid stream that has flowed through heat exchanger 406 is discharged from the system and/or routed to another portion of the system. In some cases in which a portion of the condenser liquid stream is discharged from the system, the rate that the liquid stream is discharged is about the same as the rate that the liquid is being condensed, in order to maintain a constant volume of water in the system. In bubble column condenser 404, the humidified carrier gas stream undergoes a condensation process as described elsewhere herein, wherein heat and mass are transferred from the humidified carrier gas stream to the condenser liquid stream, producing a dehumidified carrier gas stream and a condenser liquid outlet stream. The dehumidified gas stream is returned to humidifier 402 via gas conduit 422 for use as described herein. In some embodiments, a portion of the condenser liquid outlet stream is flowed through liquid conduit 430 to reservoir 410. The purified water that is collected in reservoir 410 can be used, for example, for drinking, watering crops, washing/cleaning, cooking, for industrial use, etc. The remaining portion of the condenser liquid outlet stream that is not flowed to reservoir 410 is returned to heat exchanger 406 via liquid conduit 428. As described herein, heat from the condenser liquid outlet stream may be transferred to the salt-containing water stream flowing through liquid conduits 412, 414, and 416. After flowing through heat exchanger 406, the condenser liquid outlet stream then flows through liquid conduit 426 and returns to condenser 404 for reuse.

Figure 4C:
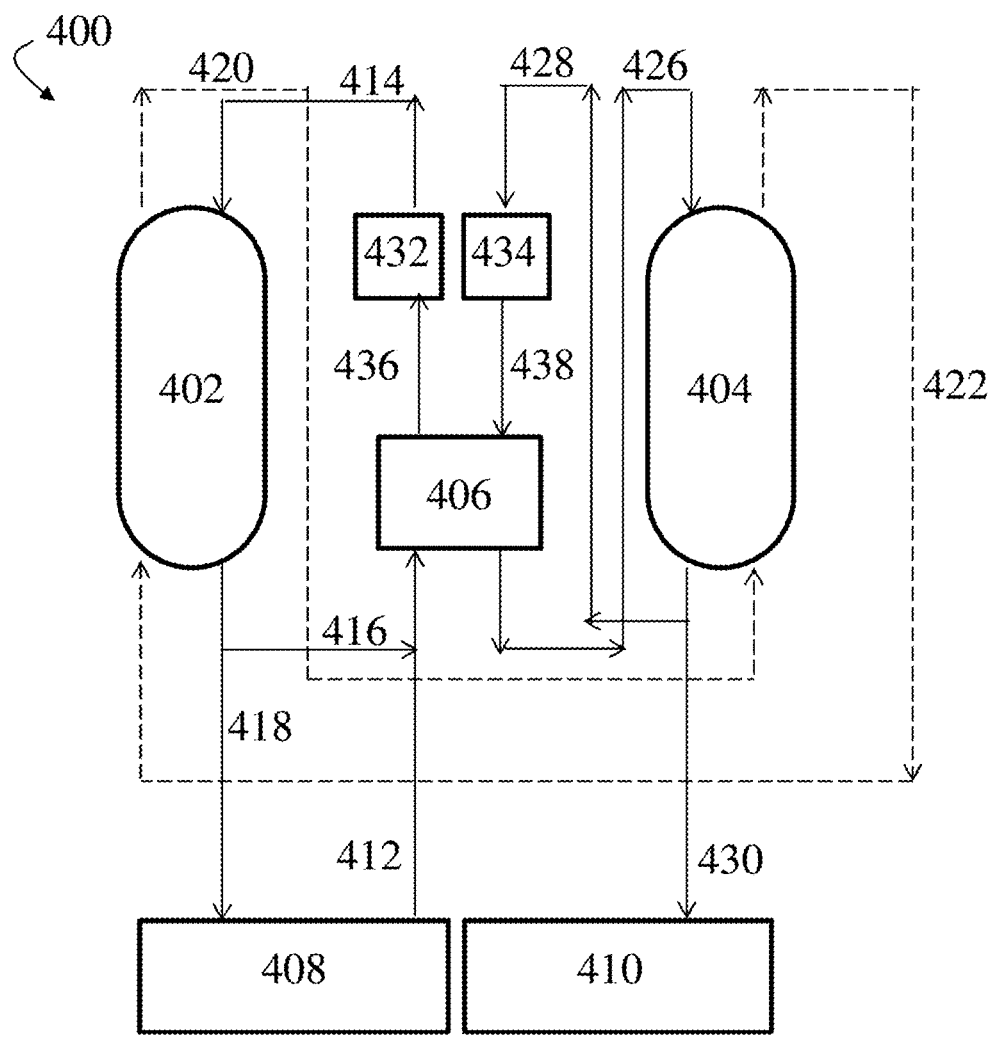
FIG. 4C shows, according to some embodiments, an exemplary schematic diagram of an HDH system including a bubble column condenser, an external heat exchanger, a first external heating device, and a second external heating device.

In some embodiments, an HDH system optionally comprises one or more heating devices. An exemplary embodiment of an HDH system comprising two heating devices is shown in FIG. 4C. In FIG. 4C, first heating device 432 is arranged to be in fluid communication with heat exchanger 406 via liquid conduit 436 and in fluid communication with humidifier 402 via liquid conduit 414. Second heating device 434 is arranged to be in fluid communication with heat exchanger 406 via liquid conduit 438 and condenser 404 via liquid conduit 428. The first heating device and second heating device may be any device that is capable of transferring heat to a fluid stream. In some embodiments, the first and/or second heating device is a heat exchanger. The heat exchanger may be any heat exchanger known in the art, as described elsewhere herein (e.g., a plate and frame heat exchanger). In some embodiments, the first and/or second heating device is a heat collection device. In some cases, the heat collection device may be configured to store and/or utilize thermal energy (e.g., in the form of combustion of natural gas, solar energy, waste heat from a power plant, or waste heat from combusted exhaust). In certain cases, the heating device is configured to convert electrical energy to thermal energy (e.g., an electric heater).

The first and/or second heating device may, in some cases, increase the temperature of a fluid stream flowing through the first and/or second heating device. For example, the difference between the temperature of a fluid stream entering the first and/or second heating device and the fluid stream exiting the first and/or second heating device may be at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the difference between the temperature of a fluid stream entering the first and/or second heating device and the fluid stream exiting the first and/or second heating device may be in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 60° C., about 20° C. to about 90° C., about 30° C. to about 60° C., about 30° C. to about 90° C., or about 60° C. to about 90° C.

In operation, a salt-containing water stream may first flow through heat exchanger 406. In heat exchanger 406, heat may be transferred from another fluid stream (e.g., a condenser liquid stream) to the salt-containing water stream, resulting in a heated salt-containing water stream. The heated salt-containing water stream may then be flowed through liquid conduit 436 to first heating device 432 to be heated, resulting in a further heated salt-containing water stream. The further heated salt-containing water stream may then be flowed to humidifier 402.

In the opposite direction, a condenser liquid stream exiting dehumidifier 404 may flow through liquid conduit 428 to second heating device 434 to be heated, resulting in a heated condenser liquid stream. The heated condenser liquid stream may then be directed to flow through liquid conduit 438 to heat exchanger 406, and heat may be transferred from the heated condenser liquid stream to the salt-containing water stream, resulting in a chilled condenser liquid stream. The chilled condenser liquid stream may then be returned to condenser 404 through liquid conduit 426.

It should be noted that although FIG. 4C shows a first heating device and a second heating device, the first and second heating devices may independently be present or absent in an HDH system. In some embodiments, a first heating device further heats a salt-containing water stream after the stream has flowed through a heat exchanger. In some embodiments, a second heating device heats a condenser liquid stream prior to the stream flowing through the heat exchanger. In some cases, the first heating device heats the salt-containing water stream and the second heating device heats the condenser liquid stream. In some embodiments, a single heating device may function as the first heating device and second heating device and heat both the salt-containing water stream and the condenser liquid stream. Further, there may be any number of heating devices present in HDH system 400.

The humidifier may, in some cases, be substantially thermally separated from the bubble column condenser. As used herein, substantial thermal separation generally refers to a configuration such that there is little to no direct conductive heat transfer between the humidifier and the bubble column condenser, for example through a shared heat transfer wall. However, it should be understood that such a configuration does not preclude a mass flow carrying thermal energy (via gas and/or liquid flow) between the humidifier and the condenser.

Those of ordinary skill in the art would be able to select the appropriate conditions under which to operate the HDH systems described herein for desired performance given the teaching and guidance of the present specification combined with the knowledge and skill of the person of ordinary skill in the art. In some embodiments, the pressure in the humidification and/or dehumidification chamber is approximately ambient atmospheric pressure. According to certain embodiments, the pressure in the humidification and/or dehumidification chamber is less than about 90,000 Pa. It may be desirable, in some embodiments, for the pressure in the humidifier to be less than approximately ambient atmospheric pressure. In some cases, as the pressure inside the humidifier decreases, the ability of the humidified carrier gas to carry more water vapor increases, allowing for increased production of substantially pure water when the carrier gas is dehumidified in the condenser. Without wishing to be bound by a particular theory, this effect may be explained by the humidity ratio, which generally refers to the ratio of water vapor mass to dry air mass in moist air, being higher at pressures lower than atmospheric pressure. Those of ordinary skill in the art would be able to select appropriate temperature and flow rate conditions for the HDH system components. In some embodiments, the selected conditions may be within the ranges described herein for the bubble column condenser.

According to some embodiments, a portion of the gas flow is extracted from at least one intermediate location in the humidifier and injected into at least one intermediate location in the bubble column condenser. Because the portion of the gas flow exiting the humidifier at an intermediate outlet (e.g., the extracted portion) has not passed through the entire humidifier, the temperature of the gas flow at the intermediate outlet may be lower than the temperature of the gas flow at the main gas outlet of the humidifier. The location of the extraction points (e.g., outlets) and/or injection points (e.g., inlets) may be selected to increase the thermal efficiency of the system. For example, because a gas (e.g., air) may have increased vapor content at higher temperatures than at lower temperatures, and because the heat capacity of a gas with higher vapor content may be higher than the heat capacity of a gas with lower vapor content, less gas may be used in higher temperature areas of the humidifier and/or bubble column condenser to better balance the heat capacity rate ratios of the gas (e.g., air) and liquid (e.g., water) streams. Extraction and/or injection at intermediate locations may advantageously allow for manipulation of gas mass flows and for greater heat recovery. For example, a 30% intermediate extraction at 160° F. from a humidifier with a top moist air temperature of 180° F. and injection after the second stage in an 8-stage bubble column can reduce energy consumption by about 40% to about 50%.

It should be recognized that in some embodiments, under some operating conditions, extraction may not increase the thermal efficiency of an HDH system. Additionally, there may be drawbacks associated with extraction at intermediate locations. For example, extraction may reduce the water production rate of the system, and there may be significant monetary costs associated with extraction (e.g., costs associated with instrumentation, ducting, insulation, and/or droplet separation). Accordingly, in some cases, it may be advantageous to build and/or operate a system without extraction.

In some embodiments, the HDH system further comprises an optional cooling device. The cooling device may be any device that is capable of removing heat from a fluid stream, as described elsewhere herein. In some embodiments, the cooling device is a heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). In some cases, heat is transferred from a first fluid stream to a second fluid stream. In certain embodiments, the cooling device is a liquid-to-gas heat exchanger. The first fluid stream may, in certain cases, comprise a fluid stream that is part of a loop of condenser liquid flowing between a condenser and a heat exchanger (e.g., a condenser liquid outlet stream). The second fluid stream may, in some cases, comprise a coolant. The coolant may be any fluid capable of absorbing or transferring heat. In some embodiments, the coolant comprises a gas. The gas may, in some cases, comprise air (e.g., ambient air). Heat exchangers that comprise air as a coolant may generally be referred to as air-cooled heat exchangers. In some cases, more than two fluid streams flow through the cooling device. It should also be noted that the cooling device may, in some embodiments, be a dry cooler, a chiller, a radiator, or any other device capable of removing heat from a fluid stream.

In some cases, the presence of a cooling device in an HDH system can advantageously increase the amount of water recovered in the HDH system. In the absence of a cooling device, a fresh water stream entering a dehumidifier may be cooled in a heat exchanger through transfer of heat to a cooled salt-containing water stream. In the absence of a cooling device, the temperature of the fresh water stream flowing through a dehumidifier may therefore limited by the temperature of the brine stream. In the presence of a cooling device, the temperature of the fresh water entering the dehumidifier may no longer be limited by the temperature of the brine stream, and lower temperatures may be achieved. Since air can generally hold less vapor at lower temperatures, more water may be recovered at lower temperatures. In some cases, the cooling device may increase water production by at least about 5%, at least about 10%, at least about 20%, at least about 30%, at least about 40%, or at least about 50%. The inclusion of a cooling device may, in some cases, advantageously increase water production with a minimal concomitant increase in electricity consumption.

In some embodiments, one fluid stream flowing through the cooling device is a condenser liquid stream. The condenser liquid stream may, in some cases, comprise purified water, which may be substantially pure water. For example, the condenser liquid stream may comprise part of a loop of condenser liquid (e.g., purified water) flowing between a condenser and a heat exchanger. In certain embodiments, one fluid stream flowing through the cooling device comprises air (e.g., ambient air). The cooling device may be arranged, in some cases, such that the condenser liquid stream flows through the cooling device after flowing through a heat exchanger. In some cases, the cooling device may be arranged such that the condenser liquid stream flows through the cooling device before flowing through a dehumidifier (e.g., a bubble column condenser).

In some cases, the cooling device decreases the temperature of the condenser liquid stream. In some embodiments, the cooling device decreases the temperature of the condenser liquid stream by at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the cooling device decreases the temperature of the condenser liquid stream by an amount in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 60° C., about 20° C. to about 90° C., about 30° C. to about 60° C., about 30° C. to about 90° C., or about 60° C. to about 90° C.

Figure 9:
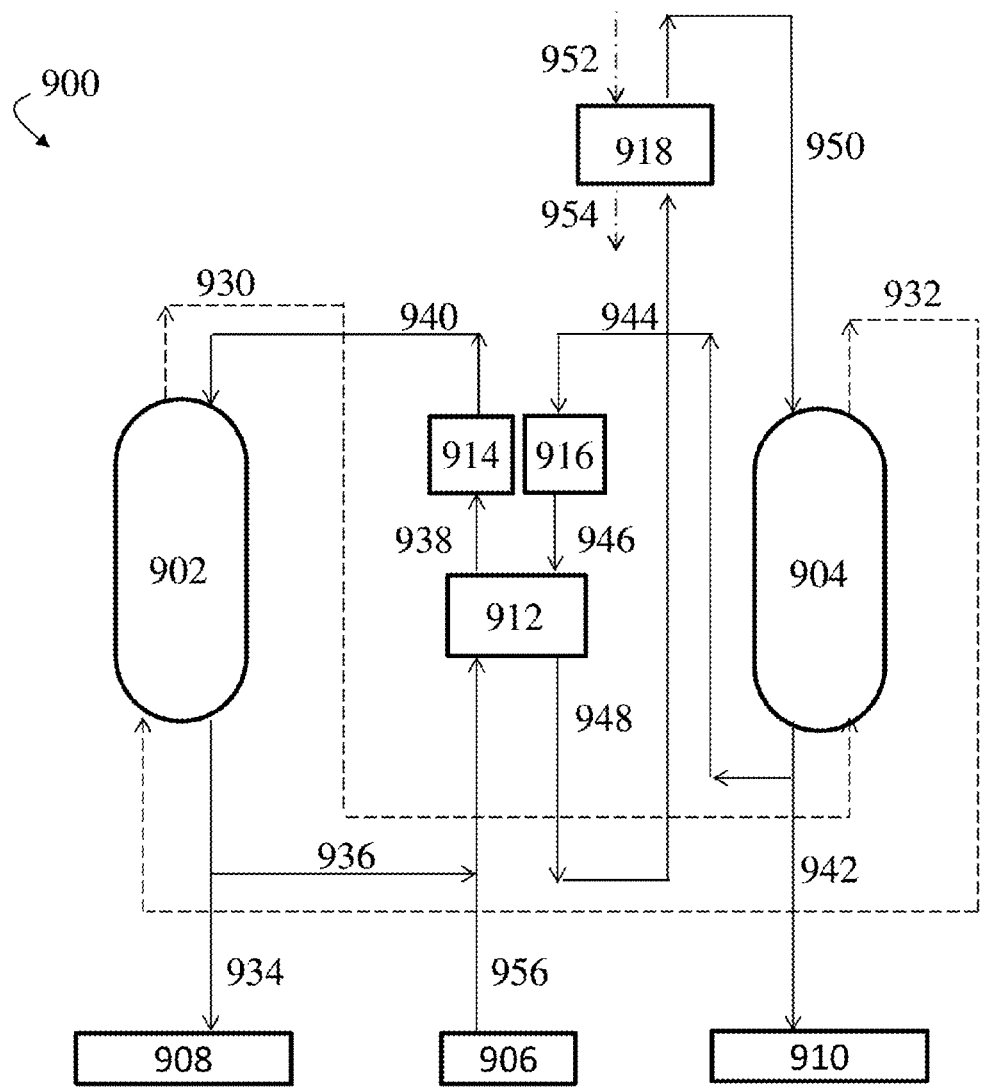
FIG. 9 shows, according to some embodiments, an exemplary schematic diagram of an HDH system including a bubble column condenser, a heat exchanger, a first heating device, a second heating device, and a cooling device.

An exemplary embodiment of an HDH system comprising a cooling device is shown in FIG. 9. In FIG. 9, HDH system 900 comprises a humidifier 902, a dehumidifier 904, a first reservoir of salt-containing water 906, a second reservoir of salt-containing water 908, a reservoir of purified water 910, a heat exchanger 912, an optional first heating device 914, an optional second heating device 916, and a cooling device 918. Humidifier 902 and dehumidifier 904 are arranged in fluid communication via gas conduits 930 and 932. In addition to being in fluid communication with dehumidifier 904, humidifier 902 is arranged to be in fluid communication with second reservoir of salt-containing water 908 via liquid conduit 934. Humidifier 902 is also arranged to be in fluid communication with heat exchanger 912 via liquid conduit 936 and optional first heating device 914 via liquid conduit 940. Dehumidifier 904, in addition to being in fluid communication with humidifier 902, is arranged to be in fluid communication with reservoir of purified water 910 via liquid conduit 942, optional second heating device 916 via liquid conduit 944, and cooling device 918 via liquid conduit 950. Dehumidifier 904 may be a bubble column condenser as described herein. In some embodiments, cooling device 918 is arranged to be in fluid communication with heat exchanger 912 via liquid conduit 948. Cooling device 918 is also arranged to be in fluid communication with a gas stream (e.g., an air stream) through gas conduits 952 and 954. First reservoir of salt-containing water 906 is arranged to be in fluid communication with heat exchanger 912 via liquid conduit 956. First reservoir of salt-containing water 906 may also be fluidly connected to an external source of salt-containing water (e.g., from oil and/or gas production), not shown in FIG. 9.

In operation, a salt-containing water stream may flow from first reservoir of salt-containing water 906 to heat exchanger 912. Heat may be transferred from another fluid stream (e.g., a condenser liquid stream) to the salt-containing water stream, resulting in a heated salt-containing water stream. The heated salt-containing water stream may then flow to optional first heating device 914 via liquid conduit 938 to be further heated. The further heated salt-containing water stream may be directed to flow to humidifier 902 via liquid conduit 940. In humidifier 902, at least a portion of water may be evaporated to a carrier gas stream flowing through humidifier 902 counterflow to the salt-containing water stream. A first portion of the remaining salt-containing water that is not evaporated may then flow to second salt-containing reservoir 908 via liquid conduit 934. A second portion of the remaining salt-containing water that is not evaporated may be recirculated to heat exchanger 912 via liquid conduit 936.

A carrier gas stream may flow in a direction opposite that of the salt-containing water stream. The carrier gas stream may enter humidifier 902 and come into contact with the heated salt-containing water stream. Water may be evaporated to the carrier gas stream, thereby resulting in a humidified carrier gas stream. The humidified carrier gas stream may flow to dehumidifier 904 via gas conduit 930. In dehumidifier 904, the humidified carrier gas stream may come into contact with a chilled condenser liquid stream flowing in the opposite direction. Heat and mass may be transferred from the humidified carrier gas stream to the chilled condenser liquid stream as water is condensed from the humidified carrier gas stream, resulting in a dehumidified carrier gas stream. The dehumidified carrier gas stream may be flowed to humidifier 902 via gas conduit 932.

A condenser fluid (e.g., water) stream may flow through dehumidifier 904 counterflow to the carrier gas stream. As the condenser fluid stream flows through dehumidifier 904, water may be condensed from the humidified carrier gas stream to the condenser liquid stream, thereby resulting in a condenser liquid outlet stream. At least a portion of the condenser liquid outlet stream may flow through liquid conduit 942 to reservoir of purified water 910. At least a portion of the condenser liquid outlet stream may flow through optional second heating device 916 via liquid conduit 944. In optional second heating device 914, the condenser liquid outlet stream may be heated, resulting in a heated condenser liquid outlet stream. In some cases, the heated condenser liquid outlet stream may flow to heat exchanger 912 via liquid conduit 946. In heat exchanger 912, the heated condenser liquid outlet stream may transfer heat to the salt-containing water stream, resulting in a chilled condenser liquid outlet stream. The chilled condenser liquid outlet stream may then flow to cooling device 918 via liquid conduit 948. A gas stream may also flow through cooling device 918. The two streams may flow parallel, counter flow, or cross flow to each other. In some embodiments, the gas stream comprises air. The air may, for example, enter cooling device 918 through gas conduit 952 and exit cooling device 918 through gas conduit 954. In some embodiments, heat may be transferred from the chilled condenser liquid outlet stream to the air, resulting in a further chilled condenser liquid outlet stream. The further chilled condenser liquid outlet stream may then be flowed to dehumidifier 904 through liquid conduit 950.

EXAMPLE 1

Figure 5:
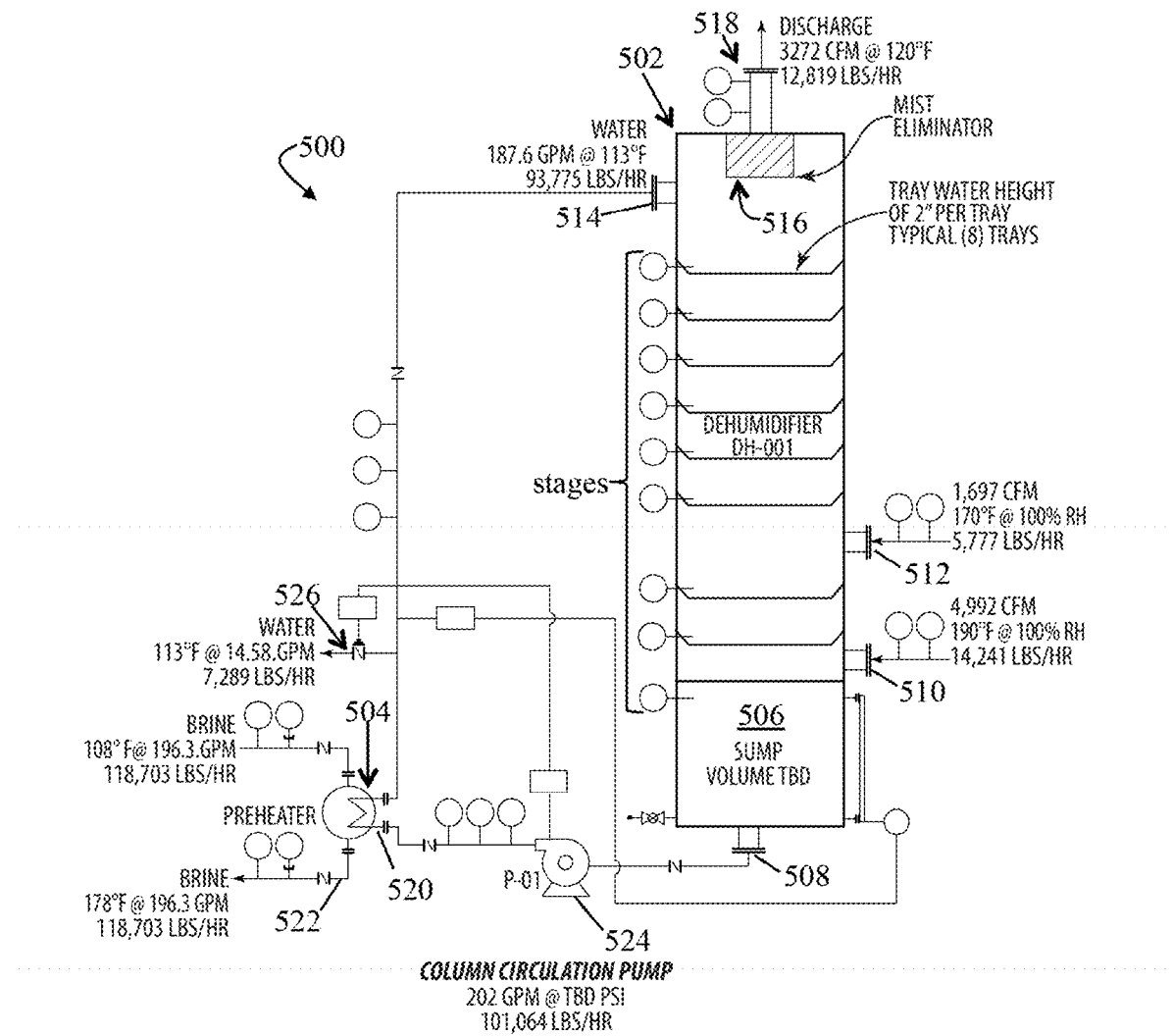
FIG. 5 shows an exemplary schematic diagram of an eight-stage bubble column condenser and an external heat exchanger, according to some embodiments.

In the following example, an 8-stage bubble column condenser and a heat exchanger for use in a humidification-dehumidification system are described. As shown in FIG. 5, system 500 includes custom-designed condenser 502 and heat exchanger 504 in fluid communication with one another. The exterior of the condenser comprises stainless steel, and the condenser has the shape of a rectangular prism. Eight stages, as described herein, are arranged vertically within the bubble condenser, with a sump volume 506 located beneath the stages in fluid communication with a liquid outlet 508. Each stage comprises a sparger plate (1.8 m long, 0.6 m wide, and 0.06 m tall, having a plurality of holes with a diameter of about 0.003 m) and a chamber in which a liquid bath can reside. A first gas inlet 510 is positioned below the sparger plate located near the bottom of the bubble column condenser, and a second gas inlet 512 is positioned at an intermediate location between. Above the topmost stage, a liquid inlet 514 and a mist eliminator (e.g., droplet eliminator) 516 that is coupled to a first gas outlet 518 are arranged.

Bubble column condenser 502 is coupled to heat exchanger 504, which has two conduits 520 and 522. First conduit 520 is fluidically connected to liquid inlet 514 and outlet 508 of the bubble column condenser. Second conduit 522 is fluidically connected to other components of a humidification-dehumidification system.

When the humidification-dehumidification system (i.e., containing the 8-stage bubble column condenser and heat exchanger as described) is in operation, a first stream of dry air enters the bubble column through first gas inlet 510 at a temperature of about 88° C., 100% relative humidity, a volumetric flow rate of 4,992 cubic feet per minute (cfm), and a mass flow rate of 14,241 lbs/hr. A second stream of dry air enters the bubble column condenser through second gas inlet 512 at a temperature of about 77° C., 100% relative humidity, a volumetric flow rate of 1,697 cfm, and a mass flow rate of 5,777 lbs/hour. A liquid stream enters the condenser at liquid inlet 514, at a temperature of about 45° C., a volumetric flow rate of 187.6 gallons per minute (gpm), and a mass flow rate of 93.8 lbs/hr. During operation, a gas outlet stream and a liquid outlet stream are produced as described herein. The gas outlet stream exits at gas outlet 518 at a temperature of about 49° C., a volumetric flow rate of about 3272 cfm, and a mass flow rate of 12,819 lbs/hr. The liquid outlet stream exits the bubble column condenser and is pumped by a column circulation pump 524 at a volumetric flow rate of 202 gallons per minute and a mass flow rate of 101,064 lbs/hour. The liquid outlet stream passes through one conduit of the heat exchanger. Heat is transferred from the liquid outlet stream to a salt-containing water stream flowing through conduit 522 of the heat exchanger (e.g., the stream that is heated by the condenser liquid outlet stream in the heat exchanger). The salt-containing water stream enters the heat exchanger at about 42° C., a volumetric flow rate of 196.3 GPM, and a mass flow rate of 118,703 lbs/hr, and leaves at about 81° C., a volumetric rate of 196.3 GPM, and a mass flow rate of 118,703 lbs/hr. A portion of the liquid outlet stream is directed to a substantially pure water reservoir via valve 526 at a temperature of about 45° C., a volumetric flow rate of 14.58 gallons per minute, and a mass flow rate of about 7,289 lbs/hr. The remaining portion of the liquid outlet stream returns to condenser 502 through liquid inlet 514. While the system is undergoing substantially continuous operation, each stage of the bubble column condenser contains about 0.1 m or less of water.

Table 1 lists the constituents of a salt-containing water stream prior to and after treatment (e.g., desalination) using the humidification-dehumidification system described in this Example. It is noted that the concentrations of calcium and magnesium appeared to increase after treatment. This may be due to the bubble column initially being supplied with local drinking water (e.g., from Midland, Tex.). The local drinking water was hard and had relatively high concentrations of calcium and magnesium. As a result, trace amounts of calcium and/or magnesium may have remained in the bubble column during testing, and trace amounts of the elements may have been present in the desalination effluent (e.g., the water stream after treatment). In contrast, pretreatment systems upstream of the desalination system may have removed almost all of the calcium and magnesium from the feed water stream (e.g., the water stream before treatment). Accordingly, the water stream after treatment may have contained higher concentrations of calcium and magnesium than the water stream before treatment.

An additional exemplary embodiment of an 8-stage bubble column condenser is shown in FIG. 7. In FIG. 7A, bubble column condenser 700 comprises gas inlets 702 and 704, gas outlet 706, and liquid inlet 708. FIG. 7B shows another view of condenser 700, which comprises eight stages as described herein. FIGS. 7C-I show additional views of the bubble column condenser and its components.

TABLE 1

Salt-containing water profile before and after treatment (i.e., desalination).

| Constituent | Concentration Before Treatment | Concentration After Treatment |
| --- | --- | --- |
| Oil and Grease | ND | ND |
| Total Suspended Solids | 57 mg/L | ND |
| Total Dissolved Solids | 28,400 mg/L | 35 mg/L |
| Barium | .701 mg/L | .005 mg/L |
| Bromide | 1050 mg/L | 1.16 mg/L |
| Calcium | ND | 7.08 mg/L |
| Chloride | 13,300 mg/L | 5.0 mg/L |
| Sulfate | 1020 mg/L | 5.1 mg/L |
| Magnesium | ND | 0.775 mg/L |
| Aluminum | 37.5 mg/L | 0.077 mg/L |
| Sodium | 11,800 mg/L | 3.09 mg/L |
| Strontium | 67 mg/L | 0.079 ppm |
| Zinc | ND | ND |
| Benzene | 37.5 ug/L | ND |
| Toluene | 32.1 ug/L | ND |
| Alkalinity (CaCO3) | 3260 mg/L | ND |
| Recovery Ratio | — | 82% |

(ND = Not determinable)

EXAMPLE 2

In this example, an 8-stage bubble column condenser and an external heat exchanger for use in a humidification-dehumidification system are described.

Figure 10A:
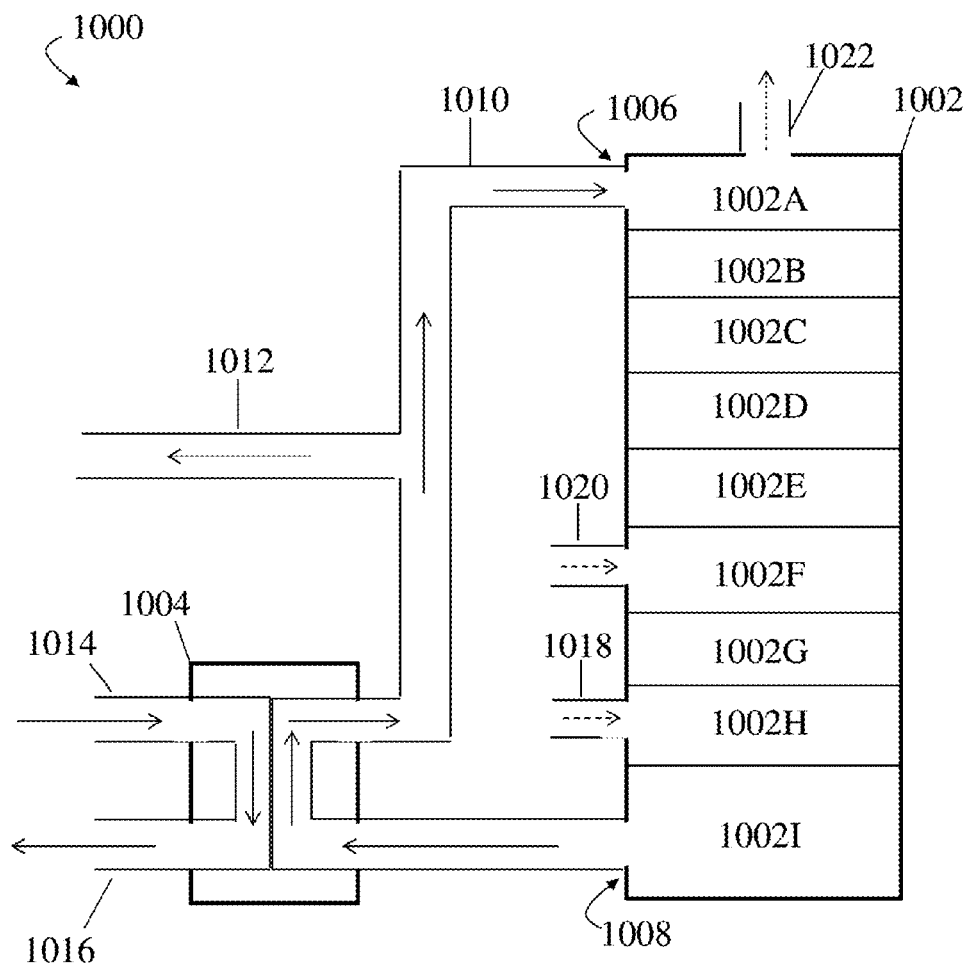
FIG. 10A shows, according to some embodiments, an exemplary schematic illustration of an eight-stage bubble column condenser and an external heat exchanger.

As shown in FIG. 10A, system 1000 comprised an 8-stage bubble column condenser 1002 and a heat exchanger 1004, which were in fluid communication with each other. Condenser 1002 and heat exchanger 1004 were also in fluid communication with a humidifier (not shown). In condenser 1002, eight stages 1002A, 1002B, 1002C, 1002D, 1002E, 1002F, 1002G, and 1002H were arranged vertically within the condenser. Above topmost stage 1002A, a liquid inlet 1006 and a gas outlet 1022 were arranged. A sump volume 1002I was located at the bottom of condenser 1002, beneath the bottommost stage. Sump volume 1002I was in fluid communication with a liquid outlet 1008. In addition, condenser 1002 further comprised a first gas inlet 1018 positioned near the bottom of condenser 1002 and a second gas inlet 1020 positioned at an intermediate location, between the top and bottom of condenser 1002.

In operation, a stream of substantially pure water entered condenser 1002 through liquid inlet 1006 and flowed downward through each stage of condenser 1002. A stream of humidified carrier gas flowed counterflow to the substantially pure water stream, entering condenser 1002 through gas inlets 1018 and 1020 and flowing upwards through condenser 1002. As the two streams flowed through condenser 1002, heat and mass were transferred from the humidified carrier gas stream to the substantially pure water stream. As a result, the temperature of the substantially pure water stream increased as it flowed through each stage. In uppermost stage 1002A, the temperature of the water stream was 141.6° F. The temperature in stage 1002B was 148.3° F., the temperature in stage 1002C was 154.7° F., the temperature in stage 1002D was 161.5° F., the temperature in stage 1002E was 166.8° F., the temperature in 1002F was 170.1° F., the temperature in stage 1002G was 172.1° F., and the temperature in stage 1002H was 172.8° F. Sump volume 1002I, located at the bottom of condenser 1002, had 7.7 inches of water. The substantially pure water stream then exited condenser 1002 through liquid outlet 1008 at a temperature of 173.4° F.

As the substantially pure water stream exited condenser 1002, a pump (not shown) operating at 68.6% capacity pumped the water stream to heat exchanger 1004 at a volumetric flow rate of 180.8 gallons per minute. As the substantially pure water stream flowed through heat exchanger 1004, heat was transferred from the substantially pure water stream to another fluid stream flowing through heat exchanger 1004, and the temperature of the substantially pure water stream was reduced from 173.4° F. to 142.7° F. After flowing through heat exchanger 1004 and becoming chilled, a first portion of the chilled substantially pure water stream was flowed through liquid conduit 1012 to a purified water reservoir (not shown), and a second portion of the chilled substantially pure water stream returned to condenser 1002 via conduit 1010 through liquid inlet 1006.

In heat exchanger 1004, a salt-containing water stream was flowed counterflow to the substantially pure water stream. Initially, the salt-containing water stream flowed from a source of salt-containing water through liquid conduit 1014. As it entered heat exchanger 1004, the salt-containing water stream was at a temperature of 121.3° F. and a pressure of 43.4 psi. After flowing through heat exchanger 1004 and receiving heat transferred from the substantially pure water stream, the temperature of the salt-containing water stream increased to 165.0° F. The pressure of the salt-containing water stream was 40.1 psi. The heated salt-containing water stream was then flowed to the humidifier.

EXAMPLE 3

This example describes the 8-stage bubble column condenser and external heat exchanger of Example 2, with the addition of an external cooling device.

Figure 10B:
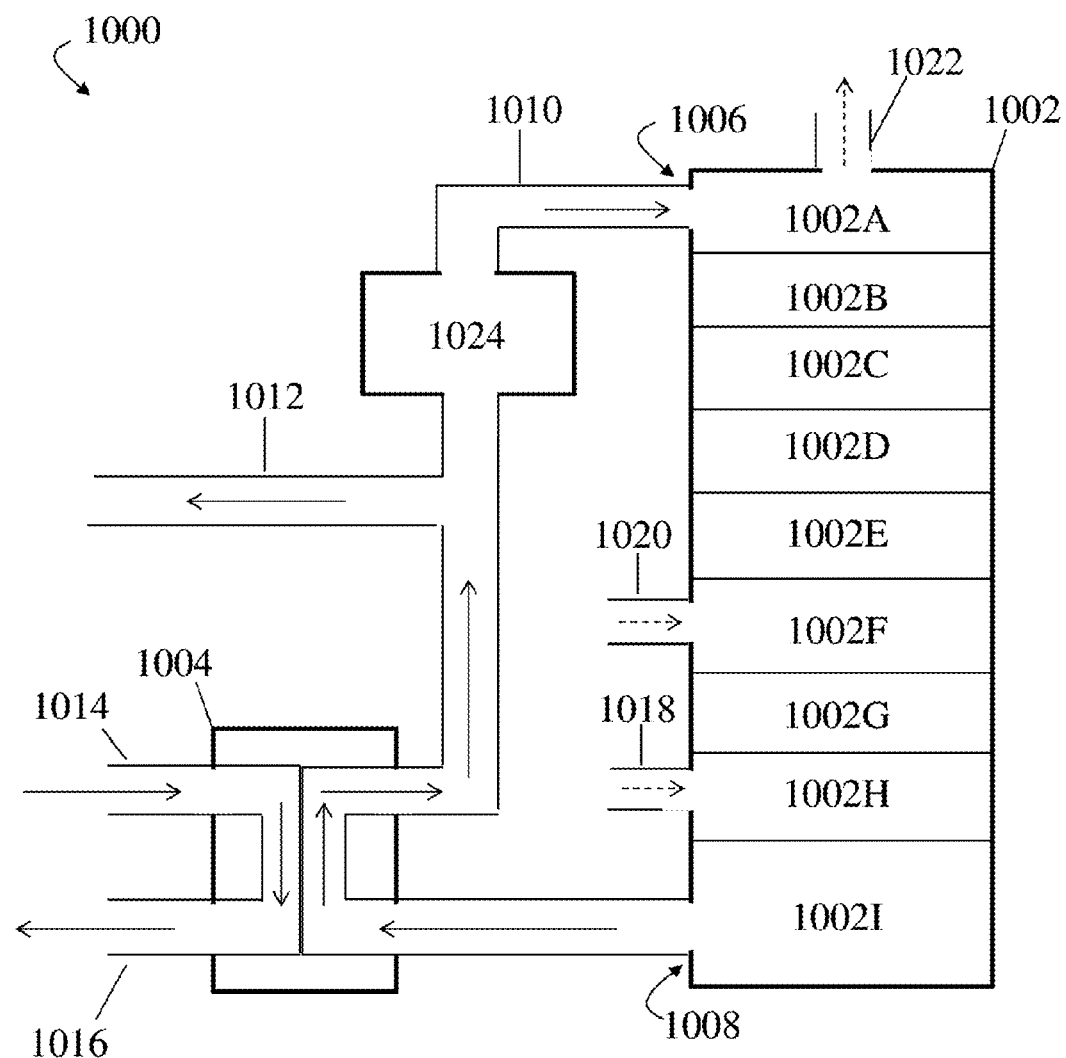
FIG. 10B shows, according to some embodiments, an exemplary schematic illustration of an eight-stage bubble column condenser, an external heat exchanger, and an external cooling device.

As shown in FIG. 10B, system 1000 comprised all the components shown in FIG. 10A and further comprised an external cooling device 1024 in fluid communication with bubble column condenser 1002 and heat exchanger 1004.

In operation, a stream of substantially pure water entered condenser 1002 through liquid inlet 1006 and flowed downward through each stage of condenser 1002. A stream of humidified carrier gas flowed counterflow to the substantially pure water stream, entering condenser 1002 through gas inlets 1018 and 1020 and flowing upwards through condenser 1002. As the two streams flowed through condenser 1002, heat and mass were transferred from the humidified carrier gas stream to the substantially pure water stream. As a result, the temperature of the substantially pure water stream increased as it flowed through each stage. In uppermost stage 1002A, the temperature of the water stream was 124.8° F. The temperature in stage 1002B was 133.6° F., the temperature in stage 1002C was 148.2° F., the temperature in stage 1002D was 158.6° F., the temperature in stage 1002E was 167.1° F., the temperature in 1002F was 171.6° F., the temperature in stage 1002G was 174.4° F., and the temperature in stage 1002H was 175.3° F. Sump volume 1002I, located at the bottom of condenser 1002, had 9.3 inches of water. The substantially pure water stream then exited condenser 1002 through liquid outlet 1008 at a temperature of 175.4° F.

As the substantially pure water stream exited condenser 1002, a pump (not shown) operating at 72.7% capacity pumped the water stream to heat exchanger 1004 at a volumetric flow rate of 191.0 gallons per minute. As the substantially pure water stream flowed through heat exchanger 1004, heat was transferred from the substantially pure water stream to another fluid stream flowing through heat exchanger 1004, and the temperature of the substantially pure water stream was reduced from 175.4° F. to 145.8° F. After flowing through heat exchanger 1004 and becoming chilled, a first portion of the chilled substantially pure water stream was flowed through liquid conduit 1012 to a purified water reservoir (not shown). A second portion of the chilled substantially pure water stream was flowed through a cooling device 1024. In cooling device 104, the second portion of the chilled substantially pure water stream was further chilled, and the temperature of the second portion of the chilled substantially pure water stream was further reduced to 120° F. The further chilled substantially pure water stream was then returned to condenser 1002 via conduit 1010 through liquid inlet 1006.

In heat exchanger 1004, a salt-containing water stream was flowed counterflow to the substantially pure water stream. Initially, the salt-containing water stream flowed from a source of salt-containing water through liquid conduit 1014. As it entered heat exchanger 1004, the salt-containing water stream was at a temperature of 133.8° F. and a pressure of 48.7 psi. After flowing through heat exchanger 1004 and receiving heat transferred from the substantially pure water stream, the temperature of the salt-containing water stream increased to 164.9° F. The pressure of the salt-containing water stream was 44.9 psi. The heated salt-containing water stream was then flowed to the humidifier.

EXAMPLE 4

Figure 11A:
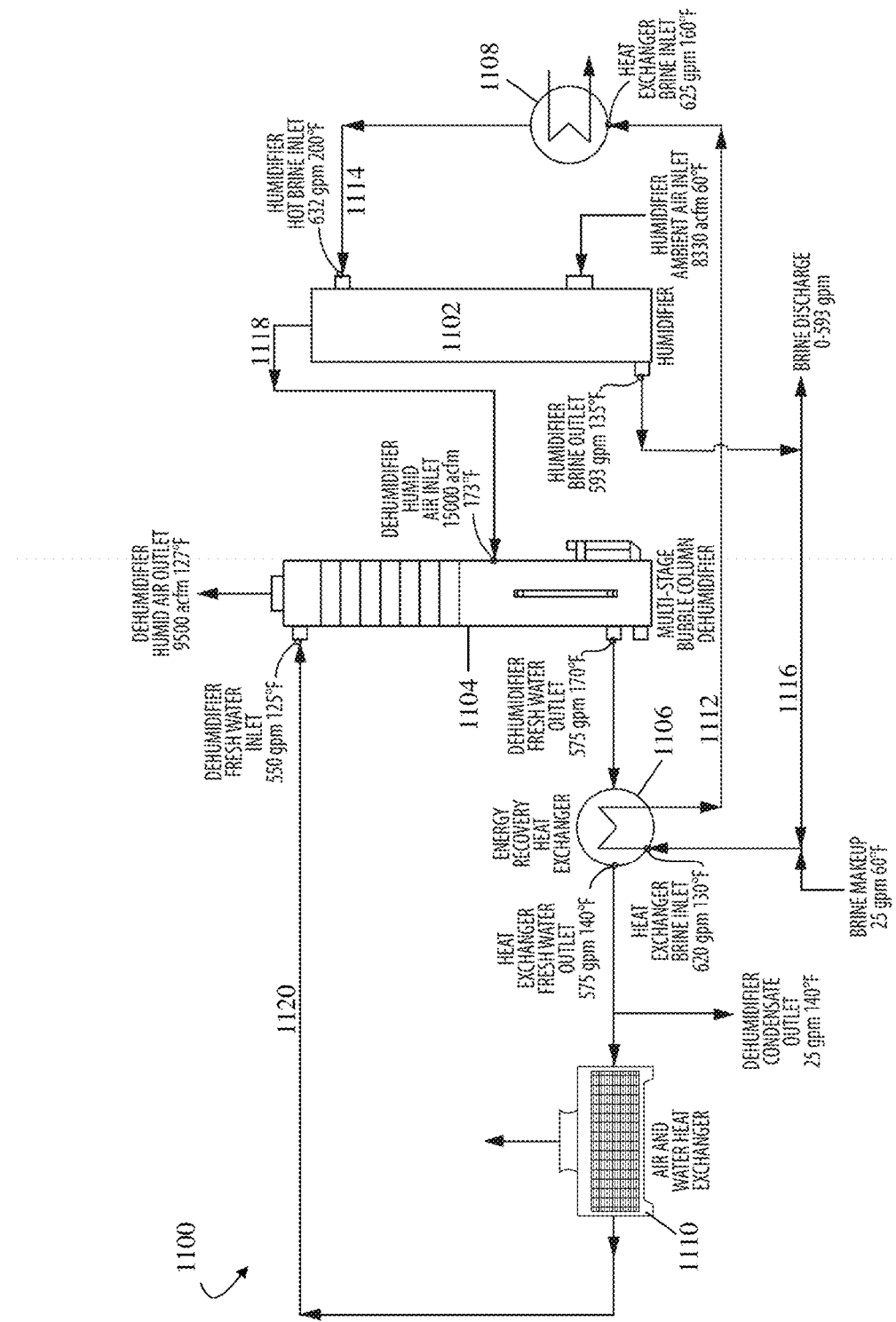
FIG. 11A shows, according to some embodiments, an exemplary schematic illustration of an HDH system comprising a bubble column condenser, a humidifier, an external heat exchanger, an external heating device, and an external cooling device.

As shown in FIG. 11A, this example describes an HDH system 1100, which comprises a humidifier 1102, a multi-stage bubble column condenser 1104, an external heat exchanger 1106, an external heating device 1108, and an external cooling device 1110.

In operation, a brine stream enters heat exchanger 1106, which is a plate-and-frame heat exchanger, at a flow rate of 620 gallons per minute (gpm) and a temperature of 130° F. In heat exchanger 1106, heat is transferred from a hot fresh water stream exiting condenser 1104 to the brine stream, and the temperature of the brine stream is increased by 30° F., from 130° F. to 160° F. This step advantageously recovers energy from the hot fresh water stream and reduces the amount of heat required to be supplied by heating device 1108.

The heated brine stream then flows through liquid conduit 1112 and enters heating device 1108 at a flow rate of 625 gpm and a temperature of 160° F. As the heated brine stream flows through heating device 1108, which is a plate-and-frame heat exchanger, heat is transferred from a stream of hot, pressurized water to the heated brine stream, resulting in the heated brine stream being further heated to a temperature of 200° F.

The further heated brine stream then flows through liquid conduit 1114 and enters humidifier 1102 at a flow rate of 632 gpm and a temperature of 200° F. As the further heated brine stream flows in a first direction from a brine inlet located at a first end (e.g., a top end) of humidifier 1102 to a brine outlet located at a second end (e.g., a bottom end) of humidifier 1102, the brine stream comes into direct contact with a stream of ambient air flowing in a second, substantially opposite direction through humidifier 1102. The stream of ambient air enters humidifier 1102 at a flow rate of 8,330 actual cubic feet per minute (acfm) and a temperature of 60° F. As the stream of ambient air flows in the second direction through humidifier 1102, heat and mass are transferred from the further heated brine stream to the ambient air stream, resulting in a humidified air stream and a concentrated brine stream. The concentrated brine stream exits humidifier 1102 at a flow rate of 593 gpm and a temperature of 135° F. and is subsequently discharged from HDH system 1100 via conduit 1116.

The humidified air stream exits humidifier 1102 through a main humidifier air outlet and flows through gas conduit 1118 to multi-stage bubble condenser 1104. The humidified air stream enters condenser 1104 through a main condenser humidified air inlet at a flow rate of 15,000 acfm and a temperature of 173° F. In condenser 1104, the humidified air stream comes into direct contact with a fresh water stream, which enters condenser 1104 through a condenser fresh water inlet at a flow rate of 550 gpm and a temperature of 125° F. In condenser 1104, heat and mass are transferred from the humidified air stream to the fresh water stream as water is condensed from the humidified air stream, resulting in a dehumidified air stream and a heated fresh water stream. The dehumidified air stream exits condenser 1104 through a condenser air outlet at a flow rate of 9,500 acfm and a temperature of 127° F. The heated fresh water stream exits condenser 1104 through a condenser fresh water outlet at a flow rate of 575 gpm and a temperature of 170° F. The heated fresh water stream then flows through heat exchanger 1106, where heat is transferred from the heated fresh water stream to the brine stream entering HDH system 1100, resulting in a cooled fresh water stream and the heated brine stream. After flowing through heat exchanger 1106, a first portion of the cooled fresh water stream exits HDH system 1100 via a condenser condensate outlet at a flow rate of 25 gpm and a temperature of 140° F. A second portion of the fresh water stream flows to cooling device 1110, which is an air-cooled heat exchanger. As the cooled fresh water stream flows through cooling device 1110, heat is transferred from the cooled fresh water stream to a stream of air, and the cooled fresh water stream is further cooled to a temperature of 125° F. The further cooled fresh water stream then returns to condenser 1104 through a condenser fresh water inlet at a flow rate of 550 gpm and a temperature of 125° F.

EXAMPLE 5

Figure 11B:
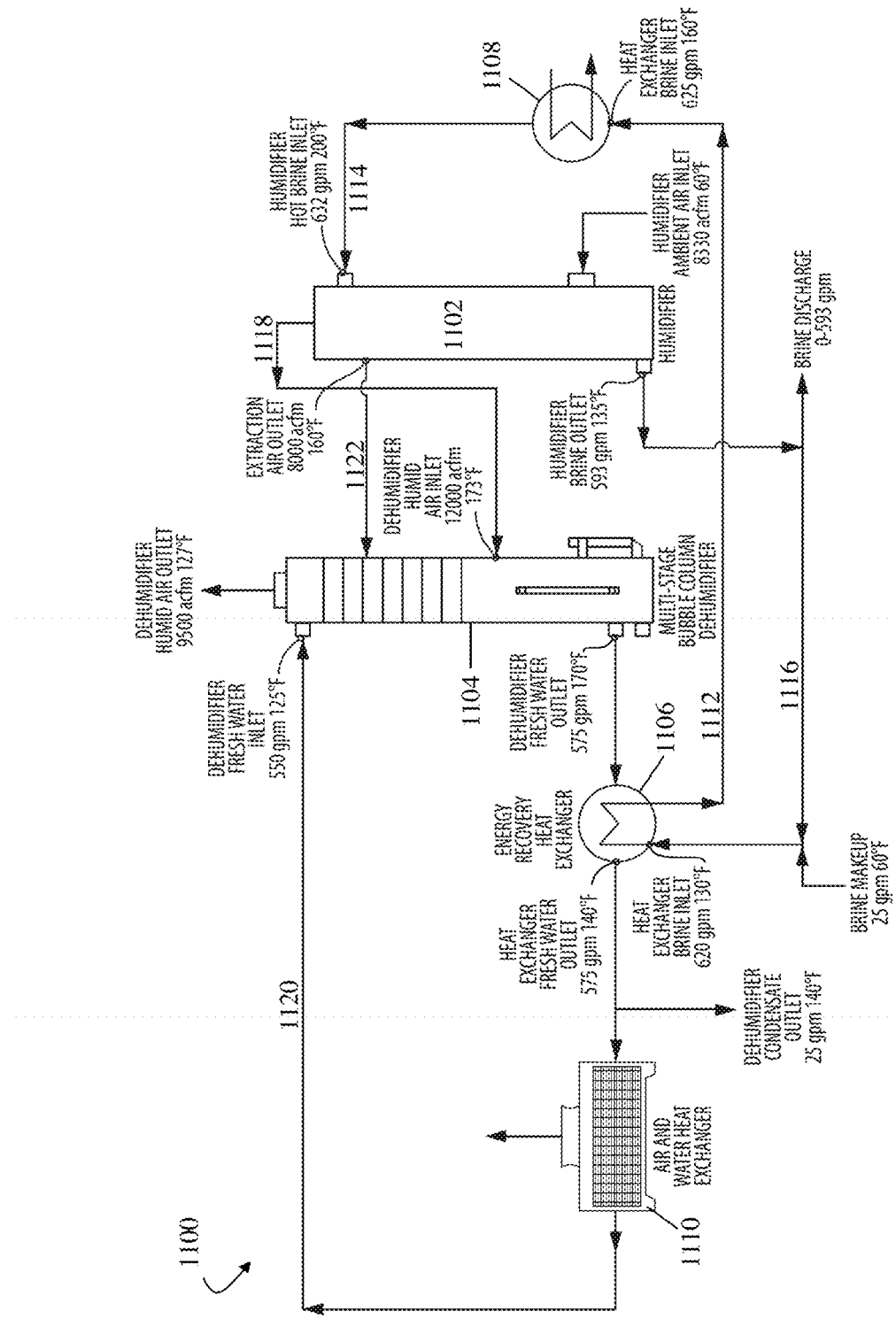
FIG. 11B shows, according to some embodiments, an exemplary schematic illustration of an HDH system comprising a bubble column condenser comprising an intermediate air inlet, a humidifier comprising an intermediate air outlet, an external heat exchanger, an external heating device, and an external cooling device.

This example describes the HDH system 1100 of Example 3, with the addition of an intermediate gas conduit 1122 connecting humidifier 1102 and condenser 1104. When this system, which is shown in FIG. 11B, is in operation, air is extracted from humidifier 1102 at an intermediate air outlet. The air subsequently flows through intermediate gas conduit 1122 and is injected directly into an intermediate location in condenser 1104. The locations of the extraction and injection points are selected in order to optimize the thermal efficiency of the system. Because the intermediate air stream is extracted from humidifier 1102 before the stream has flowed through the entire humidifier, the temperature of the intermediate air stream is lower than the temperature of the humidified air stream exiting humidifier 1102 through a main humidifier air outlet. For example, while the humidified air stream exiting humidifier 1102 through the main air outlet enters condenser 1104 at a flow rate of 12,000 acfm and a temperature of 173° F., the intermediate air stream exiting humidifier 1102 through the intermediate air outlet enters condenser 1104 at a flow rate of 8,000 acfm and a temperature of 160° F.

EXAMPLE 6

Figure 11C:
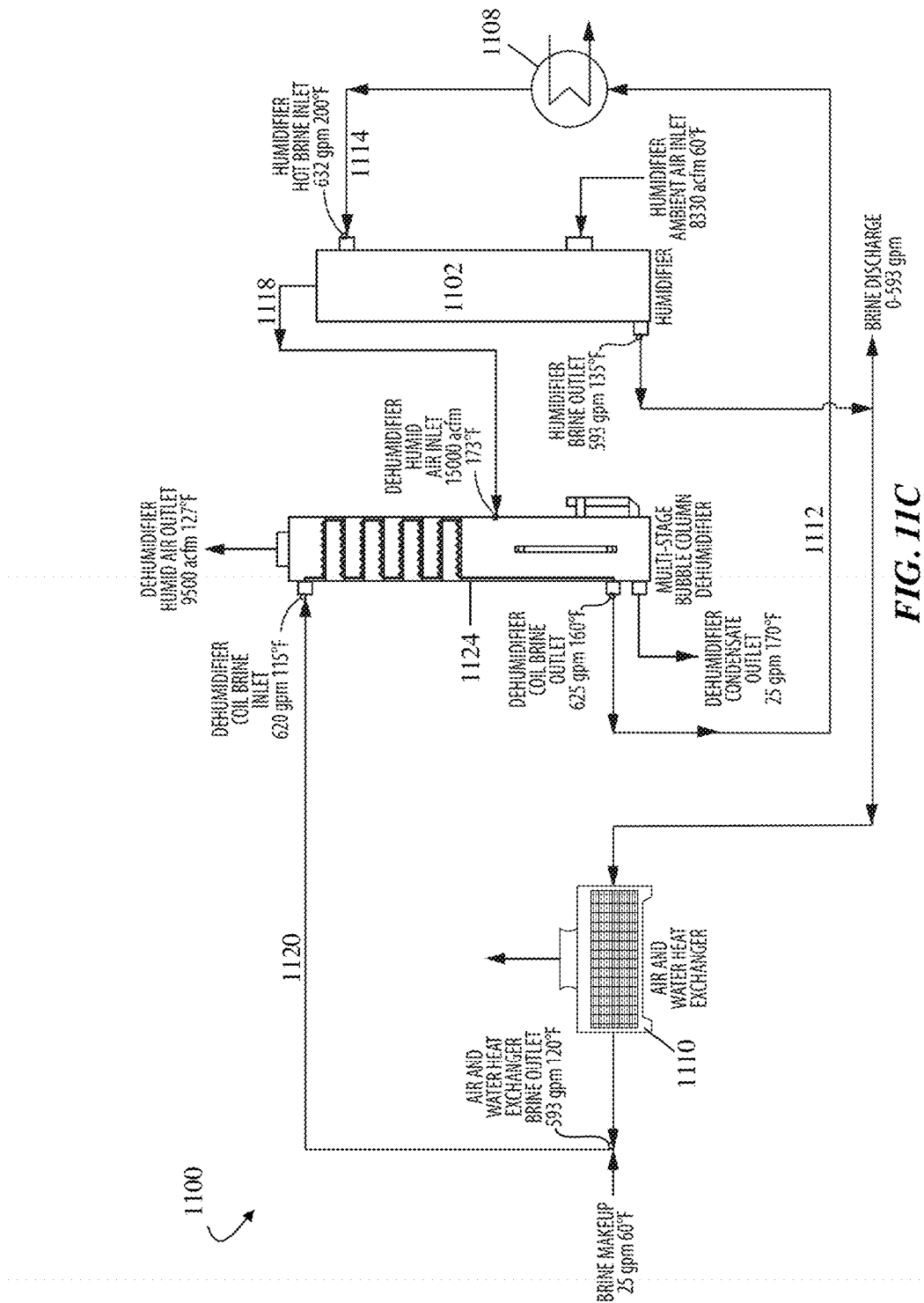
FIG. 11C shows, according to some embodiments, an exemplary schematic illustration of an HDH system comprising a bubble column condenser comprising an internal heat exchanger, a humidifier, an external heating device, and an external cooling device.

This example describes an HDH system 1100 comprising a humidifier 1102, a multi-stage bubble column condenser 1124 comprising an internal heat exchanger, an external heating device 1108, and an external cooling device 1110. This system is shown in FIG. 11C.

When HDH system 1100 is in operation, a brine stream enters the internal heat exchanger of condenser 1124 at a flow rate of 620 gpm and a temperature of 115° F. As the brine stream flows through the internal heat exchanger of condenser 1124, heat is transferred to the brine stream from a fresh water stream flowing through condenser 1124, resulting in a heated brine stream that exits condenser 1124 at a flow rate of 625 gpm and a temperature of 160° F. The heated brine stream then flows through liquid conduit 1112 to heating device 1108, where the heated brine stream is further heated to a temperature of 200° F. The further heated brine stream then flows through conduit 1114 and enters humidifier 1102 at a flow rate of 632 gpm and a temperature of 200° F.

In humidifier 1102, the further heated brine stream comes into direct contact with an ambient air stream, which enters humidifier 1102 at a flow rate of 8,330 acfm and a temperature of 80° F. Heat and mass are transferred from the further heated brine stream to the ambient air stream, resulting in a humidified air stream and a concentrated brine stream. The concentrated brine stream exits humidifier 1102 at a flow rate of 593 gpm and a temperature of 135° F. A first portion of the concentrated brine stream exits HDH system 1100, and a second portion of the concentrated brine stream flows to cooling device 1110, where the concentrated brine stream is cooled to a temperature of 120° F. The cooled brine stream exits cooling device 1110 at a flow rate of 593 gpm and a temperature of 120° F. The cooled brine stream is combined with a stream of incoming brine, which enters at a flow rate of 25 gpm and a temperature of 60° F., before returning to condenser 1124 at a temperature of 115° F.

The humidified air stream exits a main air outlet of humidifier 1102 and enters condenser 1124 at a flow rate of 15,000 acfm and a temperature of 173° F. In condenser 1124, the humidified air stream comes into contact with the fresh water stream, and purified water is condensed from the humidified air stream, resulting in a dehumidified air stream. The purified water enters the fresh water stream, which exits condenser 1124 at a flow rate of 25 gpm and a temperature of 170° F. The dehumidified air stream exits condenser 1124 at a flow rate of 9500 acfm and a temperature of 127° F.

EXAMPLE 7

Figure 11D:
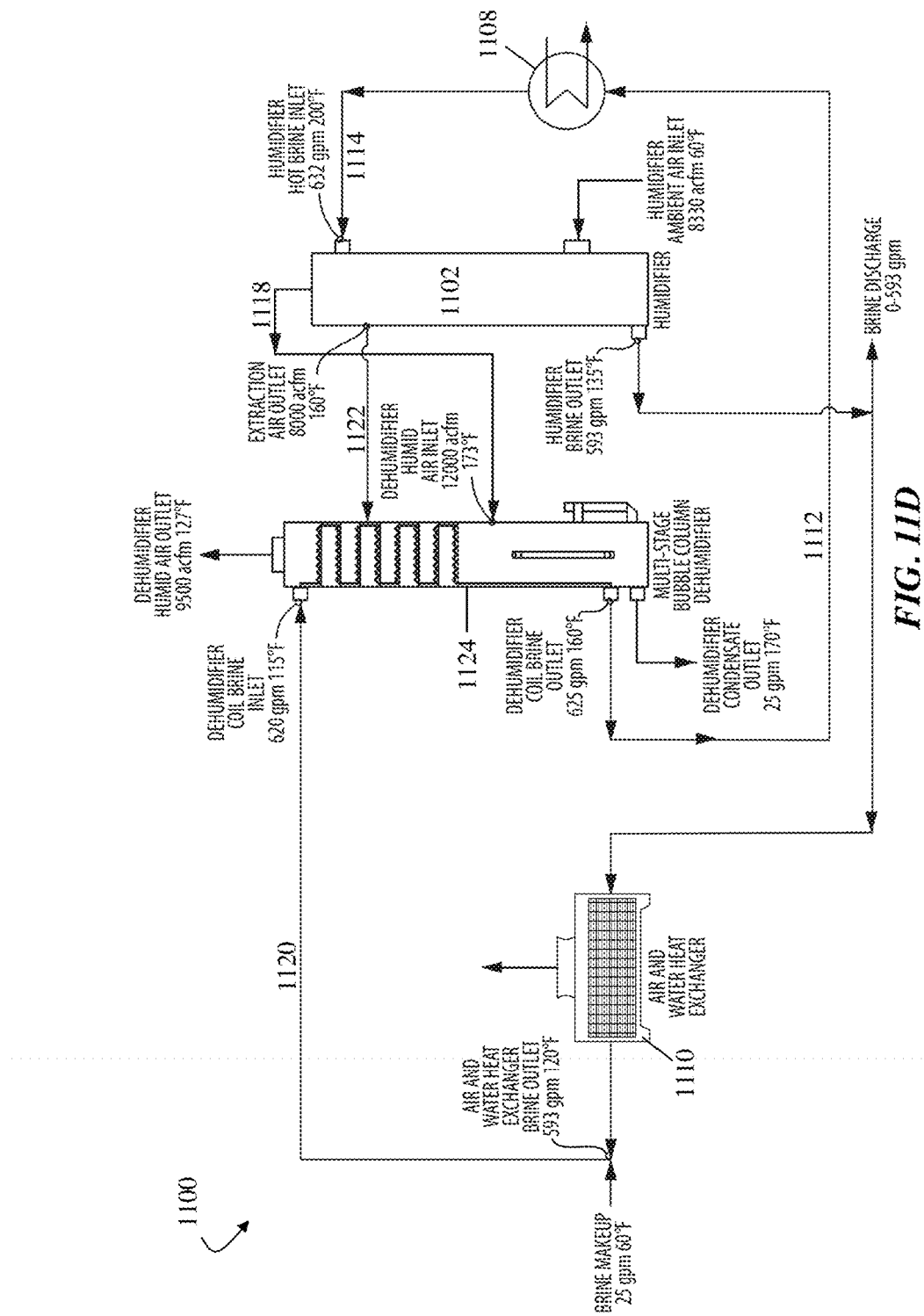
FIG. 11D shows, according to some embodiments, an exemplary schematic illustration of an HDH system comprising a bubble column condenser comprising an internal heat exchanger and an intermediate air inlet, a humidifier comprising an intermediate air outlet, an external heating device, and an external cooling device.

This example describes the HDH system 1100 of Example 5, with the addition of an intermediate gas conduit 1122 connecting humidifier 1102 and condenser 1124. When this system, which is shown in FIG. 11D, is in operation, air is extracted from humidifier 1102 at an intermediate air outlet.

The air subsequently flows through intermediate gas conduit 1122 and is injected directly into an intermediate location in condenser 1124. The locations of the extraction and injection points are selected in order to optimize the thermal efficiency of the system. Because the intermediate air stream is extracted from humidifier 1102 before the stream has flowed through the entire humidifier, the temperature of the intermediate air stream is lower than the temperature of the humidified air stream exiting humidifier 1102 through a main humidifier air outlet. For example, while the humidified air stream exiting humidifier 1102 through the main air outlet enters condenser 1124 at a flow rate of 12,000 acfm and a temperature of 173° F., the intermediate air stream exiting humidifier 1102 through the intermediate air outlet enters condenser 1104 at a flow rate of 8,000 acfm and a temperature of 160° F.

Having thus described several aspects of some embodiments of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A desalination system, comprising:
   a humidifier comprising a humidifier liquid inlet fluidly connected to a source of salt-containing water, a humidifier gas inlet fluidly connected to a source of a gas, and a humidifier outlet, wherein the humidifier is configured to produce a vapor-containing humidifier outlet stream enriched in water vapor relative to the gas received from the humidifier gas inlet;
   a bubble column condenser comprising a condenser inlet fluidly connected to the humidifier outlet, a condenser gas outlet, and a condenser water outlet, wherein the bubble column condenser is configured to remove at least a portion of the water vapor from the humidifier outlet stream to produce a condenser gas outlet stream lean in water relative to the humidifier outlet stream and a condenser water outlet stream; and
   a heat exchanger separate from the bubble column condenser and fluidly connected to the condenser water outlet, wherein the heat exchanger is configured to remove heat from the condenser water outlet stream to produce a heat exchanger outlet stream.

2. The desalination system of claim 1, wherein a portion of a gas flow is extracted from at least one intermediate location in the humidifier and fed from the least one intermediate location to at least one intermediate location in the bubble column condenser.

3. The desalination system of claim 1, wherein the gas comprises air.

4. The desalination system of claim 1, wherein in operation, the pressure in the humidifier and/or the bubble column condenser is maintained at approximately ambient atmospheric pressure.

5. The desalination system of claim 1, wherein the humidifier is a packed bed humidifier or a bubble column humidifier.

6. The desalination system of claim 1, wherein the bubble column condenser further comprises a first stage comprising a first stage inlet, a first stage outlet, and a liquid layer comprising an amount of water, wherein the first stage inlet is in fluid communication with the condenser inlet and is coupled to at least one bubble generator.

7. The desalination system of claim 6, wherein the bubble column condenser further comprises a second stage comprising a second stage inlet, a second stage outlet, and a liquid layer comprising an amount of water, wherein the second stage inlet is in fluid communication with the first stage outlet and is coupled to at least one bubble generator.

8. The desalination system of claim 7, wherein the at least one bubble generator coupled to the first stage inlet and/or the second stage inlet comprises a sparger plate comprising a plurality of holes, wherein the plurality of holes have a diameter in the range of about 0.1 mm to about 50 mm.

9. The desalination system of claim 8, wherein the plurality of holes have a diameter in the range of about 1 mm to about 5 mm.

10. The desalination system of claim 7, wherein the bubble column condenser further comprises at least one vapor distribution region positioned above the liquid layer of the first stage and/or the liquid layer of the second stage.

11. The desalination system of claim 7, wherein the liquid layer of the first stage and/or the second stage has a height of about 0.1 m or less during substantially continuous operation.

12. The desalination system of claim 7, wherein the liquid layer of the first stage and/or the second stage has a height of about 0.05 m or less during substantially continuous operation.

13. The desalination system of claim 7, wherein the first stage and/or the second stage of the bubble column condenser has a height of about 0.5 m or less.

14. The desalination system of claim 7, wherein the ratio of the height of the liquid layer of the first stage and/or the second stage to the length of the bubble column condenser is about 1.0 or lower during substantially continuous operation.

15. The desalination system of claim 7, wherein the ratio of the height of the liquid layer of the first stage and/or the second stage to the length of the bubble column condenser is about 0.1 or lower during substantially continuous operation.

16. The desalination system of claim 7, wherein the first stage and the second stage are arranged vertically within the bubble column.

17. The desalination system of claim 1, wherein the bubble column condenser is configured to flow the vapor-containing humidifier outlet stream in a first direction and the condenser water outlet stream in a second, substantially opposite direction.

18. The desalination system of claim 1, wherein the bubble column condenser is configured such that the gas has a velocity in the range of about 10 to about 200 cfm/ft$^2$.

19. The desalination system of claim 1, wherein the bubble column condenser has a total height of about 4 m or less.

20. The desalination system of claim 1, wherein the bubble column condenser further comprises a stack in fluid communication with the condenser gas outlet, wherein the condenser gas outlet has a largest cross-sectional dimension, and wherein the stack has a largest cross-sectional dimension larger than the largest cross-sectional dimension of the condenser gas outlet.

21. The desalination system of claim 1, wherein the heat exchanger is configured to receive the condenser water outlet stream at a heat exchanger inlet temperature and produce the heat exchanger outlet stream at a heat exchanger outlet temperature, and wherein the difference between the heat exchanger inlet temperature and the heat exchanger outlet temperature is at least about 10° C.

22. The desalination system of claim 1, wherein the heat exchanger is configured to receive the condenser water outlet stream and a salt-containing water stream, wherein the heat exchanger is configured to flow the condenser water outlet stream in a first direction through the heat exchanger and to flow the salt-containing water stream in a second, substantially opposite direction through the heat exchanger, wherein the humidifier is configured to receive the salt-containing water stream.

23. The desalination system of claim 1, wherein, in operation, a first portion of the heat exchanger outlet stream is introduced into the bubble column condenser and a second portion of the heat exchanger outlet stream is discharged from the desalination system.

24. The desalination system of claim 1, further comprising a cooling device fluidly connected to the bubble column condenser and/or the heat exchanger.

25. The desalination system of claim 24, wherein the cooling device is configured to receive the heat exchanger outlet stream at a cooling device inlet temperature and to produce a cooling device outlet stream at a cooling device outlet temperature, wherein the difference between the cooling device inlet temperature and the cooling device outlet temperature is at least about 10° C., and wherein the bubble column condenser is configured to receive the cooling device outlet stream.

26. The desalination system of claim 24, wherein the cooling device is an air-cooled heat exchanger.

27. The desalination system of claim 1, further comprising a first heating device fluidly connected to the humidifier and/or the heat exchanger.

28. The desalination system of claim 27, wherein the first heating device is configured to receive the heat exchanger outlet stream at a first heating device inlet temperature and to produce a first heating device outlet stream at a first heating device outlet temperature, wherein the difference between the first heating device inlet temperature and the first heating device outlet temperature is at least about 10° C., and wherein the humidifier is configured to receive the first heating device outlet stream.

29. The desalination system of claim 1, further comprising a second heating device fluidly connected to the bubble column condenser and/or the heat exchanger.

30. The desalination system of claim 29, wherein the second heating device is configured to receive the condenser water outlet stream at a second heating device inlet temperature and to produce a second heating device outlet stream at a second heating device outlet temperature, wherein the difference between the second heating device inlet temperature and the second heating device outlet temperature is at least about 10° C., and wherein the heat exchanger is configured to receive the second heating device outlet stream.

* * * * *

UNITED STATES PATENT AND TRADEMARK OFFICE
CERTIFICATE OF CORRECTION

| | | |
|---|---|---|
| PATENT NO. | : 9,079,117 B2 | Page 1 of 1 |
| APPLICATION NO. | : 14/538619 | |
| DATED | : July 14, 2015 | |
| INVENTOR(S) | : Prakash Narayan Govindan et al. | |

It is certified that error appears in the above-identified patent and that said Letters Patent is hereby corrected as shown below:

Title Page, Item (72) Inventor Steven Lam's address reads "Medford, LA" it should read -- Medford, MA --.

Signed and Sealed this
Twenty-ninth Day of December, 2015

Michelle K. Lee
*Director of the United States Patent and Trademark Office*